United States Patent
Yoshida et al.

(10) Patent No.: US 7,975,788 B2
(45) Date of Patent: Jul. 12, 2011

(54) MOVING BODY

(75) Inventors: Naohiro Yoshida, Nisshin (JP); Toshiyuki Kondo, Tiryu (JP); Masahiko Hibino, Toyota (JP); Osamu Yumita, Nagoya (JP); Yoshihiro Funayama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1182 days.

(21) Appl. No.: 10/569,447

(22) PCT Filed: Aug. 12, 2004

(86) PCT No.: PCT/JP2004/011866
§ 371 (c)(1),
(2), (4) Date: Feb. 24, 2006

(87) PCT Pub. No.: WO2005/018980
PCT Pub. Date: Mar. 3, 2005

(65) Prior Publication Data
US 2007/0000702 A1 Jan. 4, 2007

(30) Foreign Application Priority Data

Aug. 26, 2003 (JP) ................................ 2003-301311
Oct. 27, 2003 (JP) ................................ 2003-366503
May 25, 2004 (JP) ................................ 2004-154101

(51) Int. Cl.
*B60L 11/18* (2006.01)
(52) U.S. Cl. .................................................. 180/65.31
(58) Field of Classification Search .............. 180/65.31; 429/34, 39; 237/12.3 B, 12.3 R
See application file for complete search history.

(56) References Cited

U.S. PATENT DOCUMENTS

| 4,855,192 | A | * | 8/1989 | Grasso | 429/13 |
| 5,651,259 | A | * | 7/1997 | Twyman | 62/93 |
| 6,124,052 | A | | 9/2000 | Katoh et al. | |
| 6,467,698 | B2 | * | 10/2002 | Gaarder et al. | 237/12.3 B |
| 6,541,141 | B1 | * | 4/2003 | Frank et al. | 429/17 |
| 7,399,544 | B2 | * | 7/2008 | Gerard | 429/26 |
| 2002/0092916 | A1 | | 7/2002 | Gaarder et al. | |
| 2002/0094469 | A1 | | 7/2002 | Yoshizumi et al. | |
| 2003/0012989 | A1 | | 1/2003 | Ueda et al. | |
| 2003/0031902 | A1 | | 2/2003 | Balasubramanian et al. | |
| 2003/0037983 | A1 | | 2/2003 | Hanaya et al. | |

FOREIGN PATENT DOCUMENTS

EP    1 265 305 A2    12/2002

(Continued)

*Primary Examiner* — Frank B Vanaman
(74) *Attorney, Agent, or Firm* — Kenyon & Kenyon LLP

(57) ABSTRACT

Water contained in exhaust gas discharged from a fuel cell stack 22 is separated by a gas-liquid separator 48 and is accumulated in a recovery tank 54. The procedure of the invention sets a release amount of water and selects one or multiple positions for water release, based on the driving conditions including the vehicle speed and the acceleration, the turning state, activation or non-activation of skid reduction control, the distance from any object detected by clearance sonars 94a through 94d, a distance from a subsequent vehicle measured by an extremely high frequency radar 92, and the presence of raindrops detected by a raindrop detection sensor, and releases the water accumulated in the recovery tank 54 from water outlets at the selected one or multiple positions among water outlets 58a through 58f at multiple different locations. This arrangement ensures adequate release of the water produced by the fuel cell stack 22 to the atmosphere.

27 Claims, 35 Drawing Sheets

FOREIGN PATENT DOCUMENTS

| | | |
|---|---|---|
| EP | 1 270 310 A2 | 1/2003 |
| JP | 08-195215 | 7/1996 |
| JP | 09-266002 | 10/1997 |
| JP | 11-204126 | 7/1999 |
| JP | 2001-229938 A | 8/2001 |
| JP | 2001-313056 | 11/2001 |
| JP | 2002-289237 | 10/2002 |
| JP | 2002-343396 A | 11/2002 |
| JP | 2002-373691 A | 12/2002 |
| JP | 2002-373697 A | 12/2002 |
| JP | 2003-007323 | 1/2003 |
| WO | WO 00/42671 | 7/2000 |
| WO | WO 01/91216 A2 | 11/2001 |

\* cited by examiner

FIG.20
(a)
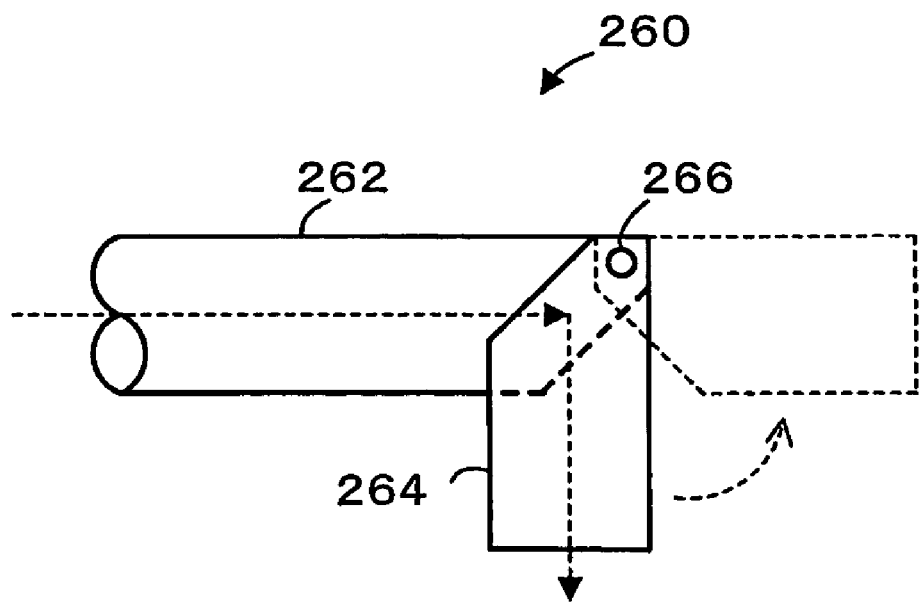
(b)
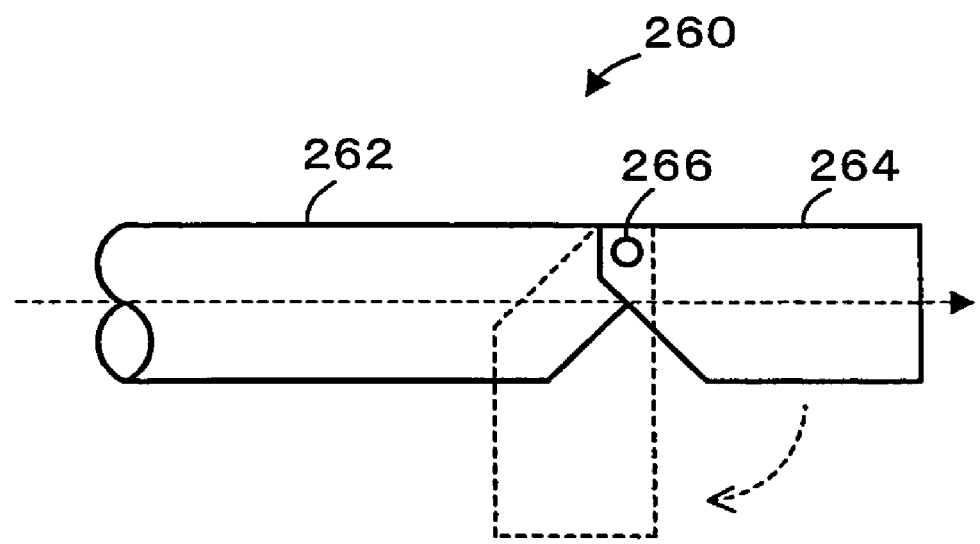

FIG.39
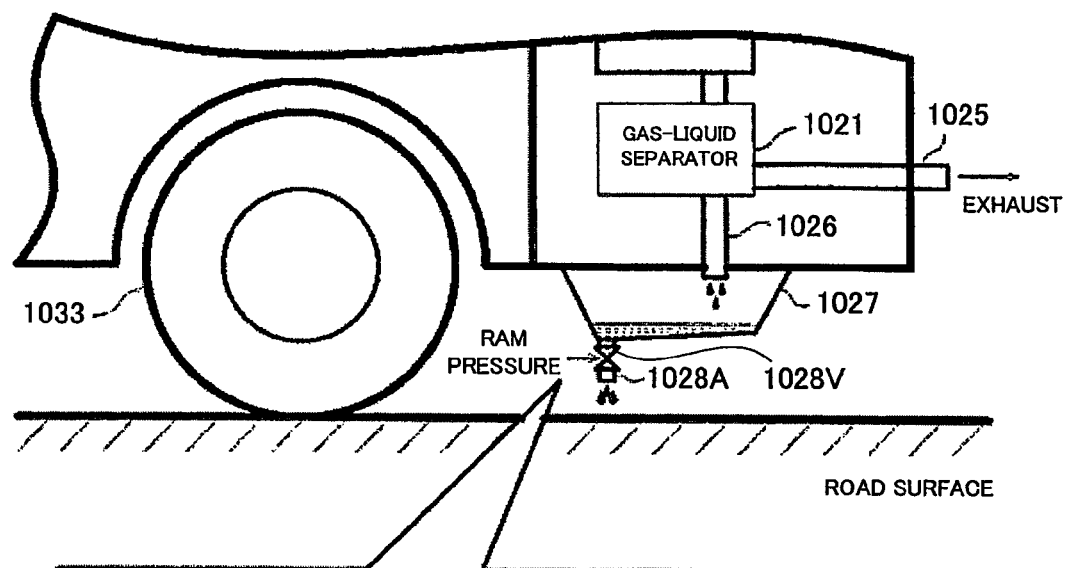
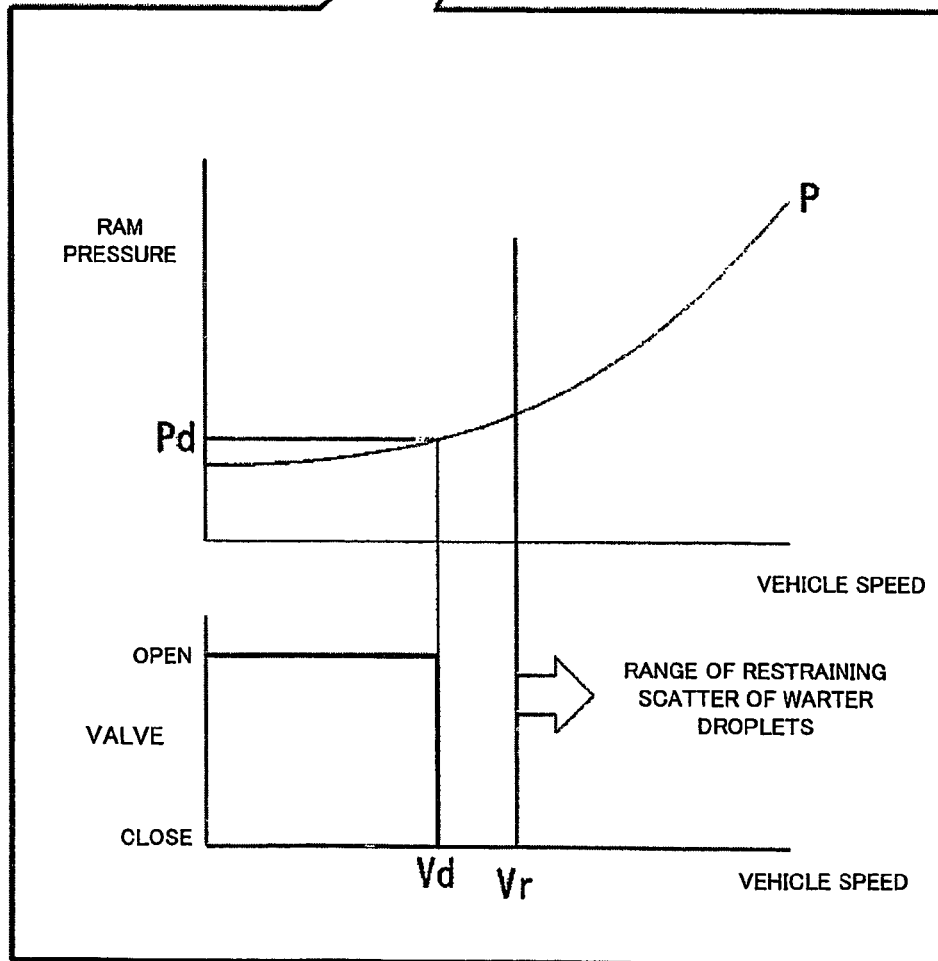

FIG.40
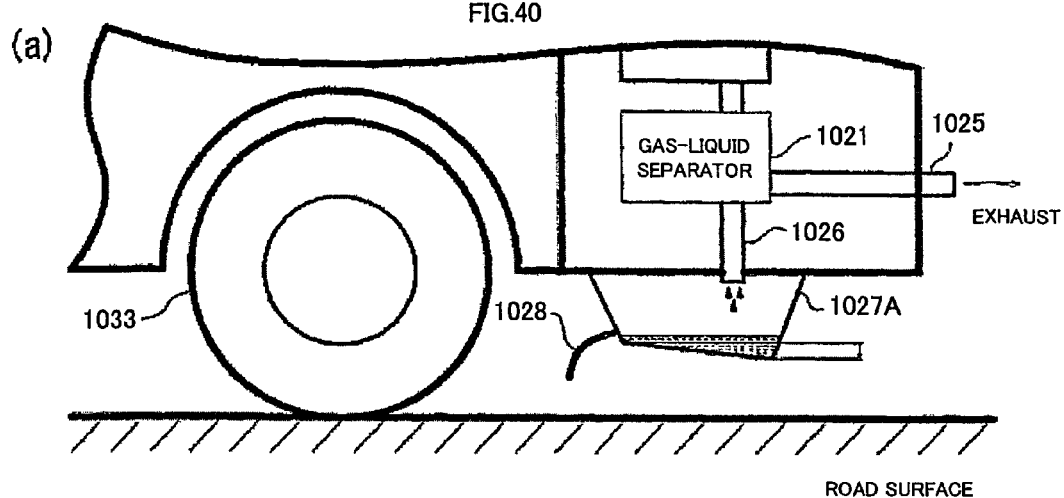
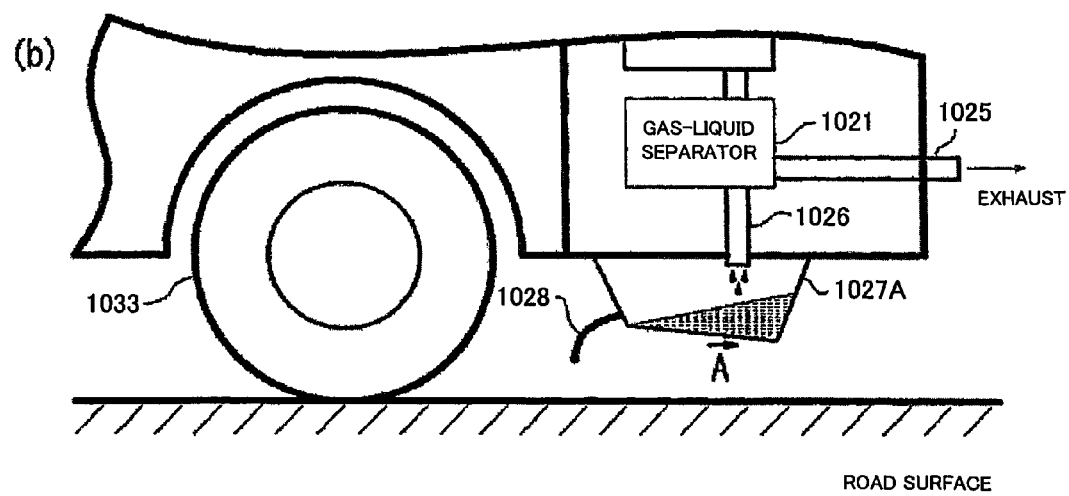
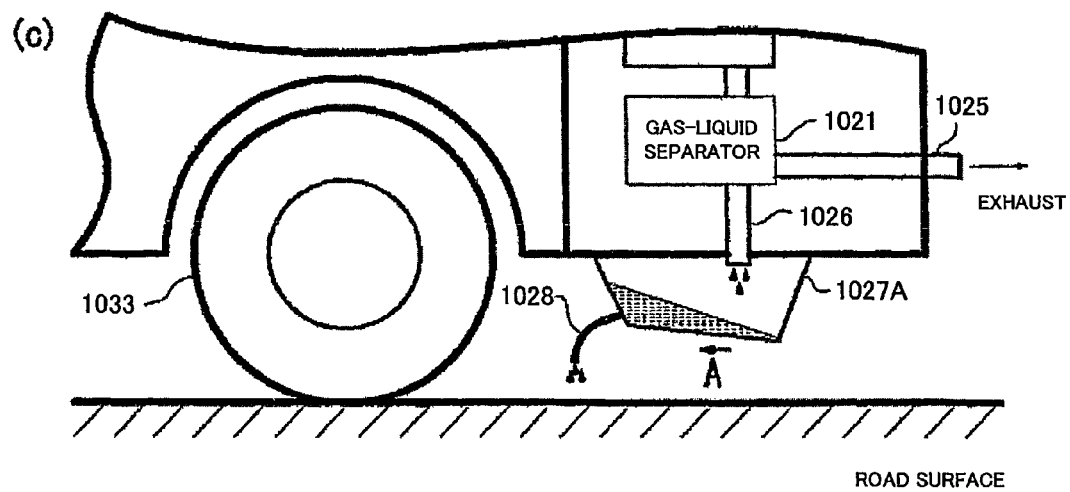

FIG.41
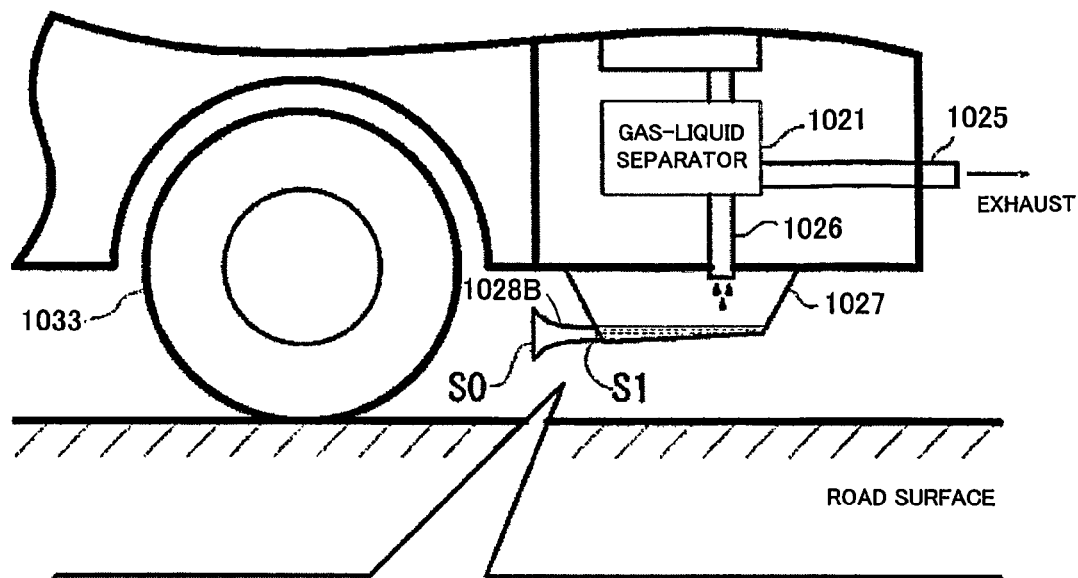
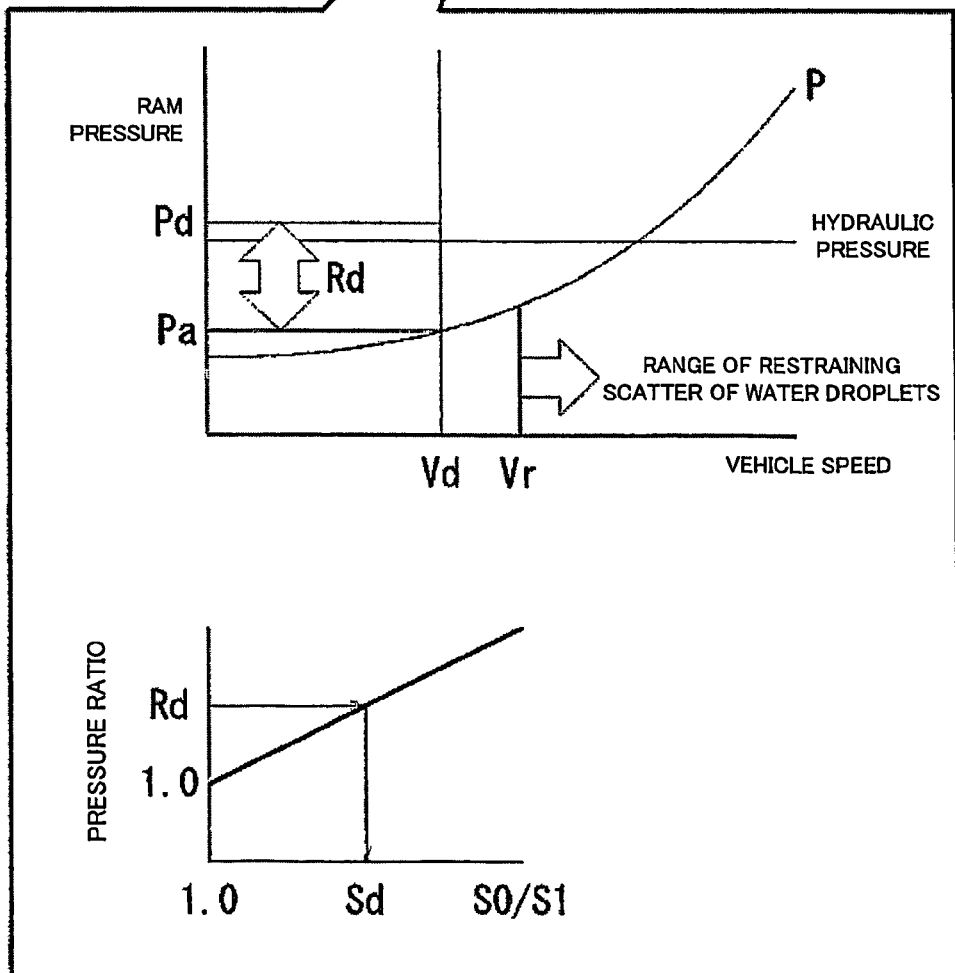

MOVING BODY

This is a 371 national phase application of PCT/JP2004/011866 filed 12 Aug. 2004, claiming priority to Japanese Patent Application No. 2003-301311 filed 26 Aug. 2003, No. 2003-366503 filed 27 Oct. 2003, and No. 2004-154101 filed 25 May 2004, the contents of which are incorporated herein by reference.

TECHNICAL FIELD

The present invention relates to a moving body. Specifically, the invention relates to a moving body with fuel cells that are mounted thereon as a power source and generate electric power with production of water as a by-product

BACKGROUND ART

One example of proposed moving bodies is a motorcycle that releases water produced by fuel sells on the side of the vehicle (see, for example, Japanese Patent Laid-Open Gazette No. 2001-313056). Release of the water produced by the fuel cells on the side of the vehicle prevents potential troubles caused by splash of the water on wheels, for example, a skid of the wheels.

DISCLOSURE OF THE INVENTION

As described above, the vehicle with fuel cells mounted thereon requires release of water, which is produced by the fuel cells, out of the vehicle during a run. Even when the water is released in such a manner that does not wet wheels to avoid a potential skid, the released water may cause some troubles on subsequent and nearby vehicles. For example, the released water may be swirled on and scattered by the vehicle wind and be splashed on the front glass of a subsequent vehicle. The release of the water in a lateral direction, however, may cause the released water to swash on a pedestrian on the road shoulder or a nearby building.

The object of the present invention is to provide a moving body which restrains potential disadvantage of making the released water, which is released from the fuel cells of the moving body, swirled and scattered. The object of the invention is also to provide a moving body which restrains potential disadvantage of making the released water splash on any pedestrians and nearby buildings. The object of the invention is also to provide a moving body which restrains potential effect of the released water to another moving body located behind the moving body. The object of the invention is to adequately discharge the released water from the fuel cells of the moving body to the atmosphere.

In order to achieve at least part of the aforementioned objects, the moving body of the present invention is constructed as follows.

A first moving body of the present invention is a moving body with fuel cells that are mounted thereon as a power source and generate electric power with production of water as a by-product, the moving body including: a water reservoir that accumulates therein water produced by the fuel cells; a release module that releases the water produced by the fuel cells and the water accumulated in the water reservoir via at least one water outlet to the atmosphere; a status detection module that detects a status of the moving body; and a release control module that controls the release module to regulate release of the water in response to the detected status.

The first moving body of the invention releases the water produced by the fuel cells and the accumulated water via the at least one water outlet to the atmosphere, in response to the detected status of the moving body. This arrangement ensures adequate release of the water to the atmosphere, according to the status of the moving body. Here the terminology 'water reservoir' means any of containers, vessels, and spaces that is located in a pathway from the fuel cells to the outlet and is capable of accumulating water, for example, a water tank for accumulating the water, as well as a passage for the water flow from the fuel cells to the outlet (especially a passage of the water flow with exhaust gas discharged from the fuel cells). The terminology 'moving body' includes any ground moving body, for example, an automobile, a train, or any of other various vehicles. The moving body may have other power sources, such as a secondary battery, a capacitor, and a generator, in addition to the fuel cells.

In one preferable embodiment of the first moving body of the invention, the status detection module detects a moving state of the moving body, and the release control module controls the release module to restrict release of the water in the moving state of the moving body detected by the status detection module, compared with release of the water in a stop state of the moving body. This arrangement restrains potential effects of the water release during a motion of the moving body, for example, potential disadvantage of making the released water swirled on and scattered by the air flow caused by the motion of the moving body to swash any of another moving body located behind or on the side, potential disadvantage of making the released water splash on any pedestrians and nearby buildings, and potential disadvantage of making the released water interfere with a stable motion of the moving body.

In this preferable embodiment of the first moving body of the invention that restricts release of the water in the moving state, the release control module may control the release module to prohibit release of the water, when the moving state of the moving body detected by the status detection module corresponds to a predetermined moving state. This arrangement effectively prevents potential disadvantages due to the water release in the predetermined moving state. Here, the predetermined moving state may represent a state in which the moving body moves at or over a preset moving speed.

In the above preferable embodiment of the first moving body of the invention that restricts release of the water in the moving state, the release control module may control the release module to release the water within a first release quantity in response to detection of a stop state of the moving body by the status detection module, while controlling the release module to release the water within a second release quantity, which is less than the first release quantity, in response to detection of a moving state of the moving body by the status detection module. This arrangement ensures release of the water within the first release quantity when the moving body is in the stop state, while ensuring adequate release of the water within the second release quantity when the moving body is in the moving state. Thus, potential disadvantages due to the water release, while the moving body is in the moving state, are adequately prevented.

In the above preferable embodiment of the first moving body of the invention that restricts release of the water in the moving state, the status detection module may measure a moving speed of the moving body. In this case, the release control module may control the release module to decrease release of the water with an increase in moving speed measured by the status detection module. In this case, as another application, the release control module may set an allowable release limit, which tends to decrease with an increase in moving speed measured by the status detection module, and control the release module to release the water within the setting of allowable release limit. This arrangement prevents potential disadvantages due to the water release, which tends to occur more often as the moving speed of the moving body increases.

In one preferable embodiment of the first moving body of the invention, the status detection module detects an acceleration state of the moving body, and the release control module controls the release module to restrict release of the water in the case of detection of the acceleration status of the moving body by the status detection module, compared with release of the water in the case of no detection of the acceleration status of the moving body. In general, the moving body is less stable under acceleration than under motion at a constant speed. This embodiment restrains overlap of potential effects (disadvantages) of the water release in the potentially unstable acceleration state. The release control module may control the release module to prohibit release of the water when an acceleration of the moving body measured by the status detection module is not less than a preset level. This arrangement effectively prevents potential disadvantages due to the water release under acceleration of not less than the preset level.

In one preferable embodiment of the first moving body of the invention, the status detection module detects a moving state of the moving body, and the release control module controls the release module to make release of the water less than production of the water by the fuel cells, in response to detection of the moving state of the moving body by the status detection module. This arrangement reduces the release of the water of the moving body in the moving state.

In another preferable embodiment of the first moving body of the invention, the status detection module measures a relative speed of an ambient air flow to the moving body, and the release control module controls the release module to decrease release of the water with an increase in relative speed of the ambient air flow measured by the status detection module. The degree of scatter or swirl of the released water by the ambient air flow depends upon the relative speed of the ambient air flow to the released water. The release of the water is decreased with an increase in relative speed of the ambient air flow to the moving body. This arrangement desirably restrains the released water from being swirled on and scattered by the ambient air flow. In this preferable embodiment, the release control module may control the release module to prohibit release of the water when the relative speed of the ambient air flow measured by the status detection module is not less than a preset level. This arrangement adequately prevents potential disadvantages due to the release of the water when the relative speed of the ambient air flow to the moving body is not less than a preset level.

In another preferable embodiment of the first moving body of the invention, the status detection module detects a braking state of the moving body, and the release control module controls the release module to restrict release of the water, in response to detection of the braking state of the moving body by the status detection module. This arrangement restrains the potential interference of the released water with the smooth braking of the moving body. In this preferable embodiment, the release control module may control the release module to prohibit release of the water when the braking state of the moving body detected by the status detection module corresponds to a predetermined braking state. This arrangement restrains the potential interference of the water, which is released under the predetermined braking state, with the smooth braking of the moving body.

In another preferable embodiment of the first moving body of the invention, the status detection module detects a specific turning state of the moving body, and the release control module controls the release module to restrict release of the water in the case of detection of the specific turning state by the status detection module, compared with release of the water in the case of no detection of the specific turning state. This arrangement effectively prevents potential interference of the released water with the stability on the turn of the moving body, for example, a potential skid of a vehicle as one typical example of the moving body. Here restriction of the water release includes prohibition of the water release.

In the preferable embodiment of the first moving body of the invention that restricts the water release in the specific turning state, the release module has at least two water outlets located respectively on left and right sides of the moving body to release the water, and the release control module controls the release module to restrict release of the water from at least one water outlet located on an outer circumferential side by a turn, between the at least two water outlets of the release module on the left and right sides, in response to detection of the specific turning state by the status detection module. In the turn of the moving body, a large centrifugal force is applied on the outer circumferential side of the turning body. Restriction of the water release from the water outlet on the outer circumferential side by the turn thus effectively prevents the potential interference of the released water with the stability on the turn of the moving body. In the preferable embodiment, the specific turning state may represent a turn of the moving body at or below a preset moving speed with a turning radius of not greater than a predetermined value. This restrains potential interference of the released water of the turning body with the turning radius of not greater than the predetermined value In one preferable application of the first moving body of the invention, the moving body is a vehicle that is equipped with a skid control module to control a skid of at least one wheel. The status detection module detects a skid reduction control state in which the skid control module is activated to control the skid of the wheel, and the release control module controls the release module to restrict release of the water, in response to detection of the skid reduction control state by the status detection module. The skid reduction control grips the skidding wheel and depends upon the frictional coefficient of the road surface. The wet road surface has the smaller frictional coefficient than the dry road surface. Restriction of the water release in the skid reduction control state thus effectively prevents the potential interference of the released water with the smooth skid reduction control. Here, the restriction of the release of the water may be prohibition of the release of the water. In this preferable application of the first moving body of the invention, the release module has multiple water outlets at multiple different locations to release the water therefrom, and the release control module may control the release module to restrict release of the water from at least a water outlet affecting the wheel under control of the skid, among the multiple water outlets of the release module, in response to detection of the skid reduction control state by the status detection module. This arrangement also effectively prevents the potential interference of the released water with the smooth skid reduction control.

In the first moving body of the invention, the status detection module may detect an environment of the moving body. This arrangement ensures the adequate water release according to the environment of the moving body.

In one preferable embodiment of the first moving body of the invention that regulates the water release according to the detected environment of the moving body, the status detection module detects a rainy state, and the release control module controls the release module to permit release of the water without restriction, in response to detection of the rainy state by the status detection module. The water release in the rain does not affect the moving conditions of the moving body, so that there is no need to restrict the release of the water. Here, the restriction of the release of the water may be prohibition of the release of the water. In this preferable embodiment, the release control module may control the release module to increase release of the water in the case of detection of a predetermined rainy state by the status detection module, compared with release of the water in the case of no detection of the rainy state. Release of the water may be increased in the rainy state.

In one preferable embodiment of the first moving body of the invention that regulates the water release according to the detected environment of the moving body, the moving body is a vehicle, wherein the status detection module detects a snowy-icy surface moving state of the moving body, in which the moving body moves on either a snowy surface or an icy surface, and the release control module controls the release module to restrict release of the water, in response to detection of the snowy-icy surface moving state of the moving body by the status detection module. This arrangement effectively prevents potential disadvantages due to the water release during a motion of the vehicle on the snowy surface or on the icy surface, for example, the disadvantage of heightening the potential for a skid of the vehicle on the wet road surface with the released water having the smaller frictional coefficient and the disadvantage of heightening the potential for a skid of the vehicle on the icy road surface with frozen water. Here, the restriction of the release of the water may be prohibition of the release of the water.

In another preferable embodiment of the first moving body of the invention that regulates the water release according to the detected environment of the moving body, the status detection module measures an outside air temperature, and the release control module controls the release module to decrease release of the water with a decrease in outside air temperature measured by the status detection module. This arrangement effectively prevents potential disadvantages due to the water release under the condition of the low outside air temperature, for example, the disadvantage of liquefying steam that leads to swirl and scatter of the liquid water and the disadvantage of freezing water to heighten the potential for a skid of the moving body. Here, the restriction of the release of the water may be prohibition of the release of the water.

In the first moving body of the invention, the status detection module may detect a state of an object located in the vicinity of the moving body. This arrangement ensures the adequate water release according to the state of the object located in the vicinity of the moving body. Here the terminology 'object' includes stationary objects like buildings and constructions and various moving objects like other moving bodies, as well as pedestrians and other people.

In one preferable embodiment of the first moving body of the invention that regulates the water release according to the detected state of the object located in the vicinity of the moving body, the status detection module detects presence of any object within a predetermined distance from the moving body, and the release control module controls the release module to restrict release of the water, in response to detection of the presence of any object within the predetermined distance from the moving body by the status detection module. This arrangement effectively prevents potential disadvantages due to the water release against any object located within the predetermined distance, for example, the disadvantage of splashing released water directly or indirectly on the object and the disadvantage of heightening the potential for a skid of the object by the water release. Here, the restriction of the release of the water may be prohibition of the release of the water. In this preferable embodiment of the first moving body of the invention, the release module has multiple water outlets at multiple different locations to release the water therefrom, and the status detection module may detect presence of any object within the predetermined distance in multiple different directions. The release control module controls the release module to restrict release of the water from a water outlet corresponding to a direction with any object detected in the predetermined distance by the status detection module, among the multiple water outlets. This arrangement more effectively prevents potential disadvantages due to the water release against any object located in the vicinity of the moving body.

In another preferable embodiment of the first moving body of the invention that regulates the water release according to the detected state of the object located in the vicinity of the moving body, the status detection module measures a distance between the moving body and another moving body located behind the moving body, and the release control module controls the release module to restrict release of the water, when the distance from the another moving body measured by the status detection module is less than a preset distance. This arrangement effectively prevents potential disadvantages for another moving body located behind the moving body due to the water release, for example, the disadvantage of making the released water from being swirled on and scattered by the air flow to block the vision of another moving body and the disadvantage of heightening the potential for a skid of another moving body by the water release. Here, the restriction of the release of the water may be prohibition of the release of the water. In this preferable embodiment, the status detection module may measure a moving speed of the moving body, and the release control module sets a distance calculated from the measured moving speed of the moving body to the preset distance and controls the release module to restrict release of the water in response to the preset distance. This arrangement controls the release of the water in response to the distance from the object, according to the moving speed of the moving body.

In one preferable embodiment of the first moving body of the invention, the status detection module detects an estimated loading-unloading state of a driver or a passenger loaded to or unloaded from the moving body, and the release control module controls the release module to restrict release of the water, in response to detection of the estimated loading-unloading state by the status detection module. This arrangement effectively prevents the released water from swashing on the driver or passenger loaded to or unloaded from the moving body. Here, the restriction of the release of the water may be prohibition of the release of the water. In this preferable embodiment, the release module has multiple water outlets at multiple different locations to release the water therefrom, and the status detection module may detect the estimated loading-unloading state at multiple different positions on the moving body. The release control module controls the release module to restrict release of the water from a water outlet corresponding to a position where the estimated loading-unloading state is detected by the status detection module, among the multiple water outlets. This arrangement also effectively prevents the released water from swashing on the driver or passenger loaded to or unloaded from the moving body, while keeping the release of the water.

In one preferable embodiment of the invention, the first moving body further includes an accumulation state detection module that detects an accumulation state of the water in the water reservoir. The release control module controls the release module to regulate release of the water, based on the accumulation state of the water detected by the accumulation state detection module. This arrangement regulates the release of the water based on the accumulation state of the water. In one structure of the preferable embodiment of the first moving body of the invention that regulates the water release in response to the detected accumulation state of the water, the release control module controls the release module to restrict release of the water when an accumulation level of the water detected as the accumulation state of the water by the accumulation state detection module is not greater than a preset first level. In another structure, the release control module controls the release module to enhance release of the water when an accumulation level of the water detected as the accumulation state of the water by the accumulation state detection module is not less than a preset second level. The former structure effectively prevents the potential disadvantages due to the water release until the accumulation level of the water exceeds the preset first level. The latter structure effectively restrains an increase in accumulation level of the water after the accumulation level of the water exceeds the preset second level. In still another structure of the above preferable embodiment, the first moving body of the invention, that regulates the water release in response to the detected accumulation state of the water, may further include an output restriction instruction module that gives an instruction of output restriction of the fuel cells when an accumulation level of the water detected as the accumulation state of the water by the accumulation state detection module is not less than a preset third level. This structure effectively restrains an increase in accumulation level of the water after the accumulation level of the water exceeds the preset third level.

In another preferable embodiment of the first moving body of the invention, the release module has multiple water outlets at multiple different locations, and the release control module controls the release module to regulate release of the water from the multiple water outlets, in response to the status detected by the status detection module. This arrangement ensures release of the water from the selected water outlets at the adequate locations according to the detected status of the moving body.

A second moving body of the present invention is a moving body with fuel cells that are mounted thereon as a power source and generate electric power with production of water as a by-product, the moving body including: a release module that releases water produced by the fuel cells to the atmosphere in a changeable release state; a moving state detection module that detects a moving state of the moving body; and a release control module that specifies the release state of the water corresponding to the detected moving state and controls the release module to release the water in the specified release state.

The second moving body of the invention specifies the release state of the water produced by the fuel cells corresponding to the detected moving state of the moving body and releases the water in the specified release state. This arrangement ensures the adequate water release in the release state according to the detected moving state of the moving body. Selection of the appropriate release state desirably prevents potential disadvantages due to the water release, for example, the disadvantage of making the released water from being swirled on and scattered by the air flow and the disadvantage of making the released water from being splashed on any object in the vicinity of the moving body.

In one preferable application of the second moving body of the invention, the release module changes a release direction of the water, and the release control module specifies the release direction of the water corresponding to the detected moving state and controls the release module to release the water in the specified release direction. This arrangement ensures the adequate water release in the specified direction according to the moving state of the moving body.

In one preferable embodiment of the second moving body of the invention that releases the water in the release direction specified corresponding to the detected moving state of the moving body, the moving state detection module measures a moving speed of the moving body. The release module- is capable of changing the release direction to a specific release direction having a component in a lateral direction of the moving body. The release control module specifies the release direction to enhance the component in the lateral direction of the moving body with an increase in measured moving speed of the moving body and controls the release module to release the water in the specified release direction. With an increase in moving speed of the moving body, the water is released in the lateral direction of the moving body that has less effects of the air flow caused by the motion of the moving body. This arrangement thus effectively prevents the released water from being swirled on and scattered by the air flow produced by the motion of the moving body. The lower moving speed of the moving body leads to the less rate of the water release in the lateral direction. Such regulation desirably restrains the released water from swashing on any building, construction, or pedestrian located in the lateral direction of the moving body.

In another preferable embodiment of the second moving body of the invention that releases the water in the release direction specified corresponding to the detected moving state of the moving body, the moving state detection module measures a moving speed of the moving body. The release module is capable of changing the release direction to a specific release direction having a component in a backward direction of the moving body. The release control module specifies the release direction to enhance the component in the backward direction of the moving body with an increase in measured moving speed of the moving body and controls the release module to release the water in the specified release direction. The greater relative speed of the released water to the road surface increases the potential for scatter and splash of the released water against the road surface. The greater degree of the scatter and splash of the released water naturally increases the amount of water swirled on the air flow caused by the motion of the moving body. The structure of this embodiment releases the water in the direction having the greater component in the backward direction of the moving body with an increase in moving speed of the moving body. This arrangement reduces the scatter and splash of the released water against the road surface and thereby restrains a large amount of the released water from being swirled on the air flow produced by the motion of the moving body.

In another preferable application of the second moving body of the invention, the release module has a release rate varying module that varies a release rate of the water, and the release control module specifies a condition of the release rate varying module in response to the detected moving state, adjusts the release rate varying module to attain the specified condition, and controls the release module to release the water. This arrangement ensures the water release at the adequate release rate according to the detected moving state of the moving body.

In one preferable embodiment of the second moving body of the invention that releases the water at the release rate in response to the detected moving state of the moving body, the release control module specifies the condition of the release rate varying module to lower a relative speed of the water to road surface in a moving direction of the moving body. This arrangement effectively reduces scatter and splash of the water against the road surface and thereby restrains the released water from being swirled on the air flow caused by the motion of the moving body.

In another preferable embodiment of the second moving body of the invention that releases the water at the release rate in response to the detected moving state of the moving body, the release rate varying module regulates either an opening area of a water outlet for release of the water therefrom, or a pressure in a pathway to a water outlet for release of the water therefrom, so as to vary the release rate of the water.

In one preferable embodiment of the second moving body of the invention, the release module releases the water together with exhaust gas discharged from the fuel cells. The release state of the water is thus controlled by controlling the discharge of the exhaust gas from the fuel cells.

A third moving body of the present invention is a moving body with fuel cells that are mounted thereon as a power source and generate electric power with production of water as a by-product, the moving body including: an operation module that operates the fuel cells; a release module that releases at least part of water, which is produced by the fuel cells, in the form of steam, together with exhaust gas discharged from the fuel cells, to the atmosphere; and a release control module that controls the operation module to make a release amount of liquid water released by the release module within a range of an allowable water release level.

The third moving body of the invention releases at least part of the water, which is produced by the fuel cells, in the form of steam, together with exhaust gas discharged from the fuel cells to the atmosphere. The release amount of liquid water is regulated to be within the range of the allowable water release level. Such regulation desirably restricts the release of the water in the liquid form to the allowable water release level, regardless of the amount of the water produced by the fuel cells. This arrangement effectively prevents potential disadvantages due to the release of the water exceeding the allowable water release level, for example, the disadvantage of making the released water swirled on and scattered by the air flow caused by the motion of the moving body.

In one preferable embodiment of the third moving body of the invention, the operation module regulates a temperature of the exhaust gas discharged from the fuel cells, and the release control module controls the operation module to regulate the temperature of the exhaust gas discharged from the fuel cells, so as to vary an amount of steam included in the water produced by the fuel cells and thereby make the release amount of liquid water within the range of the allowable water release level. In another preferable embodiment of the third moving body of the invention, the operation module drives a cooling device to cool the fuel cells down, and the release control module controls the operation module to adjust a driving condition of the cooling device and thereby regulate the temperature of the exhaust gas discharged from the fuel cells. In these arrangements, the release amount of liquid water is regulated to be within the range of the allowable water release level, by regulating the temperature of the exhaust gas discharged from the fuel cells to vary an amount of steam included in the water. In one structure of the preferable embodiment that regulates a temperature of the exhaust gas discharged from the fuel cells, the operation module may regulate a back pressure of the exhaust gas discharged from the fuel cells, and the release control module may control the operation module to adjust the back pressure of the exhaust gas discharged from the fuel cells and thereby regulate the temperature of the exhaust gas discharged from the fuel cells.

In another preferable embodiment of the third moving body of the invention, the operation module includes a humidifier module that humidifies a supply of a gas fed to the fuel cells with water content included in the exhaust gas discharged from the fuel cells, and the release control module regulates a humidification level by the humidifier module and thereby makes the release amount of liquid water within the range of the allowable water release level. In this arrangement, the release amount of liquid water is regulated to be within the range of the allowable water release level, by regulating a humidification level of the supply of the gas fed to the fuel cells.

In another preferable embodiment of the invention, the moving body further includes an operation state detection module that detects an operation state of the fuel cells. The release control module computes the release amount of liquid water in response to the operation state of the fuel cells detected by the operation state detection module, sets a control parameter in the operation module to make the computed release amount of liquid water within the range of the allowable water release level, and controls the operation module with the setting of the control parameter. The release amount of liquid water is regulated to be within the range of the allowable water release level, by changing the control parameter. Here, the control parameter may be a target temperature of the exhaust gas discharged from the fuel cells.

A fourth moving body of the present invention includes: fuel cells that generate electric power through electrochemical reaction of hydrogen with oxygen; an exhaust system that emits exhaust gas from the fuel cells out of the moving body; and a water discharge control mechanism that restrains discharge of water, which is contained in the exhaust gas, out of the moving body at a speed of not lower than a preset level.

Scatter of the released water is affected by the air flow outside the moving body. The fourth moving body of the invention accordingly restrains the discharge of water, which is contained in the exhaust gas, out of the moving body at the speed of not lower than the preset level, thus effectively preventing the scatter of the released water. A typical example of the moving body is a vehicle.

In the fourth moving body of the invention, the water discharge control mechanism may have any of diverse structures. In a first available structure, the water discharge control mechanism is a valve mechanism that reduces an opening at the speed of not lower than the preset level. The valve mechanism may include a solenoid valve and a valve regulator that regulates the opening of the solenoid valve in response to the speed of the moving body. The valve mechanism may alternatively include a lead valve that opens and closes in response to a variation in external pressure. Under the condition of relatively high-speed motion of the moving body, the ram pressure or the pressure caused by the blockage of the air flow increases with an increase in moving speed. The lead valve that opens and closes in response to a variation in ram pressure accordingly actualizes the valve mechanism of the relatively simple structure.

In a second available structure, the water discharge control mechanism is a drain that has an opening at a position and orientation to make a ram pressure produced by motion of the moving body act in a direction of restricting discharge of the water. For example, the drain may be attached to the outside of the moving body to face forward.

The water discharge control mechanism may be located in the exhaust system, for example, set directly in an exhaust pipe. In another preferable embodiment, the exhaust system has a gas liquid separation mechanism to separate the water from the exhaust gas, and the water discharge control mechanism is located in a water discharge system downstream the gas liquid separation mechanism. The gas liquid separation mechanism separates the water from the exhaust gas and thus advantageously ensures efficient discharge of water.

In one preferable structure of this embodiment, the gas liquid separation mechanism has a water tank that temporarily keeps the water accumulated therein. The presence of the water tank desirably restricts discharge of the water under the condition of high-speed motion of the moving body without affecting the function of gas liquid separation. In this structure, it is preferable that the water discharge system is provided in the water tank to have an opening in a front portion of the moving body. Under acceleration of the moving body, the force of inertia functions to press the accumulated water rearward in the water tank and thereby interfere with the water discharge from the water tank to prevent splash of water. Under deceleration of the moving body, on the other hand, the force of inertia functions to press the accumulated water forward in the water tank and thereby facilitate the water discharge from the water tank. The opening of the water tank for water discharge faces the front of the moving body. This simple structure restricts water discharge under acceleration of the moving body, while facilitating water discharge under deceleration of the moving body.

A fifth moving body of the present invention includes: fuel cells that generate electric power through electrochemical reaction of hydrogen with oxygen; an exhaust system that emits exhaust gas from the fuel cells out of the moving body; a water tank that temporarily keeps water contained in the exhaust gas; and a drain that is formed in a front portion of the moving body to discharge the water from the water tank.

The fifth moving body of the invention has the water tank located in the exhaust system and the drain formed in the front portion of the moving body to discharge the water from the water tank. The fifth moving body of the invention may have insufficient effects of restraining the water discharge under the condition of the high-speed motion of the moving body. As mentioned above, the presence of the front-facing opening restricts water discharge under acceleration of the moving body, while facilitating water discharge under deceleration of the moving body. During a general run, the moving body often repeats acceleration and deceleration and does not continue running at a fixed cruising speed. The arrangement of facilitating the water discharge under deceleration and restraining the water discharge under acceleration thus reduces scatter of the discharged water during a run of the moving body to the level that does not interfere with smooth driving of subsequent and nearby moving bodies. Here a typical example of the moving body is a vehicle.

In the fifth moving body of the invention, the water tank and the drain may be located inside the moving body to discharge water out of the moving body through an exhaust pipe. In one preferable embodiment of the fifth moving body of the invention, the drain has an opening at a position and orientation to make a ram pressure produced by motion of the moving body act in a direction of restricting discharge of the water. In one preferable structure of this embodiment, the water tank is attached to the outside of the moving body. This structure ensures application of the ram pressure onto the drain. In another preferable structure of this embodiment, the water tank is located inside the moving body, whereas the drain is formed outside the moving body. Application of the ram pressure onto the drain restricts the water discharge under the condition of the high-speed motion of the moving body and thereby effectively restrains splash of the discharged water.

In another preferable embodiment of the fifth moving body of the invention, the drain has a valve mechanism that reduces an opening at a speed of not less than a preset level. This arrangement also restricts the water discharge under the condition of the high-speed motion of the moving body. The valve mechanism may be the combination of the solenoid valve and the valve regulator or the lead valve, as discussed above with regard to the fourth moving body of the invention.

In another preferable embodiment of the fifth moving body of the invention, the exhaust system has a gas liquid separation mechanism to separate the water from the exhaust gas. In this embodiment, the water tank is located in a water discharge system downstream the gas liquid separation mechanism.

BRIEF DESCRIPTION OF THE DRAWINGS

FIG. 20 shows an operation of the variable-direction outlet 260;

FIG. 39 shows the structure of an exhaust system in a sixth embodiment of the invention;

FIG. 40 shows the structure of an exhaust system in one modified example; and

FIG. 41 shows the structure of an exhaust system in another modified example.

BEST MODES OF CARRYING OUT THE INVENTION

Some modes of carrying out the invention are discussed below as preferred embodiments.

A. First Embodiment

Figure 1:
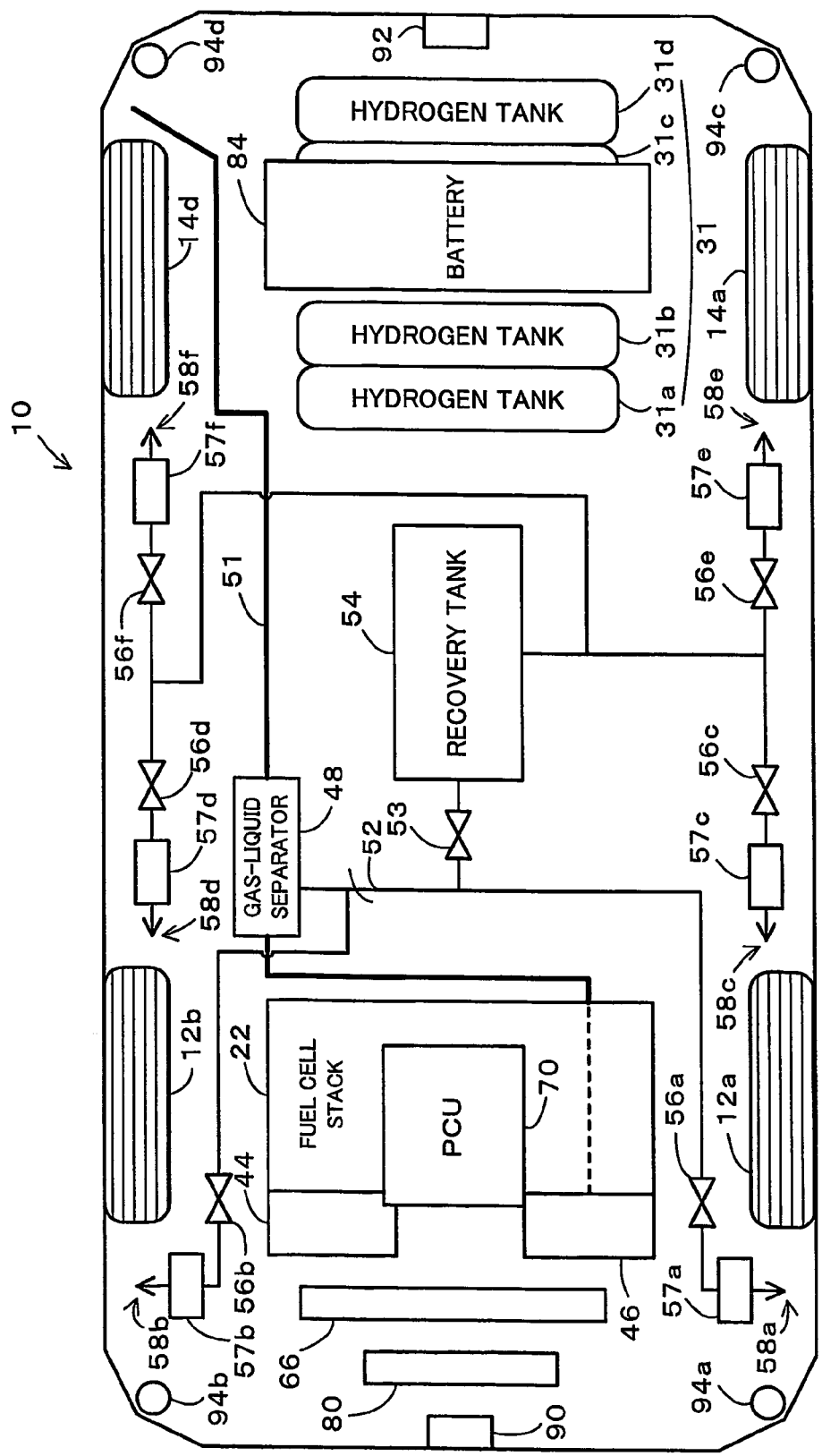
FIG. 1 is a plan view showing a plane layout of devices mounted on a fuel cell vehicle 10 as a moving body of a first embodiment of the invention.
Figure 2:
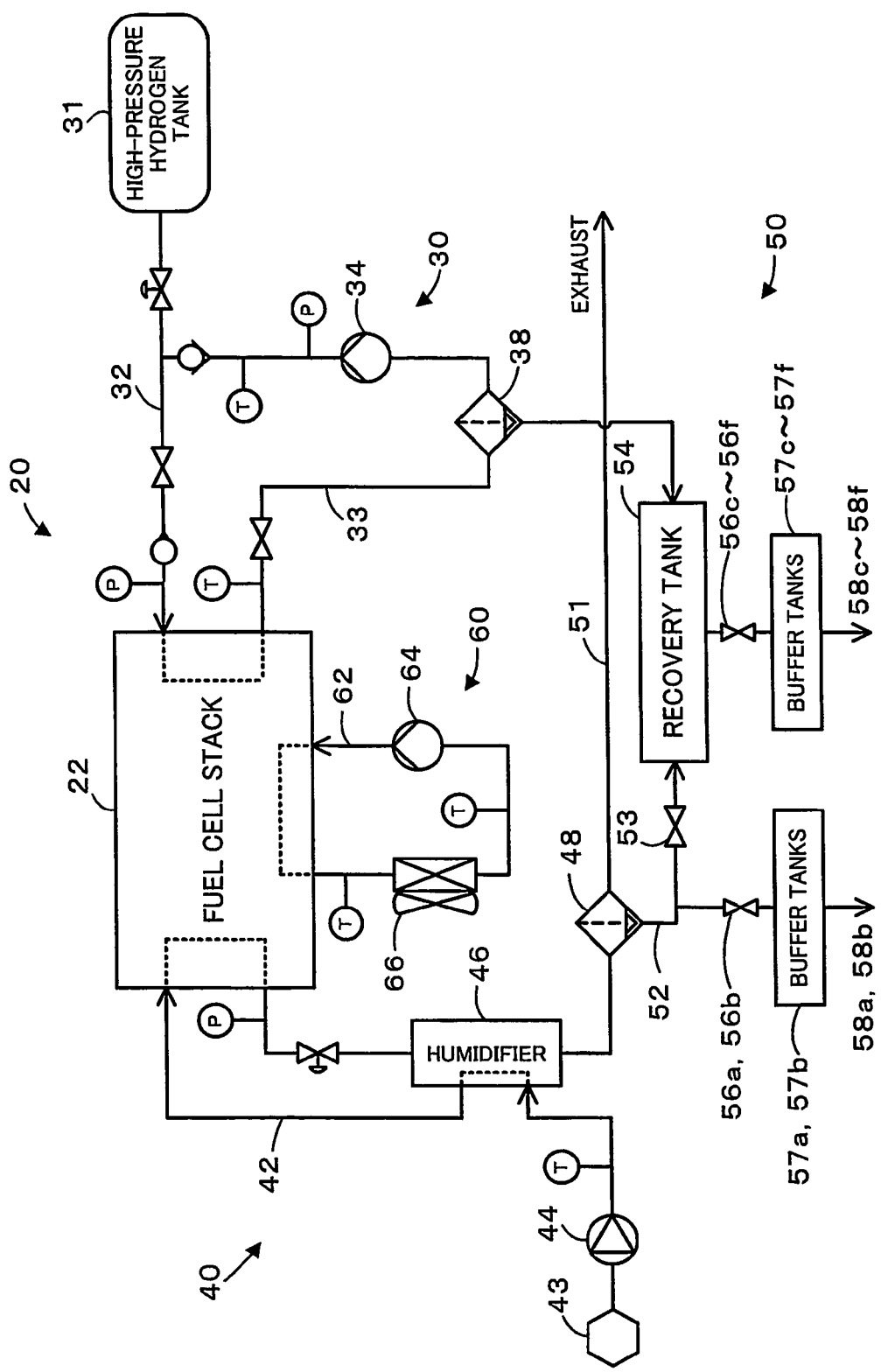
FIG. 2 is a system diagram schematically showing the configuration of a fuel cell system 20 mounted on the fuel cell vehicle 10 of the first embodiment.

FIG. 1 is a plan view showing a plane layout of devices mounted on a fuel cell vehicle 10 as a moving body of a first embodiment of the invention. FIG. 2 is a system diagram schematically showing the configuration of a fuel cell system 20 mounted on the fuel cell vehicle 10 of the first embodiment. For simplicity of explanation, the description first regards the configuration of the fuel cell system 20 with reference to the system diagram of FIG. 2 and then the layout of the respective devices included in the fuel cell system 20 with reference to FIG. 1

The fuel cell system 20 mounted on the fuel cell vehicle 10 of the first embodiment includes a fuel cell stack 22 or a stack of multiple layers of unit cells, each of which has two electrodes (a fuel electrode and an air electrode) arranged across a polymer electrolyte membrane. The fuel cell system 20 also includes a hydrogen supply system 30 that feeds a supply of hydrogen from a high-pressure hydrogen tank 31 to the fuel electrodes (anodes) of the fuel cell stack 22, an air supply discharge system 40 that feeds a supply of the air to the air electrodes (cathodes) of the fuel cell stack 22 and processes the cathode exhaust from the air electrodes, a release system 50 that releases water produced in the fuel cell system 20, and a cooling system 50 that cools down the fuel cell stack 22.

The hydrogen supply system 30 includes a hydrogen supply conduit 32 that leads a supply of hydrogen from the high-pressure hydrogen tank 31 into a hydrogen supply path to the anodes, which is formed inside the fuel cell stack 22, and a hydrogen circulation conduit 33 that returns a flow of unreacted hydrogen through a hydrogen exhaust path from the anodes, which is formed inside the fuel cell stack 22, to the hydrogen supply conduit 32. The hydrogen supply conduit 32 has a check valve that prevents a reverse flow of hydrogen to the high-pressure hydrogen tank 31 and a gate valve that works to start or stop supply of hydrogen to the fuel cell stack 22. The hydrogen circulation conduit 33 has a hydrogen pump 34 that pressure feeds hydrogen to the hydrogen supply conduit 32, a gas-liquid separator 38 that liquefies steam contained in the circulated hydrogen for gas-liquid separation, a check valve that prevents a reverse flow of hydrogen to the hydrogen supply conduit 32, and a gate valve that works to stop discharge of exhaust hydrogen from the fuel cell stack 22. Diversity of sensors are attached to the hydrogen supply conduit 32 and the hydrogen circulation conduit 33 to regulate the supply of hydrogen to the fuel cell stack 22 and the operating conditions of the fuel cell stack 22. Typical examples of such sensors include pressure sensors located in the vicinity of an inlet of the fuel cell stack 22 and on the discharge side of the hydrogen pump 34 and temperature sensors located in the vicinity of an outlet of the fuel cell stack 22 and on the discharge side of the hydrogen pump 34. The water separated by the gas-liquid separator 38 is sent to a recovery tank 54 of multiple divisions in the release system 50.

In the air supply discharge system 40, a supply of the air is measured by a mass flow meter 43, is pressurized by an air compressor 44, is humidified by a humidifier 46, and is supplied to the cathodes of the fuel cell stack 22 via an air supply conduit 42. The air (cathode exhaust) from the cathodes of the fuel cell stack 22 is introduced into the humidifier 46 to humidify the supply of the air from the air compressor 44 and runs through a gas-liquid separator 48 for gas-liquid separation. The water separated by the gas-liquid separator 48 is flown through a recovery pipe 52 to the recovery tanks 54 and buffer tanks 57a and 57b, while the separated gas (exhaust gas) is flown through an exhaust gas pipe 51 to the rear portion of the vehicle and is eventually released to the atmosphere. The gas-liquid separator 48 used in this embodiment does not attain complete gas-liquid separation but only imperfectly separates the gas from water. Namely the gas separated by the gas-liquid separator 48 is not completely dried but may contain imperfectly saturated, perfectly saturated, or oversaturated steam or contain small droplets of water in addition to such steam.

The release system 50 temporarily accumulates the water separated by the gas-liquid separator 38 of the hydrogen supply system 30 and the water separated by the gas-liquid separator 48 of the air supply discharge system 40 into the recovery tanks 54 and buffer tanks 57a through 57f and releases the accumulated water via multiple water outlets 58a through 58f (six water outlets in the structure of the first embodiment). A regulator valve 53 is set in the vicinity of the inlet of the recovery tank 54 to regulate the flow of the accumulated water into the recovery tank 54. Release valves 56a through 56f are set in the vicinity of the respective inlets of the buffer tanks 57a through 57f to regulate the flow of the accumulated water into the respective buffer tanks 57a through 57f. Among the buffer tanks 57a through 57f, the buffer tanks 57a and 57b are designed to receive the flow of water directly from the gas-liquid separator 48 via a branch of the recovery pipe 52. The remaining buffer tanks 57c through 57f are designed to receive the flow of water accumulated in the recovery tank 54.

The cooling system 60 circulates a flow of cooling water through a cooling water circulation conduit 62, which includes a cooling water flow path formed inside the fuel cell stack 22, to cool the fuel cell stack 22 down. The cooling water circulation conduit 62 has a cooling water pump 64 to circulate the flow of cooling water and a radiator 66 with a fan to cool down the circulated cooling water with the flow of the outside air. For the purpose of temperature control of the cooling water, temperature sensors to measure the temperature of cooling water are located in the vicinity of an outlet of the fuel cell stack 22 and in the downstream of the radiator 66 in the cooling water circulation conduit 62.

In the fuel cell system 20 having the above configuration, the fuel cell stack 22 is controlled through actuation of the hydrogen pump 34, the air compressor 44, and the cooling water pump 64 and regulation of the openings of the gate valves and flow control valves in response to signals sent from the diverse sensors. The fuel cell system 20 also includes a power control unit (hereafter referred to as PCU) 70 to control a non-illustrated drive motor, a chargeable and dischargeable battery 84, and an inverter for driving the motor. These elements are, however, not essential of the invention, so that illustration and detailed description of these elements are omitted.

As shown in FIG. 1, the fuel cell stack 22 is laid in the lower central area on the front side of the vehicle and the PCU 70 is located above the fuel cell stack 22. The humidifier 46 and the air compressor 44 are located on the left and right front of the fuel cell stack 22. The radiator 66 and another radiator 80 for air conditioning in the passenger compartment are located further ahead. The hydrogen pump 34, the cooling water pump 64, and the gas-liquid separator 38 are also placed in the front portion of the vehicle, although these elements are omitted from the illustration. The gas-liquid separator 48 in the air supply discharge system 40 is located behind the fuel cell stack 22 and on the front lower right side of the driver's seat (the driver's seat on the right-hand drive vehicle). The recovery tank 54 is set below the center area of the passenger compartment of the vehicle. Four high-pressure hydrogen tanks 31a through 31d (generically expressed by a numeral '31') are laid in the lower rear portion of the vehicle. The battery 84 is placed above the high-pressure hydrogen tanks 31a through 31d.

The buffer tanks 57a through 57f are located on the front and rear of front wheels 12a and 12b and on the front of rear wheels 14a and 14b. The water temporarily accumulated in the buffer tanks 57a through 57f is discharged from the water outlets 58a through 58f by free fall. The release and stop of the water flow from the water outlets 58a through 58f is controlled by opening and closing the release valves 56a through 56f. The release valves 56a through 56f are designed to freely adjust their openings A in a range of 0% to 100% by actuation of non-illustrated actuators. Adjustment of the openings A of the respective release valves 56a through 56f regulates the release of water from the water outlets 58a through 58f.

Figure 3:
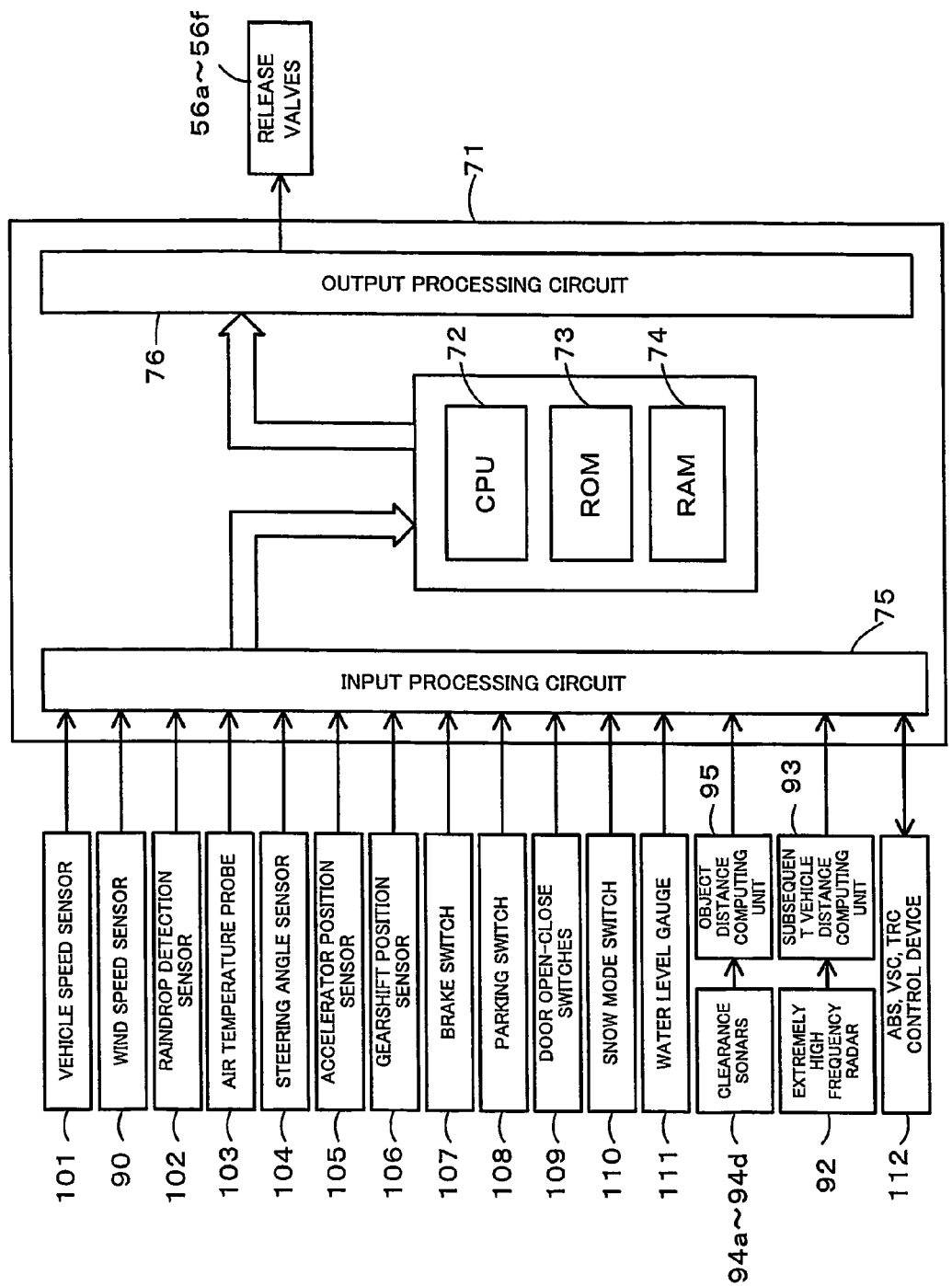
FIG. 3 is a block diagram showing control signals input to and output from an electronic control unit 71, which is built in a PCU 70, for release control of water from water outlets 58a through 58f.

FIG. 3 is a block diagram showing control signals input to and output from an electronic control unit 71, which is built in the PCU 70, for release control of water from the water outlets 58a through 58f. The electronic control unit 71 is constructed as a microprocessor including a CPU 72, a ROM 73 that stores processing programs, a RAM 74 that temporarily stores data, an input processing circuit 75 that receives input signals, and an output processing circuit 76 that outputs signals. The electronic control unit 71 receives, via the input processing circuit 75, a vehicle speed Va measured by and sent from a vehicle speed sensor 101, a wind speed Vw measured by and sent from a wind speed sensor 90 attached to the front center of the vehicle (see FIG. 1), a raindrop sensing signal SWR sent from a raindrop detection sensor 102 that senses the presence of water drops on a front window, an outside air temperature Ta measured by and sent from an air temperature probe 103, a steering angle (the driver's turning angle of a steering wheel) θ measured by and sent from a steering angle sensor 104, an accelerator opening Acc sent from an accelerator position sensor 105 that senses the driver's step-on amount of an accelerator pedal, a gearshift position SP sent from a gearshift position sensor 106 that detects the gearshift position currently set by the driver's gearshift operation, a brake switch signal SWB sent from a brake switch 107 that senses the driver's step-on operation of a brake pedal, and a parking switch signal SWP sent from a parking switch 108 that senses actuation of a parking device. The electronic control unit 71 also receives door open-close switch signals SWD1 through SWD4 sent from door open-close switches 109 that detect the open-close positions of the four doors (left and right doors), a snow mode switch signal SWS sent from a snow mode switch 110 that is set in front of the driver's seat to effectuate drive control during a run on a snow surface or icy surface, a water level HW sent from a water level gauge 111 that measures the water level HW of the water accumulated in the recovery tank 54, object distances Lfl, Lfr, Lrl, and Lrr sent from an object distance computing unit 95 that computes the distances Lfl, Lfr, Lrl, and Lrr from objects (obstacles) located in the directions of four corners of the vehicle in response to signals from clearance sonars 94a through 94d attached to the four corners of the vehicle, a subsequent vehicle distance Lv sent from a subsequent vehicle distance computing unit 93 that computes the distance Lv from a subsequent vehicle in response to a signal from an extremely high frequency radar 92 located on the rear center of the vehicle, and skid reduction control information sent from a skid reduction control device 112 that takes charge of skid reduction controls (ABS, TRC, and VSC) to prevent lock, wheelspin, and skid of wheels. The electronic control unit 71 outputs driving signals to non-illustrated actuators of the release valves 56a through 56f via the output processing circuit 76.

Figure 4:
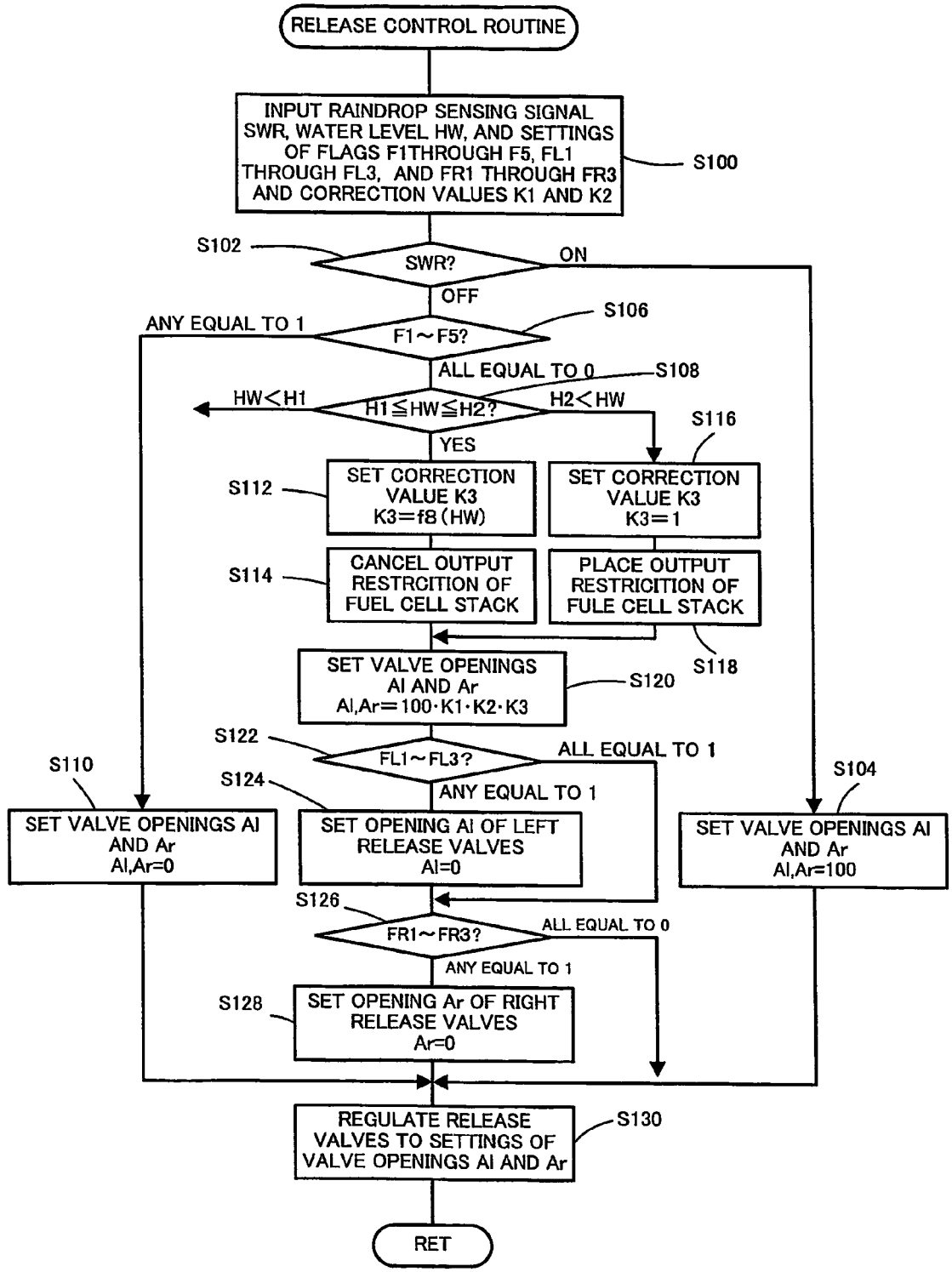
FIG. 4 is a flowchart showing a release control routine executed by the electronic control unit 71.

The following describes series of operations to release the water produced by the fuel cell stack 22 in the fuel cell system 20 mounted on the fuel cell vehicle 10 of the first embodiment constructed as discussed above. FIG. 4 is a flowchart showing a release control routine executed by the electronic control unit 71. This release control routine is carried out repeatedly at preset time intervals (for example, at every 20 msec). The release control routine uses multiple release prohibition flags F1 through F5, FL1 through FL3, and FR1 through FR3 and correction values K1 through K3 to adjust the openings A of the release valves 56a through 56f and thereby regulate the release of water from the respective water outlets 58a through 58f. The release prohibition flags F1 through F5, FL1 through FL3, and FR1 through FR3 and the correction values K1 and K2 are set according to a driving state correction value and flag setting routine of FIG. 5, a vehicle attitude flag setting routine of FIG. 6, a turn flag setting routine of FIG. 7, an obstacle correction value and flag setting routine of FIG. 8, and a loading/unloading flag setting routine of FIG. 9, which are repeatedly carried out at preset time intervals (for example, at every 20 msec). For convenience of explanation, the description first regards the process of setting the release prohibition flags F1 through F5, FL1 through FL3, and FR1 through FR3 and the correction values K1 and K2, and then the procedure of release control.

Figure 5:
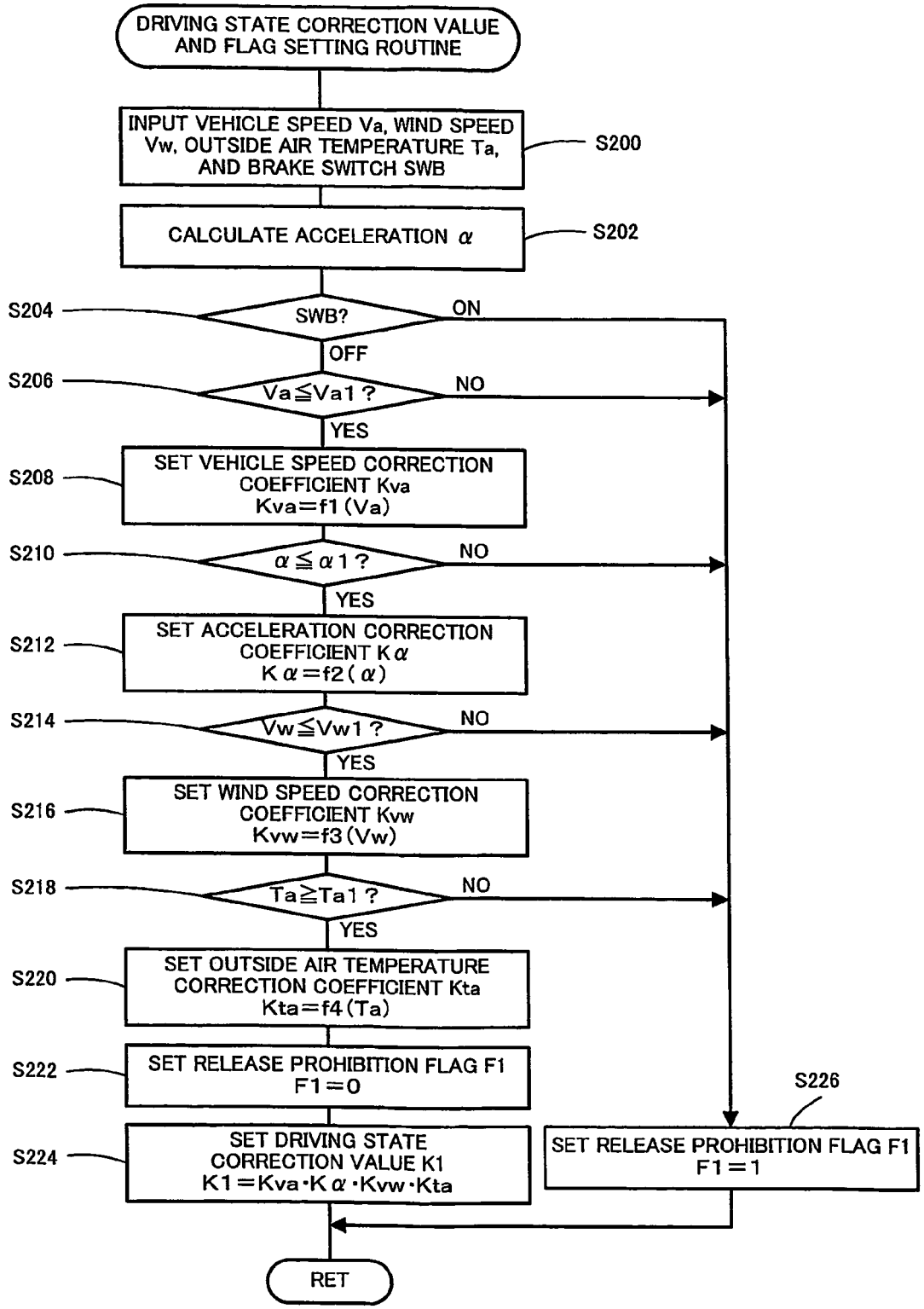
FIG. 5 is a flowchart showing a driving state correction value and flag setting routine, which sets a release prohibition flag F1 and a correction value K1.

When the driving state correction value and flag setting routine of FIG. 5 starts, the CPU 72 of the electronic control unit 71 first inputs data required for setting the driving state correction value K1 and the release prohibition flag F1, for example, the vehicle speed Va from the vehicle speed sensor 101, the wind speed Vw from the wind speed sensor 90, the outside air temperature Ta from the air temperature probe 103, and the brake switch signal SWB from the brake switch 107 (step S200). The CPU 72 then calculates an acceleration α of the vehicle from the input vehicle speed Va (step S202), and checks the on-off state of the brake switch signal SWB (step S204). In response to the on state of the brake switch signal SWB, the routine sets a value '1' to the release prohibition flag F1 to prohibit the release of water from the water outlets 58a through 58f and thereby prevent potential deterioration of the braking performance due to the release of water (step S226), before being terminated.

Figure 10:
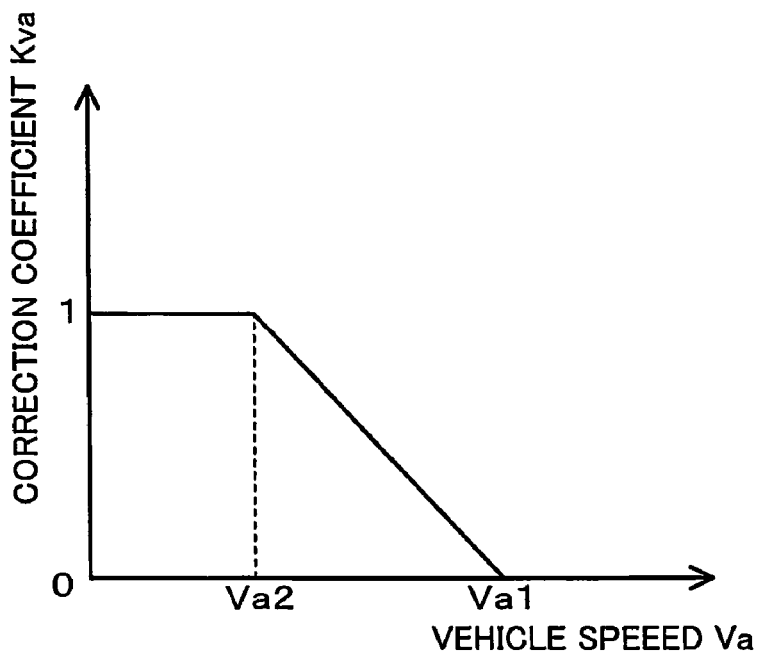
FIG. 10 is an example of a vehicle speed correction coefficient setting map.

In response to the off state of the brake switch signal SWB, on the other hand, the input vehicle speed Va is compared with a preset threshold value Va1 (step S206). The threshold value Va1 depends upon the characteristics of the vehicle and is set as a vehicle speed (for example, 90 km/h) that does not prevent the water released from the water outlets 58a through 58f from being swirled on and scattered by the vehicle wind. When the input vehicle speed Va is greater than the threshold value Va1, the routine sets the value '1' to the release prohibition flag F1 to prohibit the release of water from the water outlets 58a through 58f (step S226), before being terminated. Such setting aims to prevent the water released from the water outlets 58a through 58f from being swirled on and scattered by the vehicle wind and being splashed on the front window of any vehicle running behind or on the side. When the input vehicle speed Va is not greater than the threshold value Va1, on the other hand, the routine sets a vehicle speed correction coefficient Kva based on the input vehicle speed Va (step S208). The vehicle speed correction coefficient Kva is set smaller to restrict the release of water from the water outlets 58a through 58f with an increase in vehicle speed Va. In the structure of the first embodiment, a variation in vehicle speed correction coefficient Kva against the vehicle speed Va is set in advance and stored as a vehicle speed correction coefficient setting map in the ROM 73. The procedure of the first embodiment reads and sets the vehicle speed correction coefficient Kva corresponding to the given vehicle speed Va from the vehicle speed correction coefficient setting map. One example of the vehicle speed correction coefficient setting map is shown in FIG. 10. In this illustrated example, the vehicle speed correction coefficient Kva is fixed to a value '1' until the vehicle speed Va reaches a value Va2 that is smaller than the threshold value Va1, and then decreases with an increase in vehicle speed Va from the value Va2.

Figure 11:
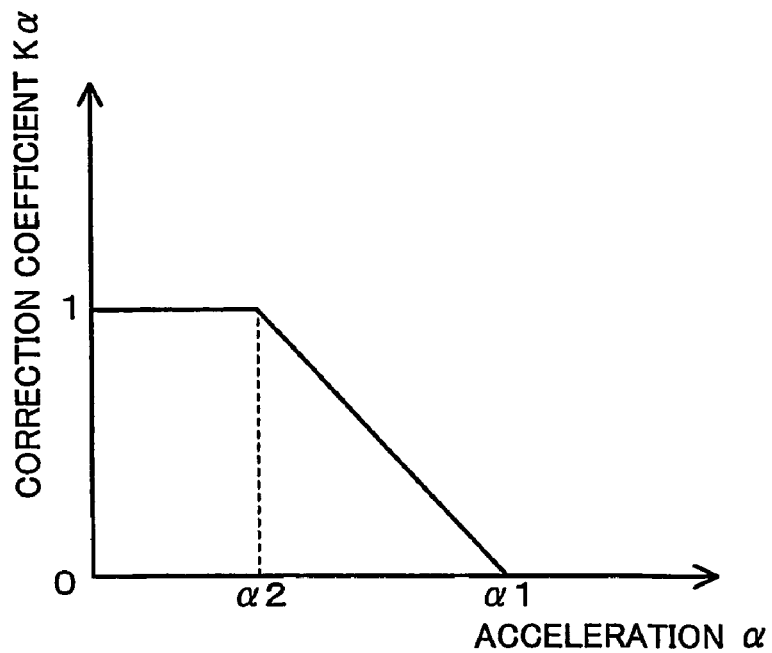
FIG. 11 is an example of a acceleration correction coefficient setting map.

After setting the vehicle speed correction coefficient Kva, the calculated acceleration α is compared with a preset threshold value α1 (step S210). The threshold value α1 is set as an acceleration on the occasion of a jackrabbit start of the vehicle. The jackrabbit start of the vehicle may cause a skid of drive wheels according to the condition of the road surface. One typical condition of the road surface causing a skid of the drive wheels is a wet road surface. The threshold value α1 is accordingly set as a reference acceleration to estimate the potential of a skid of the drive wheels by release of the water from the water outlets 58a through 58f. When the calculated acceleration α is greater than the threshold value α1, the routine estimates a relatively high potential of a skid of the drive wheels and sets the value '1' to the release prohibition flag F1 to prohibit the release of the water from the water outlets 58a through 58f and thereby prevent the potential skid of the drive wheels (step S226), before being terminated. When the calculated acceleration α is not greater than the threshold value α1, on the other hand, the routine estimates a very low potential of a skid of the drive wheels and sets an acceleration correction coefficient Kα based on the calculated acceleration α (step S212). The acceleration correction coefficient Kα is set smaller to restrict the release of the water from the water outlets 58a through 58f with an increase in acceleration α. In the structure of the first embodiment, a variation in acceleration correction coefficient Kα against the acceleration α is set in advance and stored as an acceleration correction coefficient setting map in the ROM 73. The procedure of the first embodiment reads and sets the acceleration correction coefficient Kα corresponding to the given acceleration α from the acceleration correction coefficient setting map. One example of the acceleration correction coefficient setting map is shown in FIG. 11. In this illustrated example, the acceleration coefficient Kα is fixed to a value '1' until the acceleration α reaches a value α2 that is smaller than the threshold value α1, and then decreases with an increase in acceleration α from the value α2.

Figure 12:
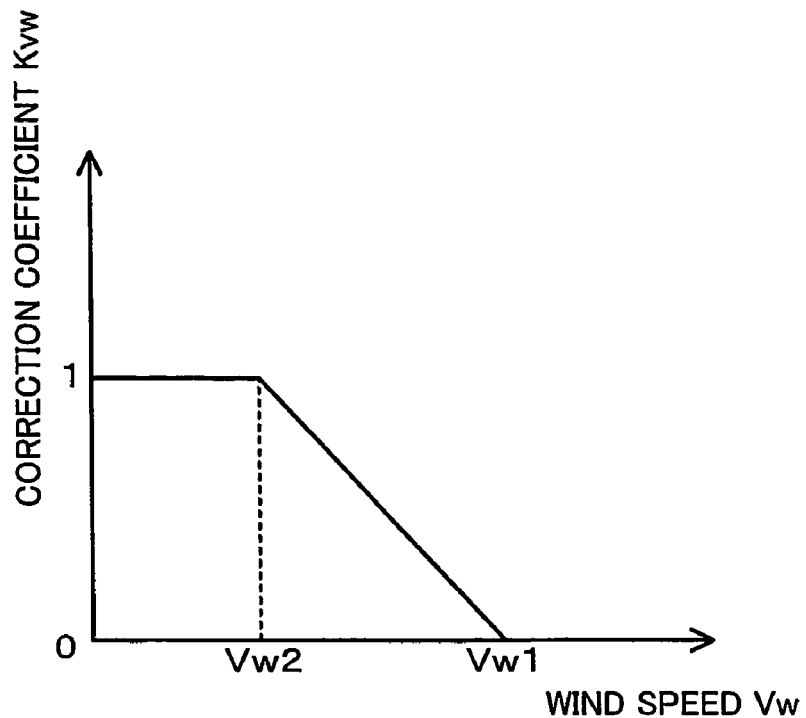
FIG. 12 is an example of a wind speed correction coefficient setting map.

After setting the acceleration correction coefficient Kα, the input wind speed Vw is compared with a preset threshold value Vw1 (step S214). The threshold value Vw1 is set as a wind speed (for example, 20 m/s) that does not prevent the water released from the water outlets 58a through 58f from being swirled on and scattered by the vehicle wind or the flow of the air relative to the running vehicle. When the input wind speed Vw is greater than the threshold value Vw1, the routine sets the value '1' to the release prohibition flag F1 to prohibit the release of water from the water outlets 58a through 58f (step S226), before being terminated. Such setting aims to prevent the water released from the water outlets 58a through 58f from being swirled on and scattered by the vehicle wind and being splashed on the front window of any vehicle running behind or on the side. When the input wind speed Vw is not greater than the threshold value Vw1, on the other hand, the routine sets a wind speed correction coefficient Kvw based on the input wind speed Vw (step S216). The wind speed correction coefficient Kvw is set smaller to restrict the release of water from the water outlets 58a through 58f with an increase in wind speed Vw. In the structure of the first embodiment, a variation in wind speed correction coefficient Kvw against the wind speed Vw is set in advance and stored as a wind speed correction coefficient setting map in the ROM 73. The procedure of the first embodiment reads and sets the wind speed correction coefficient Kvw corresponding to the given wind speed Vw from the wind speed correction coefficient setting map. One example of the wind speed correction coefficient setting map is shown in FIG. 12. In this illustrated example, the wind speed correction coefficient Kvw is fixed to a value '1' until the wind speed Vw reaches a value Vw2 that is smaller than the threshold value Vw1, and then decreases with an increase in wind speed Vw from the value Vw2.

Figure 13:
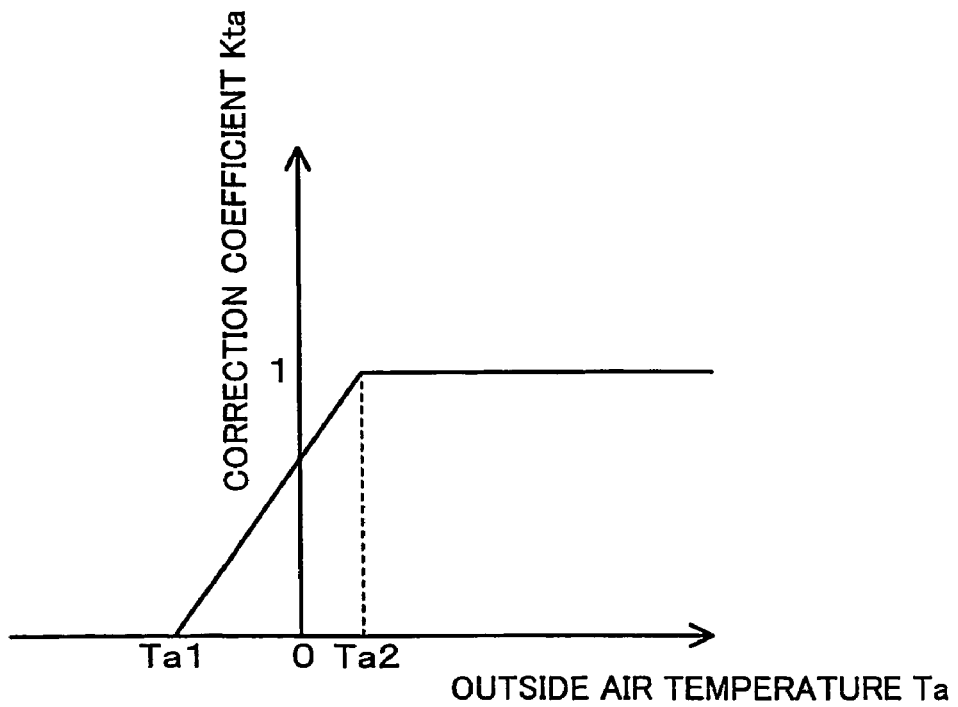
FIG. 13 is an example of a outside air temperature correction coefficient setting map.

After setting the wind speed correction coefficient Kvw, the input outside air temperature Ta is compared with a preset threshold value Ta1 (step S218). The threshold value Ta1 is set as an outside air temperature that freezes the released water prior to being evaporated or being soaked into the road surface. The threshold value Ta1 is accordingly set to prevent the released water from being frozen. When the input outside air temperature Ta is lower than the threshold value Ta1, the routine sets the value '1' to the release prohibition flag F1 to prohibit the release of water from the water outlets 58a through 58f and thereby prevent the road surface from being icy with the released water (step S226), before being terminated. When the input outside air temperature Ta is not lower than the threshold value Ta1, on the other hand, the routine sets an outside air temperature correction coefficient Kta based on the input outside air temperature Ta (step S220). The outside air temperature correction coefficient Kta is set smaller to restrict the release of water from the water outlets 58a through 58f with a decrease in outside air temperature Ta. In the structure of the first embodiment, a variation in outside air temperature correction coefficient Kta against the outside air temperature Ta is set in advance and stored as an outside air temperature correction coefficient setting map in the ROM 73. The procedure of the first embodiment reads and sets the outside air temperature correction coefficient Kta corresponding to the given outside air temperature Ta from the outside air temperature correction coefficient setting map. One example of the outside air temperature correction coefficient setting map is shown in FIG. 13. In this illustrated example, the outside air temperature correction coefficient Kta is fixed to a value '1' when the outside air temperature Ta is higher than a value Ta2 that is greater than the threshold value Ta1, and then decreases with a decrease in outside air temperature Ta from the value Ta2.

On completion of setting the respective correction coefficients Kva, Kα, Kvw, and Kta, the routine sets a value '0' to the release prohibition flag F1 (step S222) and subsequently sets the product of the settings of the respective correction coefficients Kva, Kα, Kvw, and Kta to the driving state correction value K1 (step S224), before being terminated. The driving state correction value K1 restricts the release of water from the water outlets 58a through 58f, based on the driving conditions, for example, the vehicle speed Va, the acceleration α, the wind speed Vw, and the outside air temperature Ta.

Figure 6:
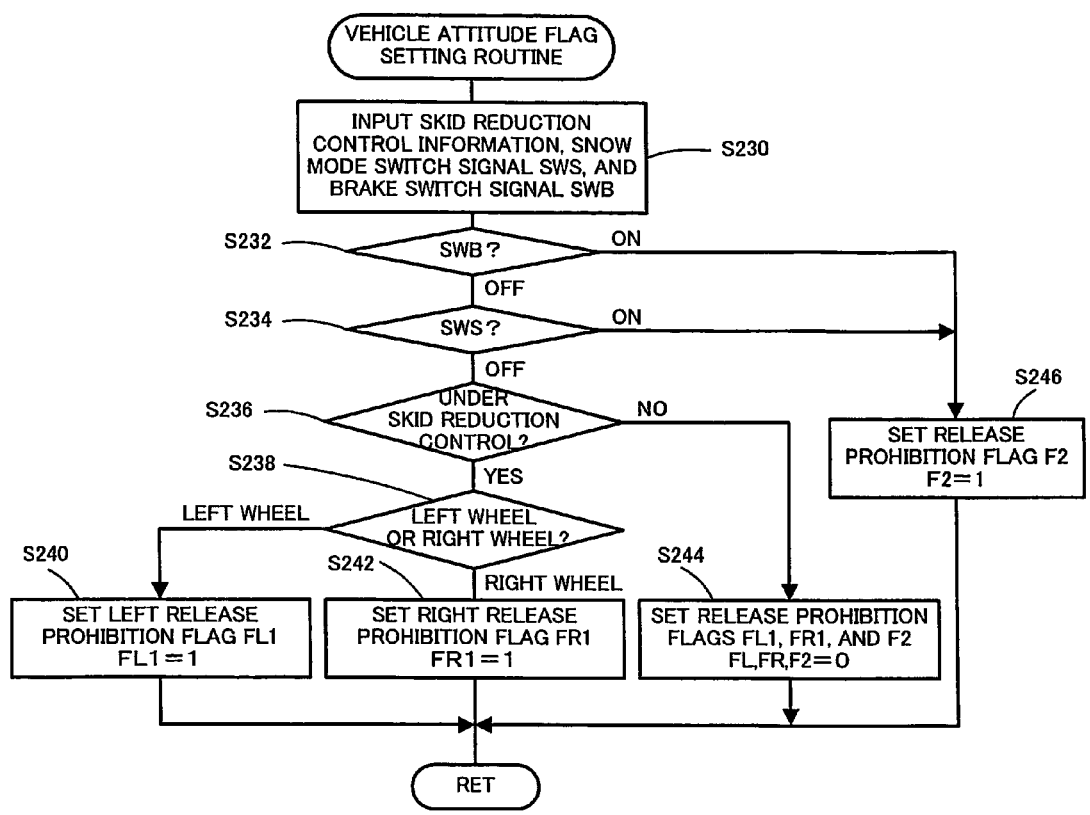
FIG. 6 is a flowchart showing a vehicle attitude flag setting routine, which sets prohibition flags F2, FL1, and FR1.

When the vehicle attitude flag setting routine of FIG. 6 starts, the CPU 72 of the electronic control unit 71 first inputs data required for setting the release prohibition flag F2 and the left and right release prohibition flags FL1 and FR1, for example, the skid reduction control information from the skid reduction control device 112, the snow mode switch signal SWS from the snow mode switch 110, and the brake switch signal SWB from the brake switch 107 (step S230). The routine then successively detects the conditions of the input brake switch signal SWB and the input snow mode switch signal SWS (steps S232 and S234). In response to the ON state of the brake switch signal SWB, the routine sets the value '1' to the release prohibition flag F2 to prohibit the release of water from the water outlets 58a through 58f and thereby prevent potential deterioration of the braking performance due to the release of water from the water outlets 58a through 58f (step S246), before being terminated. In response to the ON state of the snow mode switch signal SWS, the routine sets the value '1' to the release prohibition flag F2 to prohibit the release of water from the water outlets 58a through 58f, before being terminated (step S246). Such setting aims to prevent potential disadvantages caused by the released water during a run of the vehicle on the snowy or icy road surface, for example, a significantly high potential for a skid due to the decreasing frictional coefficient by the released water and a significantly high potential for a skid due to the icy road surface with the released water. In response to the OFF state of both the brake switch signal SWB and the snow mode switch signal SWS, the routine determines whether the current state is under skid reduction control, based on the input skid reduction control information (step S236). When the current state is not under skid reduction control, the routine sets the value '0' to the release prohibition flag F2 and the left and right release prohibition flags FL1 and FR1 (step S244), before being terminated. When the current state is under skid reduction control, on the other hand, the routine determines whether the left wheel or the right wheel is under skid reduction control (step S238). When the left wheel is under skid reduction control, the routine sets the value '1' to the left release prohibition flag FL1 to prohibit the release of water from the left water outlets 58a, 58c, and 58e, which may adversely affect the skid of the left wheel (step S240), before being terminated. When the right wheel is under skid reduction control, the routine sets the value '1' to the right release prohibition flag FR1 to prohibit the release of water from the right water outlets 58b, 58d, and 58f, which may adversely affect the skid of the right wheel (step S242), before being terminated.

Figure 7:
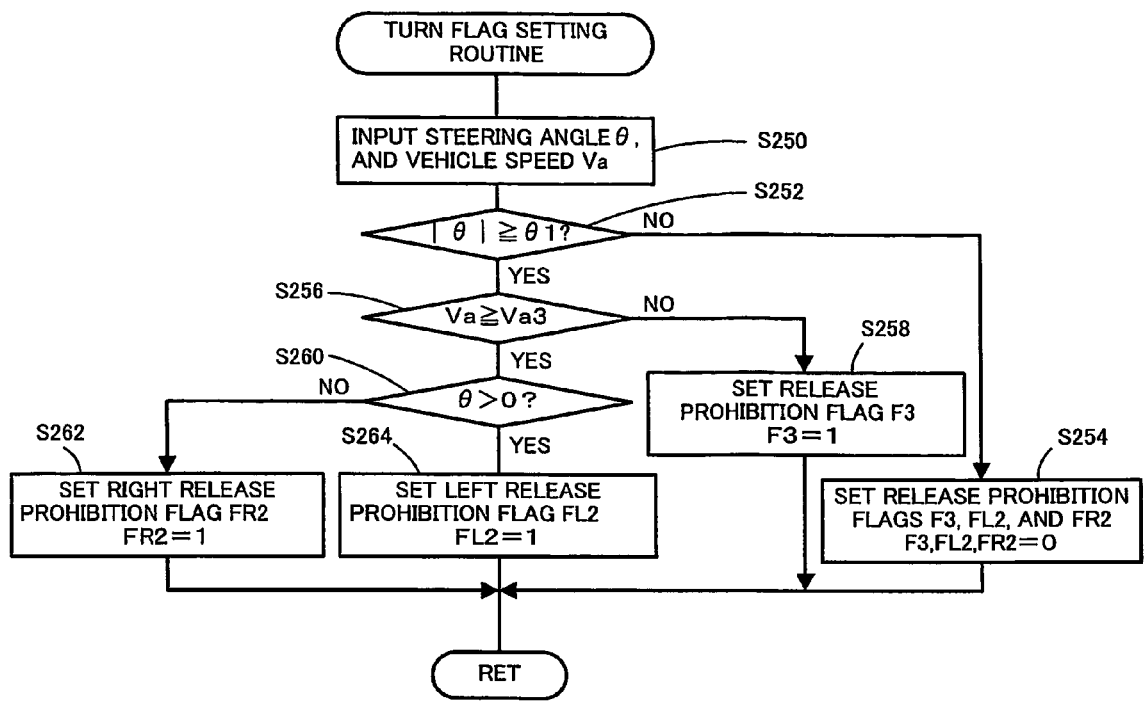
FIG. 7 is a flowchart showing a turn flag setting routine, which sets prohibition flags F3, FL2, and FR2.

When the turn flag setting routine of FIG. 7 starts, the CPU 72 of the electronic control unit 71 first inputs data required for setting the release prohibition flag F3 and the left and right release prohibition flags FL2 and FR2, for example, the steering angle θ from the steering angle sensor 104 and the vehicle speed Va from the vehicle speed sensor 101 (step S250). The absolute value of the input steering angle θ is compared with a preset threshold value θ1 (step S252). The threshold value θ1 is a reference value for detecting a turn of the vehicle with a clockwise or counterclockwise turn of the steering wheel. In the structure of the first embodiment, a negative value of the steering angle θ represents a counterclockwise turn of the steering wheel, whereas a positive value of the steering wheel θ represents a clockwise turn of the steering wheel. When the absolute value of the steering angle θ is less than the threshold value θ1, the routine estimates no turn or a turn with a large turning radius and sets the value '0' to the release prohibition flag F3 and the left and right release prohibition flags FL2 and FR2 (step S254), before being terminated. When the absolute value of the steering angle θ is not less than the threshold value θ1, on the other hand, the input vehicle speed Va is compared with a preset threshold value Va3 (step S256). The threshold value Va3 is a reference vehicle speed on the left turn or on the right turn of the vehicle at the intersection and is set equal to, for example, 30 km/h. When the input vehicle speed Va is less than the threshold value Va3, the routine estimates a left turn or a right turn at the intersection and sets the value '1' to the release prohibition flag F3 to prohibit the release of water from the water outlets 58a through 58f and thereby prevent a puddle from being left at the intersection (step S258), before being terminated. When the input vehicle speed Va is not less than the threshold value Va3, on the other hand, the routine detects either a positive setting or a negative setting of the steering angle θ (step S260). When the steering angle θ is a negative setting, that is, in the case of a counter-clockwise turn of the steering wheel, the routine sets the value '1' to the right release prohibition flag FR2 to restrain a potential skid of the right wheel, which is the outer wheel on the left turn (step S262), before being terminated. When the steering angle θ is a positive setting, that is, in the case of a clockwise turn of the steering wheel, on the contrary, the routine sets the value '1' to the left release prohibition flag FL2 to restrain a potential skid of the left wheel, which is the outer wheel on the right turn (step S264), before being terminated.

Figure 8:
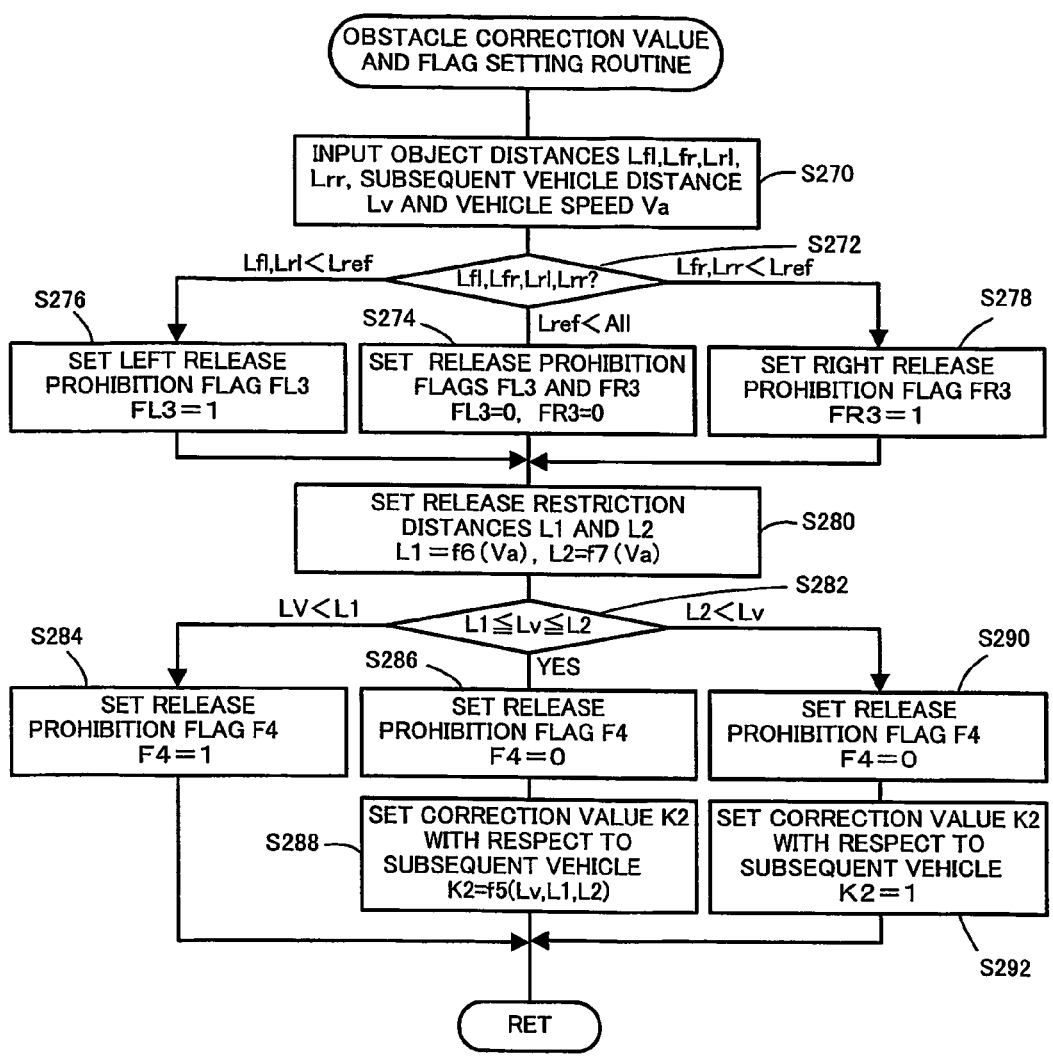
FIG. 8 is a flowchart showing an obstacle correction value and flag setting routine, which sets a prohibition flag F4 and a correction value K2.

When the obstacle correction value and flag setting routine of FIG. 8 starts, the CPU 72 of the electronic control unit 71 first inputs data required for setting the release prohibition flag F4, the left and right release prohibition flags FL3 and FR3, and the correction value K2 with respect to the subsequent vehicle, for example, the object distances Lfl, Lfr, Lrl, and Lrr from the object distance computing unit 95 and the subsequent vehicle distance Lv from the subsequent vehicle distance computing unit 93, and the vehicle speed Va from the vehicle speed sensor 101 (step S270) The input object distances Lfl, Lfr, Lrl, and Lrr are compared with a preset threshold value Lref (step S272). The threshold value Lref represents a non-swash area where the water released from the water outlets 58a through 58f does not swash on the object, and is set equal to, for example, 50 cm and 1 m. When all the input object distances Lfl, Lfr, Lrl, and Lrr are not less than the threshold value Lref, the routine sets the value '0' to the left and right release prohibition flags FL3 and FR3 (step S274). When either one of the object distances Lfl and Lrl computed in response to the signals from the left clearance sonars 94a and 94c, among the input object distances Lfl, Lfr, Lrl, and Lrr, is less than the threshold value Lref, the routine sets the value '1' to the left release prohibition flag FL3 and thereby prevents the water released from the left water outlets 58a, 58c, and 58e from being splashed on the object (step S276). When either one of the object distances Lfr and Lrr computed in response to the signals from the right clearance sonars 94b and 94d, among the input object distances Lfl, Lfr, Lrl, and Lrr, is less than the threshold value Lref, the routine sets the value '1' to the right release prohibition flag FR3 and thereby prevents the water released from the right water outlets 58b, 58d, and 58f from being splashed on the object (step S278).

Figure 14:
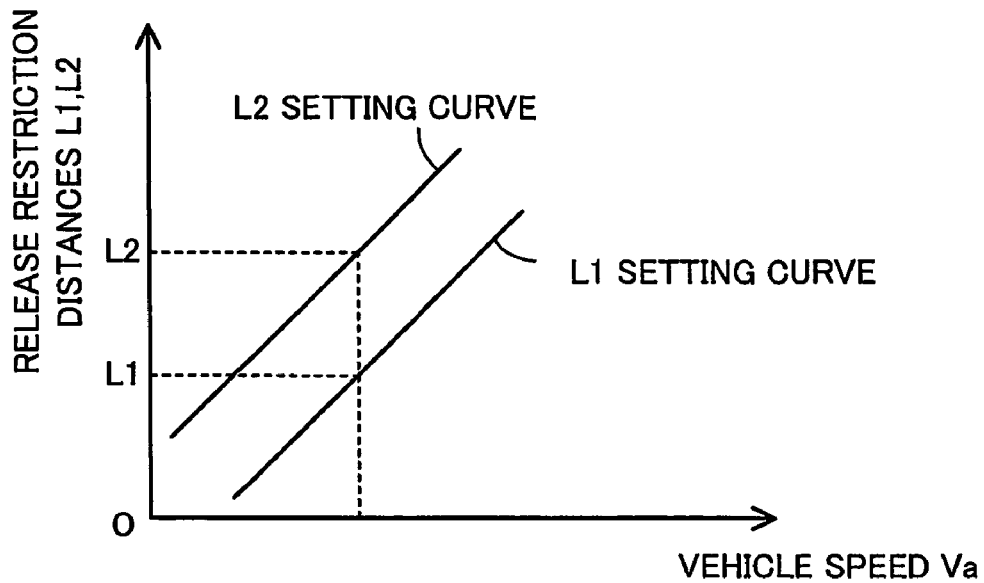
FIG. 14 is an example of a release restriction distance setting map.

After setting the left and right release prohibition flags FL3 and FR3, the routine sets release restriction distances L1 and L2 based on the input vehicle speed Va, in order to prevent the water released from the water outlets 58a through 58f from being swirled on and scattered by the vehicle wind and being splashed on the front window of any vehicle running behind or on the side (step S280). The release restriction distance L1 represents a reference distance from the subsequent vehicle with necessity of prohibiting the release of water from the water outlets 58a through 58f, whereas the release restriction distance L2 represents a reference distance from the subsequent vehicle with no necessity of restricting the release of water from the water outlets 58a through 58f. The release restriction distances L1 and L2 increase with an increase in vehicle speed Va. In the structure of the first embodiment, variations in release restriction distances L1 and L2 against the vehicle speed Va are set in advance and stored as a release restriction distance setting map in the ROM 73. The procedure of the first embodiment reads and sets the release restriction distances L1 and L2 corresponding to the given vehicle speed Va from the release restriction distance setting map. One example of the release restriction distance setting map is shown in FIG. 14. In this illustrated example, the release restriction distances L1 and L2 are set according to an L1 setting curve for the release restriction distance L1 against the vehicle speed Va and an L2 setting curve for the release restriction distance L2 against the vehicle speed Va.

Figure 15:
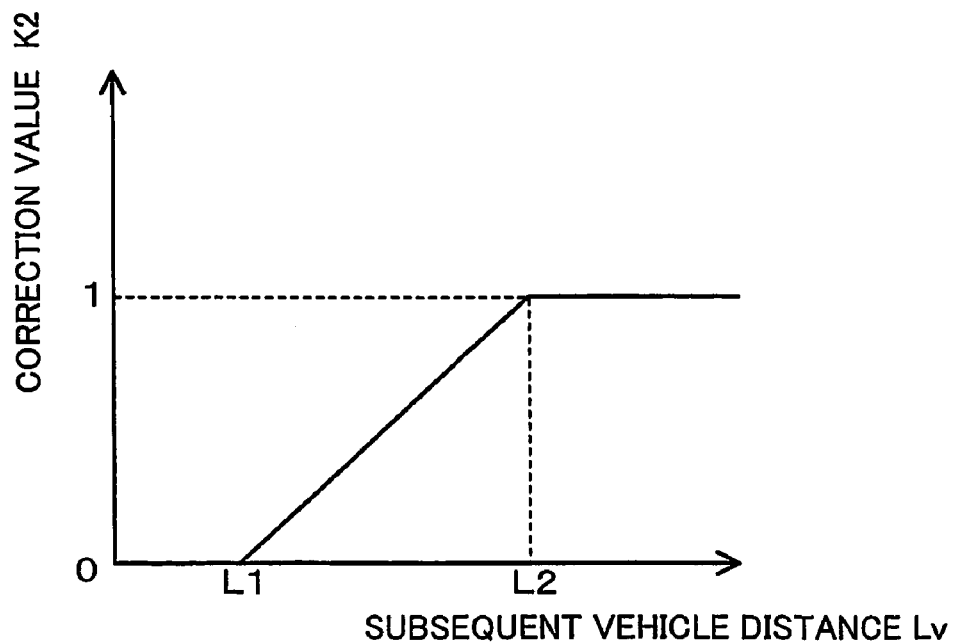
FIG. 15 shows a variation in correction value K2 against subsequent vehicle distance Lv relative to release restriction distances L1 and L2.

On completion of setting the release restriction distances L1 and L2, the routine compares the input subsequent vehicle distance Lv with the settings of the release restriction distances L1 and L2 (step S282). When the input subsequent vehicle distance Lv is less than the release restriction distance L1, the routine sets the value '1' to the release prohibition flag F4 to prohibit the release of water from the water outlets 58a through 58f (step S284), before being terminated. When the input subsequent vehicle distance Lv is not less than the release restriction distance L1 but is not greater than the release restriction distance L2, the routine sets the value '0' to the release prohibition flag F4 (step S286) and subsequently sets the correction value K2 based on the input subsequent vehicle distance Lv and the settings of the release restriction distances L1 and L2 to restrict the release of water from the water outlets 58a through 58f (step S288), before being terminated. The smaller setting of the correction value K2 restricts the release of water from the water outlets 58a through 58f to the greater degree. A variation in correction value K2 against the subsequent vehicle distance Lv relative to the release restriction distances L1 and L2 is shown in FIG. 15. In this illustrated example, the correction value K2 increases with an increase of the subsequent vehicle distance Lv from the release restriction distance L1, and is fixed to the value '2' after the subsequent vehicle distance Lv reaches the release restriction distance L2. When the subsequent vehicle distance Lv is greater than the release restriction distance L2, the routine sets the value '0' to the release prohibition flag F4 (step S290) and subsequently sets the value '1' to the correction value K2 to give no restriction of water release from the water outlets 58a through 58f (step S292), before being terminated.

Figure 9:
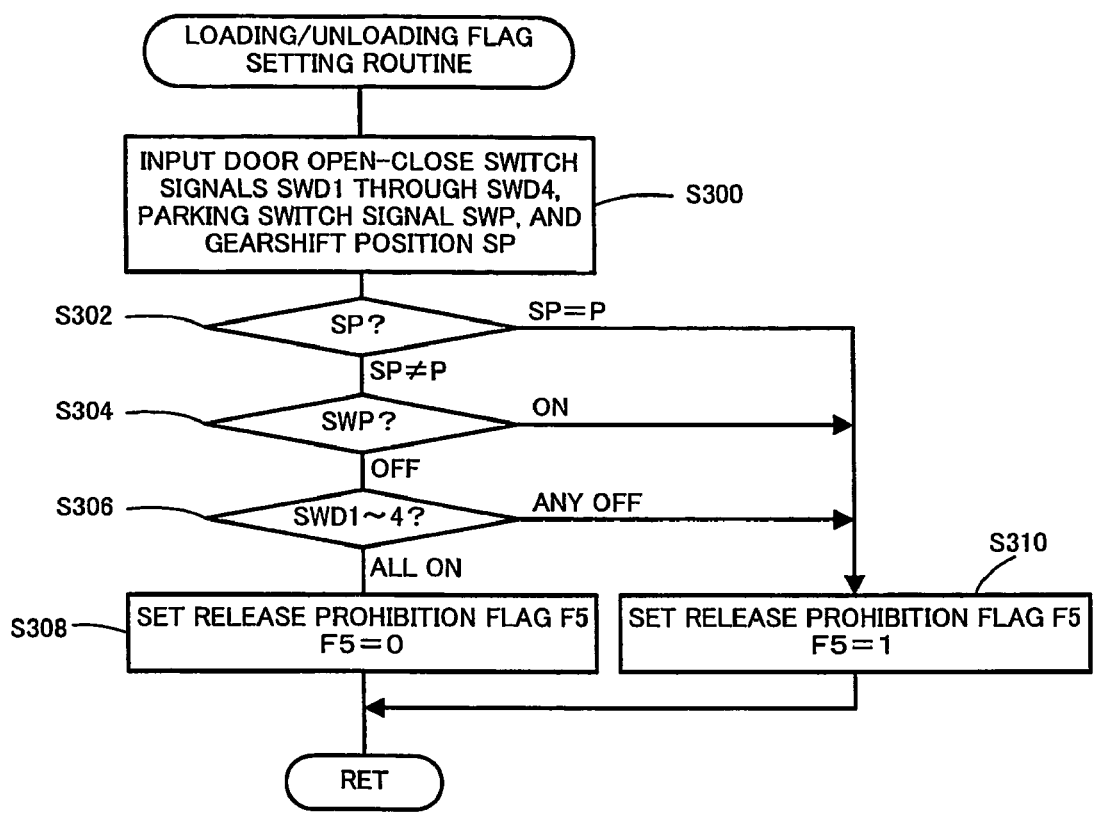
FIG. 9 is a flowchart showing a loading/unloading flag setting routine which sets a prohibition flag F5.

The loading/unloading flag setting routine of FIG. 9 starts, the CPU 72 of the electronic control unit 71 first inputs data required for setting the release prohibition flag F5, for example, the door open-close switch signals SWD1 through SWD4 from the door open-close switches 109, the gearshift position SP from the gearshift position sensor 106, and the parking switch signal SWP from the parking switch 108 (step S300). The routine successively determines whether the input gearshift position SP is currently at a position P (step S302), whether the input parking switch signal SWP is ON (step S304), and whether the input door open-close switch signals SWD1 through SWD4 are ON (step S306). When the gearshift position SP is currently at the position P, when the parking switch signal SWP is ON, or when any of the door open-close switch signals SWD1 through SWD4 is OFF, the routine assumes that a driver or a passenger is currently getting on or off the passenger compartment of the vehicle and sets the value '1' to the release prohibition flag F5 (step S310), before being terminated. Such setting prohibits the release of water from the water outlets 58a through 58f and thereby prevents the water released from the water outlets 58a through 58f from swashing on the driver or passenger getting on or off the vehicle. When the gearshift position SP is currently not at the position P, when the parking switch signal SWP is OFF, and all the door open-close switch signals SWD1 through SWD4 are ON, the routine assumes that no drive or passenger is currently getting on or off the vehicle and sets the value '0' to the release prohibition flag F5 (step S308), before being terminated.

The release control routine of FIG. 4 controls the release of water from the water outlets 58a through 58f, based on the settings of the release prohibition flags F1 through F5, FL1 through FL3, and FR1 through FR3, and the correction values K1 and K2, as discussed below. When the release control routine of FIG. 4 starts, the CPU 72 of the electronic control unit 71 first inputs data required for the release control of water from the water outlets 58a through 58f, for example, the raindrop sensing signal SWR from the raindrop detection sensor 102, the water level HW from the water level gauge 111, and the settings of the release prohibition flags F1 through F5, FL1 through FL3, and FRI through FR3, and the correction values K1 and K2 (step S100). The routine subsequently determines whether the raindrop sensing signal SWR is ON, that is, whether the presence of raindrops is sensed (step S102). In response to the ON state of the raindrop sensing signal SWR, that is, in response to sensing the presence of raindrops, the routine assumes that the road surface is wet with rain and there is no need of restricting the release of water from the water outlets 58a through 58f. The routine accordingly sets 100% to an opening Al of the left release valves 56a, 56c, and 56e and to an opening Ar of the right release valves 56b, 56d, and 56f (step S104) and drives the actuators of the release valves 56a through 56f to regulate the openings of the release valves 56a through 56f to the settings of the valve openings Al and Ar (step S130), before being terminated. Namely the release valves 56a through 56f are set in the full-open position under such conditions. In the condition of the wet road surface in the rain, rain water is naturally swirled on and scattered by the vehicle wind. There is accordingly no disadvantage that the water released from the water outlets 58a through 58f, as well as the rain water, is swirled on and scattered by the vehicle wind.

In response to the OFF state of the raindrop sensing signal SWR, that is, in response to no sensing the presence of raindrops, on the other hand, the routine checks the settings of the release prohibition flags F1 through F5 (step S106). When the setting of any of the release prohibition flags F1 through F5 is equal to 1, the routine sets 0% to the valve openings Al and Ar of the release valves 56a through 56f (step S110) and drives the actuators of the release valves 56a through 56f to regulate the openings of the release valves 56a through 56f to the settings of the valve openings Al and Ar (step S130), before being terminated. Namely the release valves 56a through 56f are set in the full-closed position under such conditions. As discussed previously in the process of setting the value '1' to any of the release prohibition flags F1 through F5 in the respective setting routines of FIGS. 5 through 9, this arrangement effectively prevents the water released from the water outlets 58a through 58f from being swirled on and scattered by the vehicle wind and being splashed on the front window of any vehicle running behind or on the side. This arrangement also restrains potential deterioration of the braking performance due to the release of water from the water outlets 58a through 58f. The arrangement further prevents a puddle from being left at the intersection by the release of water from the water outlets 58a through 58f, thereby protecting the driver or passenger getting on or off the vehicle from splash of water released from the water outlets 58a through 58f.

Figure 16:
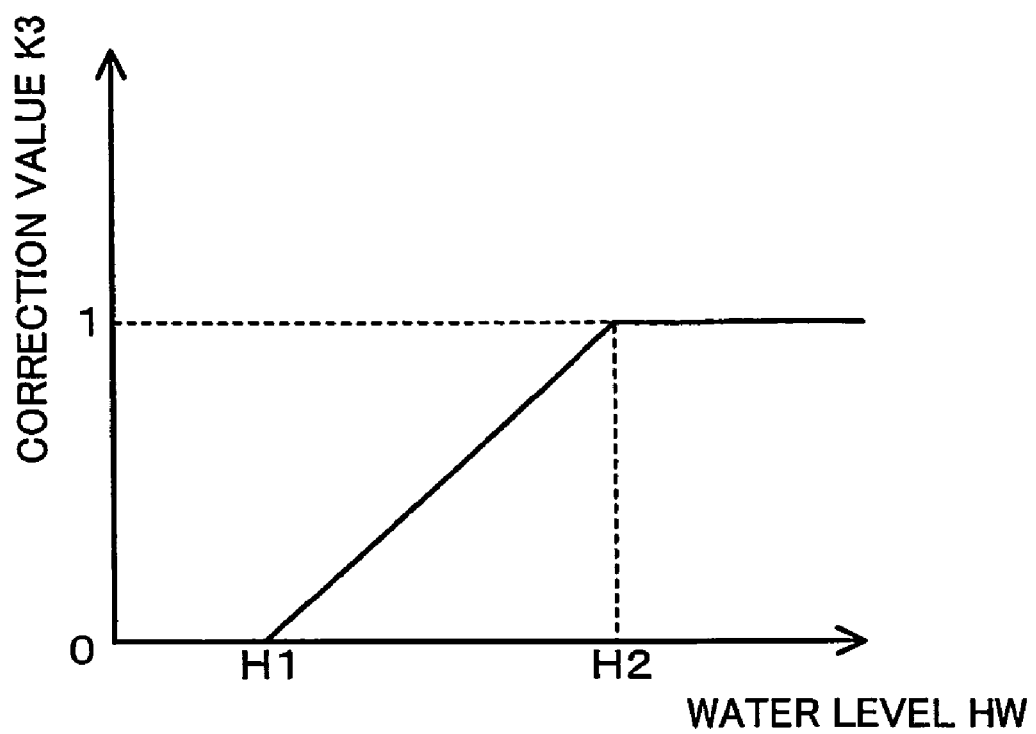
FIG. 16 shows a variation in correction value K3 against the water level HW relative to the threshold values H1 and H2.

When all the release prohibition flags F1 through F5 are equal to 0, the input water level HW of the recovery tank 54 is compared with threshold values H1 and H2 (step S108). The threshold value H1 is a reference water level that allows a sufficient amount of water to be received from the gas-liquid separator 48 into the recovery tank 54 and is set equal to, for example, 30% or 40% of the whole capacity of the recovery tank 54. The threshold value H2 is a reference water level that estimates a substantially full level of the recovery tank 54 and is set equal to, for example, 90% of the whole capacity of the recovery tank 54. When the input water level HW of the recovery tank 54 is less than the threshold value H1, the routine sets 0% to the valve openings Al and Ar of the release valves 56a through 56f to eliminate a potential disadvantage due to the release of water from the water outlets 58a through 58f (step S110), and drives the actuators of the release valves 56a through 56f to regulate the openings of the release valves 56a through 56f to the settings of the valve openings Al and Ar (step S130), before being terminated. When the input water level HW of the recovery tank 54 is not less than the threshold value H1 but is not greater than the threshold value H2, the routine sets a correction value K3 to enhance the release of water from the water outlets 58a through 58f in response to the higher water level HW (step S112), and cancels an output restriction when being placed to limit the output from the fuel cell stack 22 (step S114). In the structure of the first embodiment, a variation in correction value K3 against the water level HW is set in advance and stored as a correction value setting map in the ROM 73. The procedure of the first embodiment reads and sets the correction value K3 corresponding to the given water level HW from the correction value setting map. The smaller setting of the correction value K3 restricts the release of water from the water outlets 58a through 58f to the greater degree. A variation in correction value K3 against the water level HW relative to the threshold values H1 and H2 is shown in FIG. 16. In this illustrated example, the correction value K3 increases with a rise of the water level HW from the threshold value H1 and is fixed to the value '1' after the water level HW reaches the threshold value H2. When the input water level HW is greater than the threshold value H2, the routine sets the value '1' to the correction value K3 (step S116) and places the output restriction to limit the output from the fuel cell stack 22 (step S118). The output restriction of the fuel cell stack 22 controls a DC/DC converter connecting with a non-illustrated output terminal of the fuel cell stack 22 and other relevant elements to limit the output from the fuel cell stack 22 and supplements an insufficient electric power from the battery 84. The output restriction of the fuel cell stack 22 reduces the quantity of water produced by the fuel cell stack 22 per unit time and thereby effectively prevents the recovery tank 54 from reaching its full level.

After setting the correction value K3, the routine sets the valve openings Al and Ar of the release valves 56a through 56f as the product of the setting of the correction value K3, the input correction values K1 and K2, and the value '100' (step S120) and subsequently checks the settings of the left release prohibition flags FL1 through FL3 (step S122). When the setting of any of the left release prohibition flags FL1 through FL3 is equal to 1, the routine sets 0% to the opening Al of the left release valves 56a, 56c, and 56e (step S124). When all the left release prohibition flags FL1 through FL3 are equal to 0, on the other hand, the current setting of the opening Al of the left release valves 56a, 56c, and 56e is kept unchanged. The routine subsequently checks the settings of the right release prohibition flags FR1 through FR3 (step S126). When the setting of any of the right release prohibition flags FR1 through FR3 is equal to 1, the routine sets 0% to the opening Ar of the right release valves 56b, 56d, and 56f (step S128). When all the right release prohibition flags FR1 through FR3 are equal to 0, on the other hand, the current setting of the opening Ar of the right release valves 56b, 56d, and 56f is kept unchanged. On completion of setting the valve openings Al and Ar of the release valves 56a through 56f, the routine drives the actuators of the release valves 56a through 56f to regulate the openings of the release valves 56a through 56f to the settings of the valve openings Al and Ar (step S130), before being terminated. When any of the left release prohibition flags FL1 through FL3 is equal to 1, the opening Al of the left release valves 56a, 56c, and 56e is set equal to 0% to prohibit the release of water from the left water outlets 58a, 58c, and 58e. When any of the right release prohibition flags FR1 through FR3 is equal to 1, the opening Ar of the right release valves 56b, 56d, and 56f is set equal to 0% to prohibit the release of water from the right water outlets 58b, 58d, and 58f. This arrangement effectively eliminates potentially adverse effects on a skid of a wheel under skid reduction control, restrains a potential skid of the outer wheel on a turn of the vehicle through the driver's manipulation of the steering wheel, and desirably prevents the released water from being splashed on any nearby object.

As described above, the fuel cell vehicle 10 of the first embodiment adequately releases the water produced by the fuel cell stack 22 according to the driving state of the vehicle, the surrounding environment, the loading to and unloading from the vehicle, and the state of any obstacle in the vicinity of the vehicle. The fuel cell vehicle 10 of the first embodiment thus exerts the diverse effects including: (1) the effect of preventing the water released from the water outlets 58a through 58f from being swirled on and scattered by the vehicle wind and being splashed on the front window of any vehicle running behind or on the side; (2) the effect of restraining potential deterioration of the braking performance due to the release of water from the water outlets 58a through 58f; (3) the effect of preventing a puddle from being left at the intersection by the release of water from the water outlets 58a through 58f; (4) the effect of preventing the water released from the water outlets 58a through 58f from swashing on the driver or passenger getting on or off the vehicle; (5) the effect of eliminating potentially adverse effects on a skid of a wheel under skid reduction control; (6) the effect of restraining a potential skid of the outer wheel on a turn of the vehicle through the driver's manipulation of the steering wheel; and (7) the effect of preventing the released water from being splashed on any nearby object.

In the fuel cell vehicle 10 of the first embodiment, the openings Al and Ar of the release valves 56a through 56f are set to regulate the release of water from the water outlets 58a through 58f, based on the vehicle speed Va and the acceleration α of the vehicle, the wind speed Vw, the outside air temperature Ta, the brake switch signal SWB representing the state of the brake switch 107, the snow mode switch signal SWS representing the state of the snow mode switch 110, the skid reduction control information representing the conditions of skid reduction control, the state of a turn based on the steering angle θ and the vehicle speed Va, the distances Lfl, Lfr, Lrl, and Lrr between the four corners of the vehicle and an object, the distance Lv from the subsequent vehicle, the estimated potential for loading to or unloading from the vehicle in response to the door open-close switch signals SWD1 through SWD4 and the parking switch signal SWP, the water level HW of the recovery tank 54, and the raindrop sensing signal SWR from the raindrop detection sensor 102. These inputs, computations, and estimations are, however, not restrictive at all. The release of water from the water outlets 58a through 58f may otherwise be regulated according to any inputs, computations, and the estimations that represent the driving state of the vehicle, the surrounding environment, the potential for loading to or unloading from the vehicle, and the status of any obstacle. The regulation of the release of water from the water outlets 58a through 58f may not be based on all of such inputs, computations, and the estimations, but may be based on adequate combinations of some of such inputs, computations, and the estimations or based on adequate combinations of some of such inputs, computations, and the estimations with those by another technique.

The fuel cell vehicle 10 of the first embodiment continuously varies the correction coefficient Kva against the vehicle speed Va to reduce the release of water from the water outlets 58a through 58f with an increase in vehicle speed Va, on the condition that the vehicle speed Va is not greater than the threshold value Va1. The requirement is, however, a variation in correction coefficient Kva to reduce the release of water from the water outlets 58a through 58f with an increase in vehicle speed Va. The correction coefficient Kva may thus be set to vary stepwise against the vehicle speed Va. When the vehicle speed Va is not greater than the threshold value Va1, the fuel cell vehicle 10 of the first embodiment sets the correction coefficient Kva to lower the release of water from the water outlets 58a through 58f with an increase in vehicle speed Va. When the vehicle speed Va is greater than the threshold value Va1, the release prohibition flag F1 is set equal to 1 to prohibit the release of water from the water outlets 58a through 58f. One simpler modification may allow the release of water from the water outlets 58a through 58f under the condition of the vehicle speed Va of not greater than the threshold value Va1, while prohibiting the release of water from the water outlets 58a through 58f under the condition of the vehicle speed Va of greater than the threshold value Va1. The fuel cell vehicle 10 of the first embodiment sets the correction coefficient Kva to lower the release of water from the water outlets 58a through 58f with an increase in vehicle speed Va, on the condition that the vehicle speed Va is not greater than the threshold value Va1. Another possible modification may set an upper limit of the release of water from the water outlets 58a through 58f corresponding to the vehicle speed Va and allow the release of water in the setting range of the upper limit. It is preferable that the upper limit decreases with an increase in vehicle speed Va. Still another possible modification may discriminate the driving state of the vehicle from the stop state of the vehicle based on the vehicle speed Va and regulate the release of water from the water outlets 58a through 58f in the driving state to be less than the release of water in the stop state. The procedure of this modification may set respective upper limits of the release of water from the water outlets 58a through 58f in the stop state and in the driving state and allow the release of water from the water outlets 58a through 58f within the setting range of the upper limit in the corresponding state. Another possible modification may discriminate the driving state of the vehicle from the stop state of the vehicle based on the vehicle speed Va and regulate the release of water from the water outlets 58a through 58f in the driving state to be less than the production of water by the fuel cell stack 22 in the driving state, while regulating the release of water from the water outlets 58a through 58f in the stop state to be greater than the production of water by the fuel cell stack 22 in the stop state.

The fuel cell vehicle 10 of the first embodiment linearly varies the correction coefficient Kα against the acceleration α to reduce the release of water from the water outlets 58a through 58f with an increase in acceleration α, on the condition that the acceleration α is not greater than the threshold value α1. The requirement is, however, a variation in correction coefficient Kα to reduce the release of water from the water outlets 58a through 58f with an increase in acceleration α. The correction coefficient Kα may thus be set to vary stepwise against the acceleration α. When the acceleration α is not greater than the threshold value α1, the fuel cell vehicle 10 of the first embodiment sets the correction coefficient Kα to lower the release of water from the water outlets 58a through 58f with an increase in acceleration α. When the acceleration α is greater than the threshold value α1, the release prohibition flag F1 is set equal to 1 to prohibit the release of water from the water outlets 58*a* through 58*f*. One simpler modification may allow the release of water from the water outlets 58*a* through 58*f* under the condition of the acceleration α of not greater than the threshold value α1, while prohibiting the release of water from the water outlets 58*a* through 58*f* under the condition of the acceleration a of greater than the threshold value α1.

The fuel cell vehicle 10 of the first embodiment continuously varies the correction coefficient Kvw against the wind speed Vw to reduce the release of water from the water outlets 58*a* through 58*f* with an increase in wind speed Vw, on the condition that the wind speed Vw is not greater than the threshold value Vw1. The requirement is, however, a variation in correction coefficient Kvw to reduce the release of water from the water outlets 58*a* through 58*f* with an increase in wind speed Vw. The correction coefficient Kvw may thus be set to vary stepwise against the wind speed Vw. When the wind speed Vw is not greater than the threshold value Vw1, the fuel cell vehicle 10 of the first embodiment sets the correction coefficient Kvw to lower the release of water from the water outlets 58*a* through 58*f* with an increase in wind speed Vw. When the wind speed Vw is greater than the threshold value Vw1, the release prohibition flag F1 is set equal to 1 to prohibit the release of water from the water outlets 58*a* through 58*f*. One simpler modification may allow the release of water from the water outlets 58*a* through 58*f* under the condition of the wind speed Vw of not greater than the threshold value Vw1, while prohibiting the release of water from the water outlets 58*a* through 58*f* under the condition of the wind speed Vw of greater than the threshold value Vw1.

The fuel cell vehicle 10 of the first embodiment linearly varies the correction coefficient Kta against the outside air temperature Ta to enhance the release of water from the water outlets 58*a* through 58*f* with an increase in outside air temperature Ta, on the condition that the outside air temperature Ta is not lower than the threshold value Ta1. The requirement is, however, a variation in correction coefficient Kta to enhance the release of water from the water outlets 58*a* through 58*f* with an increase in outside air temperature Ta. The correction coefficient Kta may thus be set to vary stepwise against the outside air temperature Ta. When the outside air temperature Ta is not lower than the threshold value Ta1, the fuel cell vehicle 10 of the first embodiment sets the correction coefficient Kta to enhance the release of water from the water outlets 58*a* through 58*f* with an increase in outside air temperature Ta. When the outside air temperature Ta is lower than the threshold value Ta1, the release prohibition flag F1 is set equal to 1 to prohibit the release of water from the water outlets 58*a* through 58*f*. One simpler modification may allow the release of water from the water outlets 58*a* through 58*f* under the condition of the outside air temperature Ta of not lower than the threshold value Ta1, while prohibiting the release of water from the water outlets 58*a* through 58*f* under the condition of the outside air temperature Ta of lower than the threshold value Ta1.

In the fuel cell vehicle 10 of the first embodiment, in response to the ON state of the brake switch signal SWB, the release prohibition flag F2 is set equal to 1 to prohibit the release of water from the water outlets 58*a* through 58*f* and thereby restrain potential deterioration of the braking performance due to the release of water. One possible modification may not prohibit the release of water from the water outlets 58*a* through 58*f* even in the ON state of the brake switch signal SWB. The procedure of this modification may set the release of water from the water outlets 58*a* through 58*f* in the ON state of the brake switch signal SWB to be less than the release of water in the OFF state of the brake switch signal SWB.

In the fuel cell vehicle 10 of the first embodiment, in response to the ON state of the snow mode switch signal SWS, the release prohibition flag F2 is set equal to 1 to prohibit the release of water from the water outlets 58*a* through 58*f* and thereby prevent the released water from being frozen on the snowy road surface. One possible modification may not prohibit the release of water from the water outlets 58*a* through 58*f* even in the ON state of the snow mode switch signal SWS. The procedure of this modification may set the release of water from the water outlets 58*a* through 58*f* in the ON state of the snow mode switch signal SWS to be less than the release of water in the OFF state of the snow mode switch signal SWS.

In the fuel cell vehicle 10 of the first embodiment, when any wheel is under skid reduction control, the release prohibition flag on the side where the release of water may adversely affect a skid of the wheel (either the left release prohibition flag FL1 or the right release prohibition flag FR1) is set equal to 1 to prohibit the release of water from all the water outlets on the side of the wheel under skid reduction control. It is, however, not essential to prohibit the release of water from all the water outlets on the side of the wheel under skid reduction control. One possible modification may prohibit the release of water only from the water outlet corresponding to the wheel under skid reduction control, for example, the release of water only from the water outlet 58*a* when the left front wheel 12*a* is under skid reduction control, while allowing the release of water from the water outlets 58*c* and 58*e* on the same side. Another possible modification may prohibit the release of water from all the water outlets 58*a* through 58*f* when any wheel is under skid reduction control.

When the absolute value of the steering angle θ is not less than the threshold value θ1 and when the vehicle speed Va is less than the threshold value Va3, the fuel cell vehicle 10 of the first embodiment estimates a turn at the intersection and sets the value '1' to the release prohibition flag F3 to prohibit the release of water from the water outlets 58*a* through 58*f* and thereby prevent a puddle from being left at the intersection. A turn at the intersection may be estimated, based on lighting of a turn signal in combination with the above results of comparison. In response to estimation of a turn at the intersection, the procedure may only reduce the release of water from the water outlets 58*a* through 58*f*, instead of completely prohibiting the release of water from the water outlets 58*a* through 58*f*.

When the absolute value of the steering angle θ is not less than the threshold value θ1 and when the vehicle speed Va is not less than the threshold value Va3, the fuel cell vehicle 10 of the first embodiment estimates a turn and sets the value '1' to either the left release prohibition flag FL2 or the right release prohibition flag FR2 to prohibit the release of water from the water outlets on the outer side of the turn and thereby restraint a potential skid of the outer wheel on the turn. One possible modification may prohibit the release of water from all the water outlets 58*a* through 58*f* when the vehicle is on the turn.

The fuel cell vehicle 10 of the first embodiment computes the distances Lfl, Lfr, Lrl, and Lrr between the four corners of the vehicle and an object in response to the signals from the clearance sonars 94*a* through 94*d* located at the four corners of the vehicle. The locations of the clearance sonars 94*a* through 94*d* are not restricted to the four corners of the vehicle but may be set arbitrarily. When any of the distances Lfl, Lfr, Lrl, and Lrr between the four corners of the vehicle and an object, which are computed in response to the signals from the clearance sonars 94*a* through 94*d*, is less than the threshold value Lref, the fuel cell vehicle 10 of the first embodiment prohibits the release of water from the water outlets on the sidewhere the object is present. This prevents the released water from being splashed on the object, which is apart from the vehicle by only the distance of less than the threshold value Lref. One possible modification may only reduce the release of water from the water outlets on the side where the object is present. Another possible modification may prohibit the release of water only from the water outlet located in the direction of the object, for example, the release of water only from the water outlet 58*a* when the distance Lf1 of the object computed in response to the signal from the clearance sonar 94*a* is less than the threshold value Lref, while allowing the release of water from the other water outlets 58*b* through 58*f*.

The fuel cell vehicle 10 of the first embodiment sets the release restriction distances L1 and L2 based on the vehicle speed Va and sets the value '1' to the release prohibition flag F4 to prohibit the release of water from the water outlets 58*a* through 58*f* when the subsequent vehicle distance Lv is less than the release restriction distance L1. One possible modification may only reduce the release of water from the water outlets 58*a* through 58*f*, instead of completely prohibiting the release of water, even when the subsequent vehicle distance Lv is less than the release restriction distance L1. When the subsequent vehicle distance Lv is not less than the release restriction distance L1 but is not greater than the release restriction distance L2, the fuel cell vehicle 10 of the first embodiment continuously varies the correction value K2 to restrict the release of water from the water outlets 58*a* through 58*f* to the greater degree with a decrease in subsequent vehicle distance Lv. The correction value K2 may alternatively be varied stepwise. The release restriction distances L1 and L2 may be set, regardless of the vehicle speed Va, while the procedure of the first embodiment sets the release restriction distances L1 and L2 based on the vehicle speed Va.

The fuel cell vehicle 10 of the first embodiment estimates the potential for loading to or unloading from the vehicle, in response to the gearshift position SP, the parking switch signal SWP, and the door open-close switch signals SWD1 through SWD4. The potential for loading to or unloading from the vehicle may be estimated, in response to the on-off state of a sheet switch in addition to these inputs. The fuel cell vehicle 10 of the first embodiment prohibits the release of water from all the water outlets 58*a* through 58*f*, in the event of estimation of the potential for loading to or unloading from the vehicle. One possible modification may prohibit the release of water only from the water outlet in the vicinity of a seat for which the potential for loading or unloading is estimated, while allowing the release of water from the other water outlets. For example, the procedure prohibits the release of water only from the water outlet 58*c* in the vicinity of a left front seat in the case of estimation of the potential for loading or unloading to or from the left front seat, while allowing the release of water from the other water outlets 58*a*, 58*b*, and 58*d* through 58*f*.

The fuel cell vehicle 10 of the first embodiment sets the valve openings Al and Ar of the release valves 56*a* through 56*f* to the full-open position (100%), in response to sensing the presence of raindrops with the raindrop detection sensor 102. The valve openings Al and Ar may alternatively be varied according to the water level HW of the recovery tank 54. In the fuel cell vehicle 10 of the first embodiment, the valve openings Al and Ar of the release valves 56*a* through 56*f* are set to the full-open position (100%), in response to sensing the presence of raindrops with the raindrop detection sensor 102. One possible modification may set the valve openings Al and Ar of the release valves 56*a* through 56*f* to the full-open position (100%) when sensing the raindrops with the raindrop detection sensor 102 continues for or over a preset time period. The fuel cell vehicle 10 of the first embodiment assumes the wet road surface in response to sensing the raindrops with the raindrop detection sensor 102 and sets the valve openings Al and Ar of the release valves 56*a* through 56*f* to the full-open position (100%). Another possible modification may assume the wet road surface based on the observed reflectance of the road surface and set the valve openings Al and Ar of the release valves 56*a* through 56*f* to the full-open position (100%).

When the water level HW of the recovery tank 54 is lower than the threshold value H1, the fuel cell vehicle 10 of the first embodiment sets the valve openings Al and Ar of the release valves 56*a* through 56*f* to the full-closed position (0%) to prohibit the release of water from the water outlets 58*a* through 58*f*. The release of water from the water outlets 58*a* through 58*f* may alternatively be allowed even when the water level HW of the recovery tank 54 is lower than the threshold value H1. When the water level HW of the recovery tank 54 is not lower than the threshold value H1 but is not higher than the threshold value H2, the fuel cell vehicle 10 of the first embodiment continuously varies the correction value K3 to enhance the release of water from the water outlets 58*a* through 58*f* with a rise of the water level HW of the recovery tank 54. The correction value K3 may alternatively be varied stepwise. Another possible modification may fix the correction value K3 to a preset value when the water level HW of the recovery tank 54 is not lower than the threshold value H1 but is not higher than the threshold value H2. The fuel cell vehicle 10 of the first embodiment places the output restriction of the fuel cell stack 22 when the water level HW of the recovery tank 54 is higher than the threshold value H2. One possible modification may not place the output restriction of the fuel cell stack 22 even when the water level HW of the recovery tank 54 is higher than the threshold value H2.

Diversity of other techniques may be applied to control the release of water from the water outlets 58*a* through 58*f*: for example, the technique of sensing the roughness of the road surface, which affects the splash of water droplets, and regulating the valve openings Al and Ar of the release valves 56*a* through 56*f*; the technique of regulating the water level HW of the recovery tank 54 according to the weather forecast input by a navigation system and controlling the release of water from the water outlets 58*a* through 58*f*; and the technique of regulating the valve openings Al and Ar of the release valves 56*a* through 56*f* based on geographical information.

The fuel cell vehicle 10 of the first embodiment has the six water outlets 58*a* through 58*f* to release water therefrom. The number of the water outlets is, however, not restricted to 6, but may be less than 6, for example, 4 or may be greater than 6, for example 8. In the fuel cell stack 10 of the first embodiment, the buffer tanks 57*a* through 57*f* are located downstream the release valves 56*a* through 56*f*. Water accumulated in the buffer tanks 57*a* through 57*f* is thus discharged from the water outlets 58*a* through 58*f* by free fall. In one modified structure, valves may be located in the respective water outlets 58*a* through 58*f* and openings of these valves are regulated to control the release of water from the water outlets 58*a* through 58*f*. The buffer tanks 57*a* through 57*f* may be omitted from the structure when not required.

The fuel cell vehicle 10 of the first embodiment has the hydrogen circulation conduit 33 to circulate the unreacted hydrogen, which is discharged from the fuel cell stack 22, to the hydrogen supply conduit 32. The hydrogen circulation conduit 33 may be omitted when not required.

In the fuel cell vehicle 10 of the first embodiment, the gas-liquid separator 48 of the air supply discharge system 40 does not attain complete gas-liquid separation. The gas-liquid separator may have the ability of complete gas-liquid separation.

B. Second Embodiment

Figure 17:
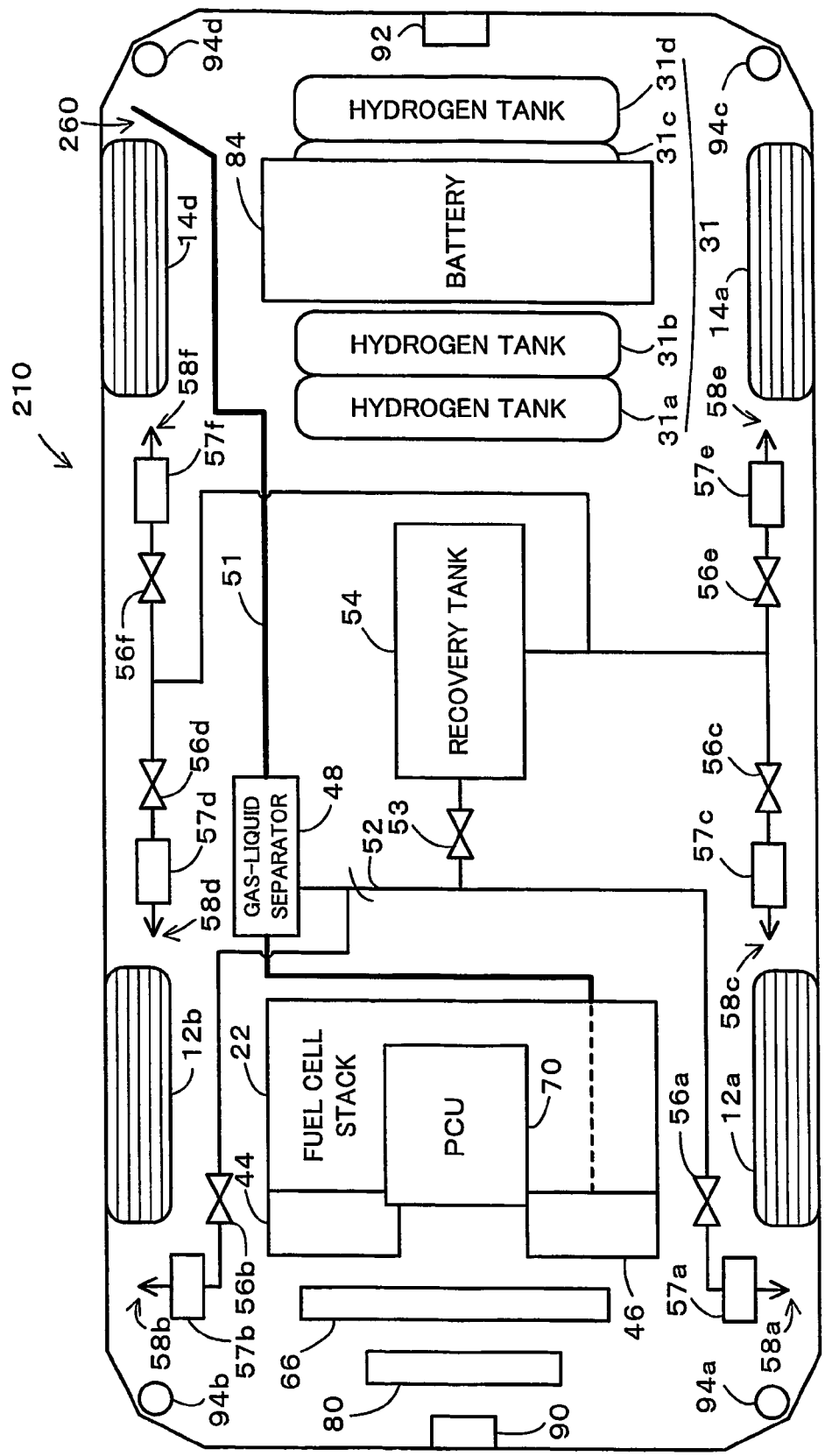
FIG. 17 is a plan view showing a plane layout of devices mounted on a fuel cell vehicle 210 of the second embodiment.
Figure 18:
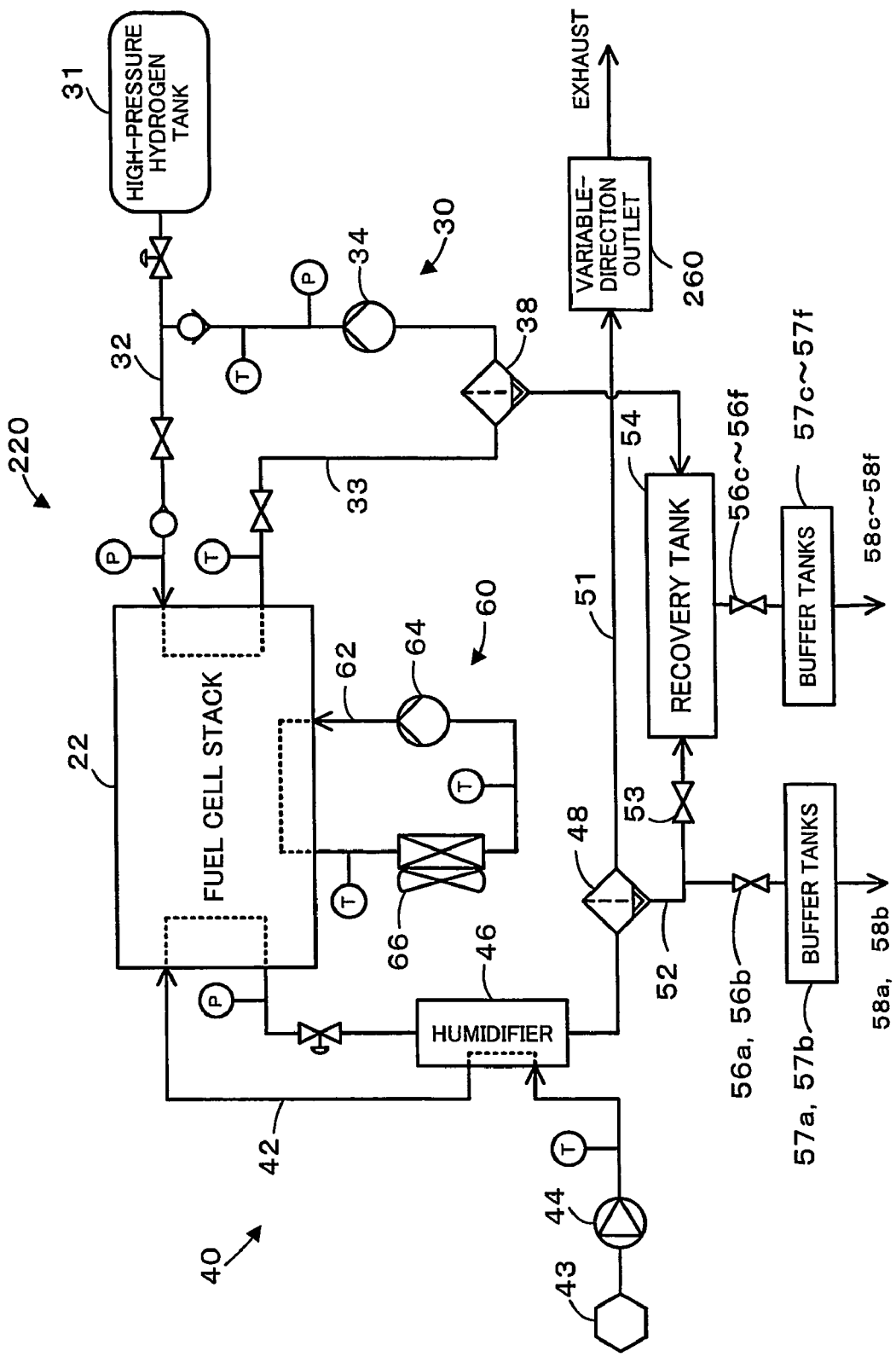
FIG. 18 is a system diagram schematically showing the configuration of a fuel cell system 220 mounted on the fuel cell vehicle 210 of the second embodiment.

The following describes another fuel cell vehicle 210 as a moving body in a second embodiment of the invention. FIG. 17 is a plan view showing a plane layout of devices mounted on the fuel cell vehicle 210 of the second embodiment. FIG. 18 is a system diagram schematically showing the configuration of a fuel cell system 220 mounted on the fuel cell vehicle 210 of the second embodiment. As shown in FIGS. 17 and 18, the fuel cell vehicle 210 of the second embodiment has the configuration similar to that of the fuel cell vehicle 10 of the first embodiment, except a variable-direction outlet 260 located on a discharge end of the exhaust gas pipe 51 included in the fuel cell system 220. In order to avoid the duplicate explanation, the like constituents in the fuel cell vehicle 210 of the second embodiment to those in the fuel cell vehicle 10 of the first embodiment are expressed by the like numerals and are not specifically described here.

Figure 19:
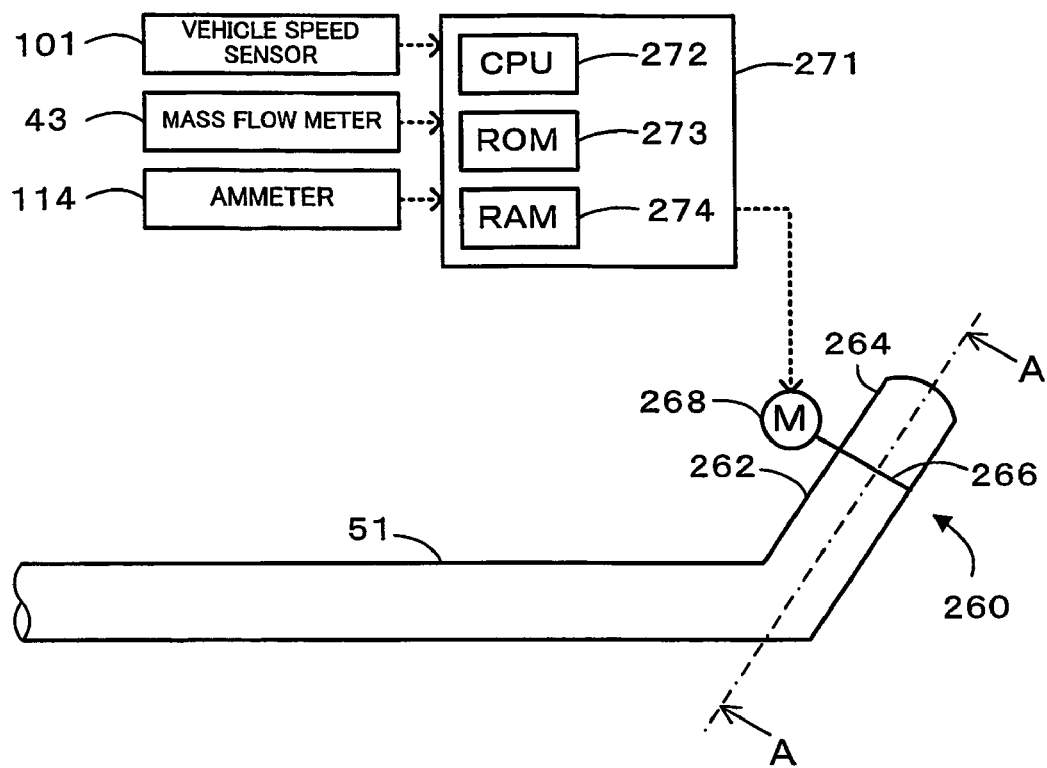
FIG. 19 schematically illustrates the structure of a variable-direction outlet 260.

With reference to FIGS. 17 and 18, the exhaust gas separated by the gas-liquid separator 48 is flown through the exhaust gas pipe 51 to the rear side of the rear wheel behind the driver's seat (that is, the right rear side of the vehicle) and is released via the variable-direction outlet 260 to the atmosphere. FIG. 19 schematically illustrates the structure of the variable-direction outlet 260 located on the discharge end of the exhaust gas pipe 51. FIG. 20 shows an operation of the variable-direction outlet 260. As illustrated, the variable-direction outlet 260 includes a stationary pipe 262 that has a cut end at an angle of approximately 45 degrees and is arranged in a substantially horizontal orientation to connect with the exhaust gas pipe 51, a short movable pipe 264 that has a joint cut end at an angle of approximately 45 degrees for linkage with the stationary pipe 262, and a motor 268 that works as an actuator to rotate the movable pipe 264 in the angle of approximately 90 degrees as shown in FIGS. 20(a) and 20(b). The edge of the joint cut end of the movable pipe 264 and the edge of the cut end of the stationary pipe 262 are fixed to a rotating shaft 266 of the motor 268. The steam-containing exhaust gas flown through the exhaust gas pipe 51 is released in the direction of the movable pipe 264, which is adjusted in the angle between the vertically downward direction of FIG. 20(a) and the horizontal direction of FIG. 20(b). The moving direction of the movable pipe 264 has components in the lateral direction and the backward direction of the vehicle, since the movable pipe 264 makes an angle of approximately 45 degrees with the side face of the vehicle, as clearly shown in FIGS. 17 and 19. During a run of the vehicle, the exhaust gas is released from the variable-direction outlet 260 in the arrangement of facing the movable pipe 264 in the horizontal direction (that is, the state of FIG. 20(b) having the components in the lateral direction and the backward direction of the vehicle). The exhaust gas separated by the gas-liquid separator 48 contains steam. Part of the steam is liquefied prior to release from the variable-direction outlet 260 and is released with the exhaust gas from the variable-direction outlet 260. The water liquefied and released with the exhaust gas from the variable-direction outlet 260 is flown obliquely backward the vehicle. The vehicle wind or the air flow caused by the run of the vehicle is relatively strong in the rear half across the width of the vehicle, especially in the rear center portion of the vehicle. The effect of the vehicle wind is reduced with an increase in distance apart from the side face of the vehicle. The release of the exhaust gas obliquely backward the vehicle thus desirably reduces the effect of the vehicle wind on the water released with the exhaust gas and thereby prevents the released water from being swirled on the vehicle wind. The release of the exhaust gas obliquely backward the vehicle lowers the relative speed of the water released with the exhaust gas and the liquefied steam included in the released exhaust gas to the road surface. The higher relative speed of water droplets to the road surface leads to the greater degree of splash of water droplets against the road surface. The lowered relative speed of the released water and the liquefied water to the road surface thus effectively reduces the quantity of water splash. This arrangement well prevents the released water from being swirled by a disturbance like the vehicle wind before reaching the road surface. The release of the exhaust gas in the arrangement of facing the movable pipe 264 obliquely backward the vehicle has these advantages discussed above. At a stop of the vehicle, on the other hand, the exhaust gas is released from the variable-direction outlet 260 in the arrangement of facing the movable pipe 264 vertically downward. Since the movable pipe 264 faces vertically downward, the exhaust gas and the liquefied water are discharged vertically downward within the contour of the vehicle. This arrangement effectively prevents the liquefied water from being scattered on any pedestrian in the vicinity of the vehicle. The release of the exhaust gas in the arrangement of facing the movable pipe 264 vertically downward has this advantage.

An electronic control unit 271 built in the PCU 70 has a CPU 272, a ROM 273, and a RAM 274, like the electronic control unit 71 of the first embodiment. The electronic control unit 271 inputs, via its input processing circuit, the vehicle speed Va from the vehicle speed sensor 101, an air flow rate Qa from the mass flow meter 43, and an electric current Ifc from an ammeter 114 attached to a non-illustrated output terminal of the fuel cell stack 22 to measure the output current of the fuel cell stack 22. The electronic control unit 271 outputs driving signals to the motor 268 via its output processing circuit.

Figure 21:
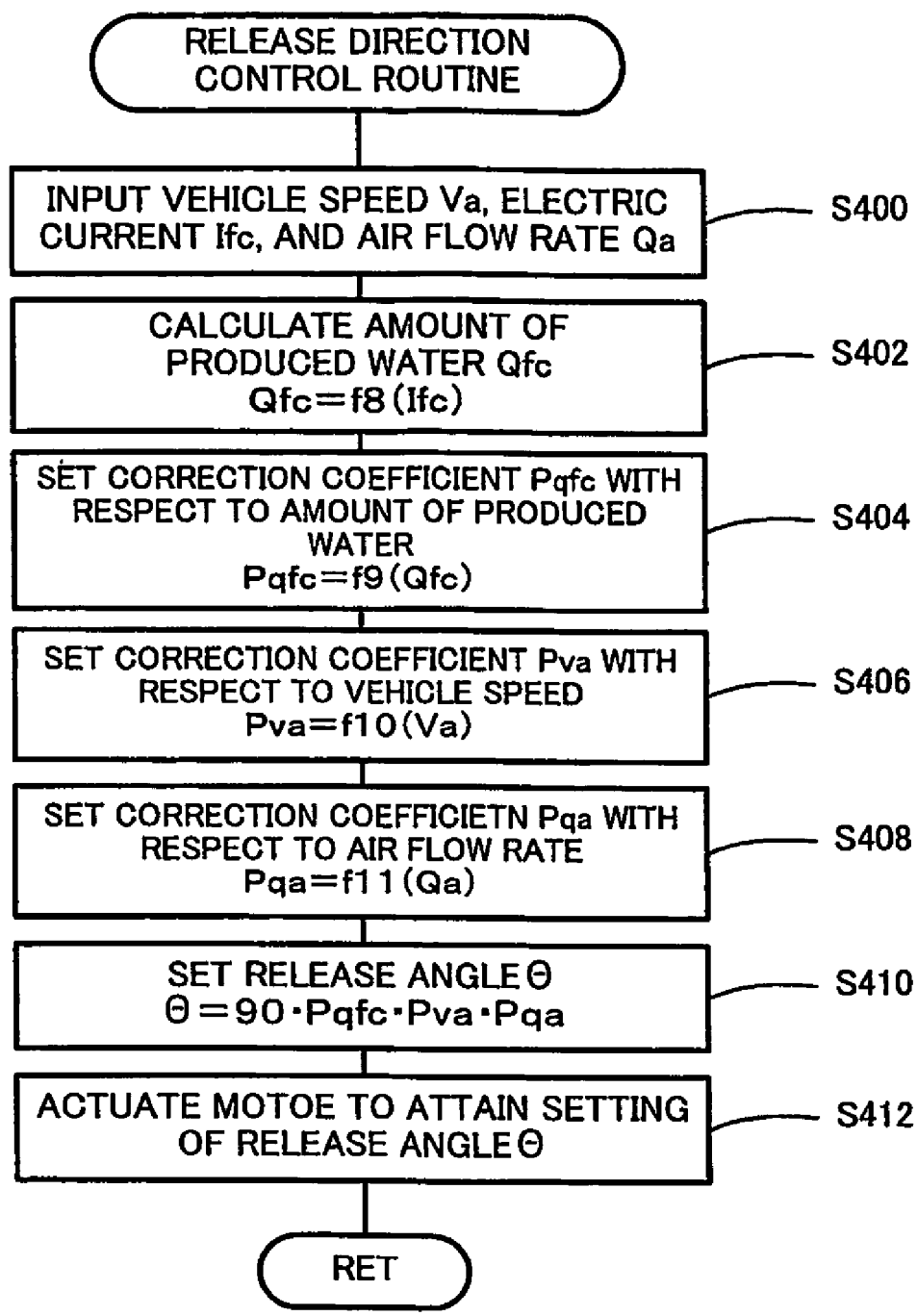
FIG. 21 is a flowchart showing a release direction control routine executed by the electronic control unit 271.

The following describes series of operations in the fuel cell vehicle 210 of the second embodiment constructed as discussed above, especially a series of operations to release the exhaust gas from the air supply discharge system 40 of the fuel cell system 220. FIG. 21 is a flowchart showing a release direction control routine executed by the electronic control unit 271 to control the release direction of the exhaust gas from the variable-direction outlet 260. This routine is repeatedly carried out at preset time intervals (for example, at every 200 msec).

When the release direction control routine starts, the CPU 272 of the electronic control unit 271 first inputs data required for control, for example, the vehicle speed Va from the vehicle speed sensor 101, the electric current Ifc from the ammeter 114, and the air flow rate Qa from the mass flow meter 43 (step S400), and calculates an amount of water Qfc produced by the fuel cell stack 22 from the input electric current Ifc (step S402). The output current (electric current Ifc) of the fuel cell stack 22 is proportional to the molecular weight subjected to the reaction in the fuel cell stack 22. The amount of produced water Qfc is thus readily computable from the input electric current Ifc.

Figure 22:
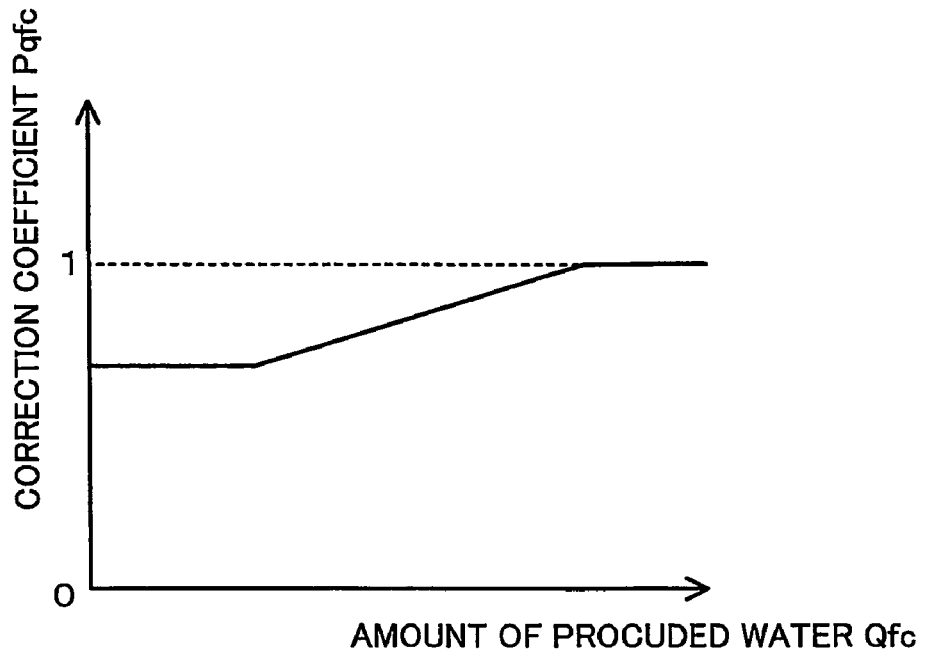
FIG. 22 shows settings of correction coefficient Pqfc with respect to amount of produced water Qfc.
Figure 23:
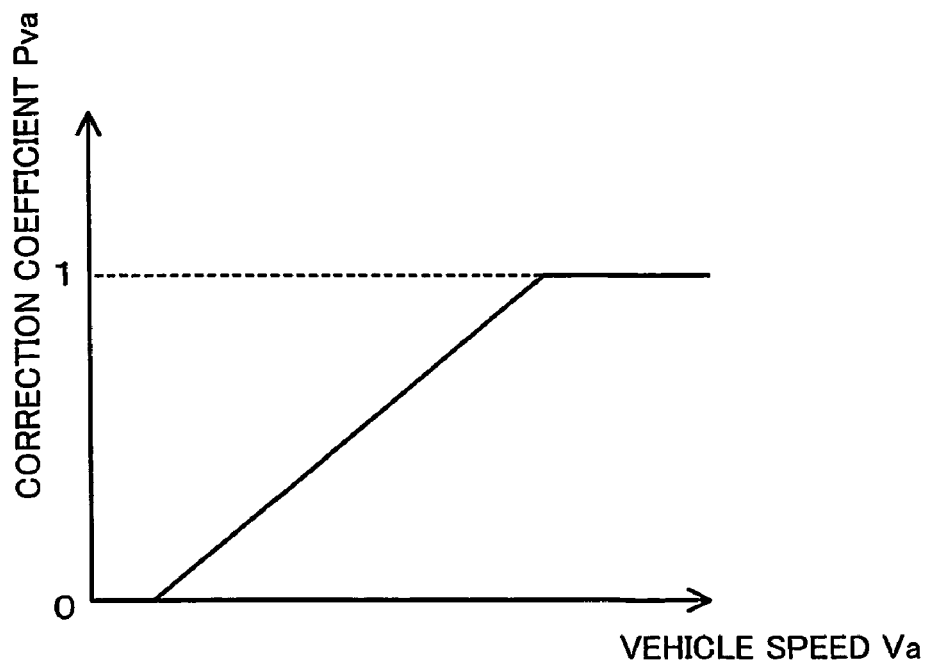
FIG. 23 shows settings of correction coefficient Pva with respect to vehicle speed Va.
Figure 24:
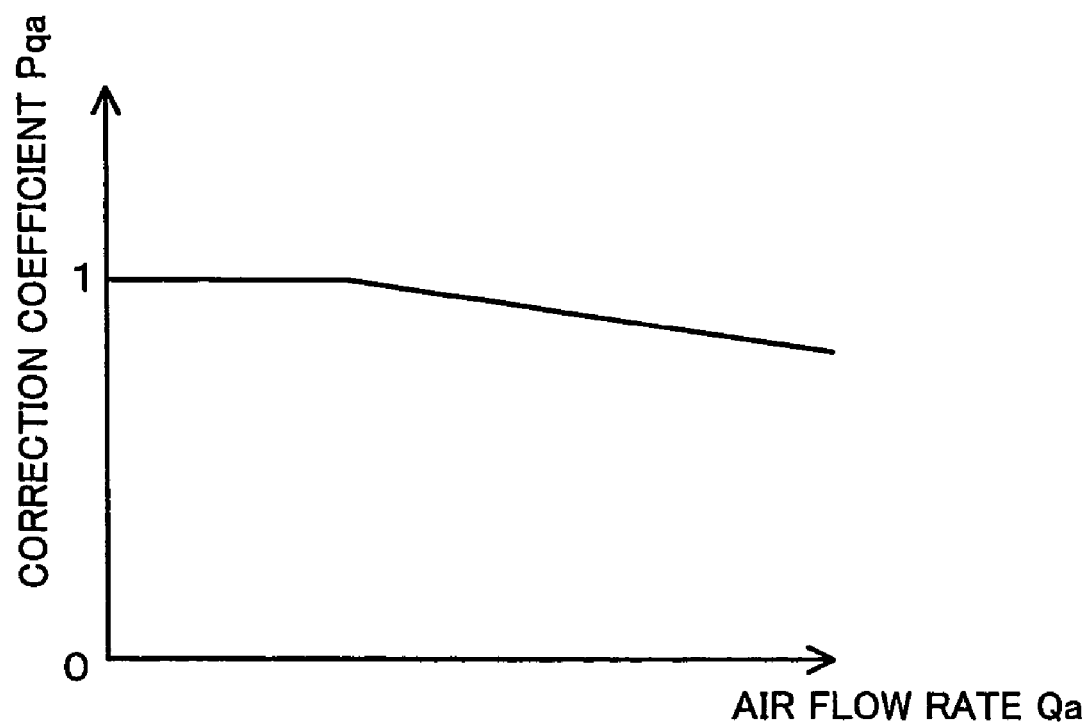
FIG. 24 shows settings of correction coefficient Pqa with respect to air flow rate Qa.

After calculation of the amount of produced water Qfc, the routine successively sets correction coefficients Pqfc, Pva, and Pqa, based on the calculated amount of produced water Qfc, the input vehicle speed Va, and the input air flow rate Qa (steps S404 through S408). The routine then sets a release angle Θ as the product of the settings of the correction coefficients Pqfc, Pva, and Pqa and a value '90' (step S410) and actuates the motor 268 to attain the setting of the release angle Θ (step S412), before being terminated. The correction coefficients Pqfc, Pva, and Pqa are used to determine the angle of the movable pipe 264 of the variable-direction outlet 260 and are set in the range between a value '0' representing that the release direction of the exhaust gas is the vertically downward direction and a value '1' representing that the release direction is the horizontal direction. The graphs of FIGS. 22, 23, and 24 respectively show a variation in correction coefficient Pqfc against the amount of produced water Qfc, a variation in correction coefficient Pva against the vehicle speed Va, and a variation in correction coefficient Pqa against the air flow rate Qa. As shown in FIG. 22, the correction coefficient Pqfc with respect to the amount of produced water Qfc is set to increase with an increase in amount of produced water Qfc. This is ascribed to the fact that the increase in amount of produced water Qfc leads to an increase in quantity of water released with the exhaust gas from the variable-direction outlet 260 and in quantity of liquefied water. The release of the water obliquely backward the vehicle effectively prevents the released water from being swirled on the vehicle wind before reaching the road surface, as well as from being splashed against the road surface. As shown in FIG. 23, the correction coefficient Pva with respect to the vehicle speed Va is set to increase with an increase in vehicle speed Va. This is ascribed to the fact that the higher vehicle speed Va has the greater effect of the vehicle wind. As shown in FIG. 24, the correction coefficient Pqa with respect to the air flow rate Qa is set to decrease with an increase in air flow rate Qa. This is ascribed to the fact that the higher air flow rate Qa raises the release rate of the exhaust gas and water. The air flow rate Qa may thus be replaced by the flow rate of the exhaust gas through the exhaust gas pipe 51. The release angle Θ is equal to 0 when the movable pipe 264 is arranged vertically downward, while being equal to 90 when the movable pipe 264 is arranged in the horizontal direction. As clearly understood from the graphs of FIGS. 22 through 24, the procedure of the second embodiment sets the correction coefficient Pva with respect to the vehicle speed Va to have the greater effect, compared with the correction coefficient Pqfc with respect to the amount of produced water Qfc and the correction coefficient Pqa with respect to the air flow rate Qa. This is because the vehicle wind significantly affects the behavior of the released water that is scattered and swirled. The release angle Θ is thus regarded as the setting on the basis of the vehicle speed Va, which is corrected with the amount of water Qfc produced by the fuel cell stack 22 and with the air flow rate Qa of the air supply discharge system 40. Simple adjustment of the direction of the movable pipe 264 ensures adequate release of the exhaust gas with water.

As described above, the fuel cell vehicle 210 of the second embodiment ensures adequate release of the exhaust gas with water according to the vehicle speed Va, the amount of water Qfc produced by the fuel cell stack 22, and the air flow rate Qa of the air supply discharge system 40. Under the condition of the high vehicle speed Va, the exhaust gas is released in the arrangement of facing the movable pipe 264 obliquely backward the vehicle. This arrangement effectively prevents the water released with the exhaust gas and the liquefied steam included in the released exhaust gas from being swirled on and scattered by the vehicle wind before reaching the road surface, while restraining the splash of water against the road surface from being swirled on and scattered by the vehicle wind. In response to the large amount of water Qfc produced by the fuel cell stack 22, the release angle is corrected to face the movable pipe 264 obliquely backward the vehicle. Even when a relatively large amount of water is released with the exhaust gas or a relatively large amount of steam in the released exhaust gas is liquefied, such correction effectively prevents the water from being swirled on and scattered by the vehicle wind before reaching the road surface, while restraining the splash of water against the road surface from being swirled on and scattered by the vehicle wind. In response to the high air flow rate Qa of the air supply discharge system 40, the release angle is corrected to face the movable pipe 264 vertically downward. Such correction raises the release rate of the exhaust gas and water from the variable-direction outlet 260 and effectively prevents the water from being flown laterally or backward. Under the condition of the low vehicle speed Va, on the other hand, the exhaust gas is released in the arrangement of facing the movable pipe 264 vertically downward. The exhaust gas and the liquefied water are thus discharged vertically downward within the contour of the vehicle. This desirably prevents the released water from being splashed on any pedestrian in the vicinity of the vehicle.

The fuel cell vehicle 210 of the second embodiment adjusts the release direction of the exhaust gas separated by the gas-liquid separator 48 according to the vehicle speed Va, the amount of water Qfc produced by the fuel cell stack 22, and the air flow rate Qa of the air supply discharge system 40 and releases the exhaust gas from the variable-direction outlet 260 arranged in the adjusted release direction. One modified structure may not have the gas-liquid separator 48 but may release the exhaust gas without gas-liquid separation from the variable-direction outlet 260 arranged in the release direction adjusted according to the vehicle speed Va, the amount of produced water Qfc, and the air flow rate Qa. Another modified structure may adjust the release direction of water, which is separated by the gas-liquid separator 48 and is accumulated in the recovery tank 54, according to the vehicle speed Va and release the water from a variable-direction outlet arranged in the adjusted release direction.

The fuel cell vehicle 210 of the second embodiment adjusts the release direction of the exhaust gas separated by the gas-liquid separator 48 according to the vehicle speed Va, the amount of water Qfc produced by the fuel cell stack 22, and the air flow rate Qa of the air supply discharge system 40 and releases the exhaust gas from the variable-direction outlet 260 arranged in the adjusted release direction. One possible modification may adjust the release direction of the exhaust gas according to only the vehicle speed Va and the amount of produced water Qfc and release the exhaust gas from the variable-direction outlet 260 arranged in the adjusted release direction. Another possible modification may adjust the release direction of the exhaust gas according to only the vehicle speed Va and the air flow rate Qa and release the exhaust gas from the variable-direction outlet 260 arranged in the adjusted release direction. Still another possible modification may adjust the release direction of the exhaust gas according to the vehicle speed Va in combination with a factor other than the amount of produced water Qfc and the air flow rate Qa and release the exhaust gas from the variable-direction outlet 260 arranged in the adjusted release direction. Another possible modification may adjust the release direction of the exhaust gas according to the vehicle speed Va in combination with the amount of produced water Qfc, the air flow rate Qa, and another factor and release the exhaust gas from the variable-direction outlet 260 arranged in the adjusted release direction.

The fuel cell vehicle 210 of the second embodiment adjusts the direction of the movable pipe 264 with regard to both the lateral component and the backward component, based on the vehicle speed Va, the amount of produced water Qfc, and the air flow rate Qa, and releases the exhaust gas separated by the gas-liquid separator 48 from the variable-direction outlet 260 arranged in the adjusted direction. The direction of the movable pipe 264 may be adjusted only in the lateral direction but not in the backward direction.

C. Third Embodiment

Figure 25:
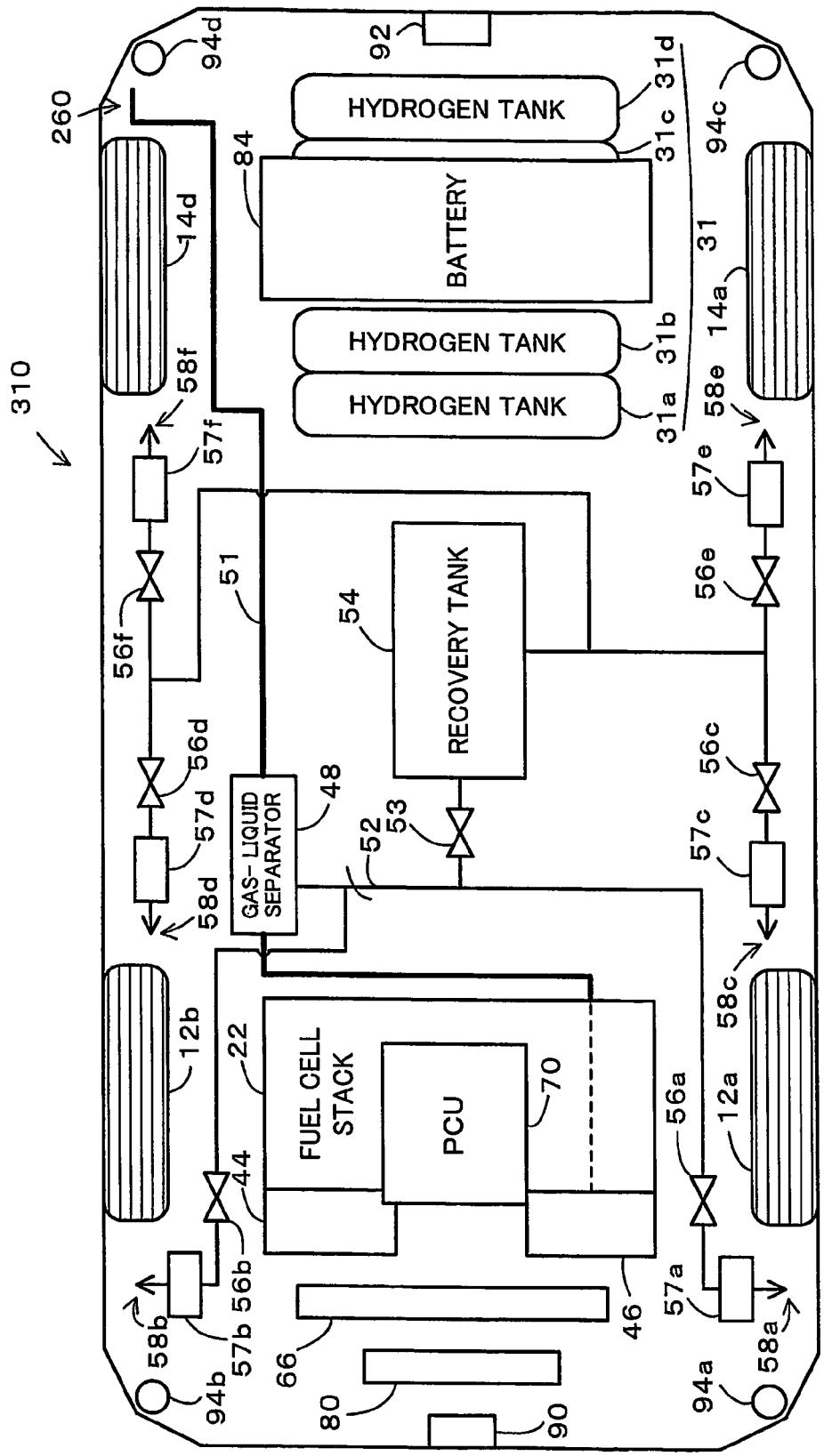
FIG. 25 is a plan view showing a plane layout of devices mounted on a fuel cell vehicle 310 of a third embodiment.

The following describes still another fuel cell vehicle 310 as a moving body in a third embodiment of the invention. FIG. 25 is a plan view showing a plane layout of devices mounted on the fuel cell vehicle 310 of the third embodiment. As shown in FIG. 25, the fuel cell vehicle 310 of the third embodiment has the configuration similar to that of the fuel cell vehicle 210 of the second embodiment, except that the direction of the variable-direction outlet 260 located on the discharge end of the exhaust gas pipe 51 is adjusted to be identical with the moving direction of the vehicle. In order to avoid the duplicate explanation, the like constituents in the fuel cell vehicle 310 of the third embodiment to those in the fuel cell vehicle 210 of the second embodiment are expressed by the like numerals and are not specifically described here.

Figure 26:
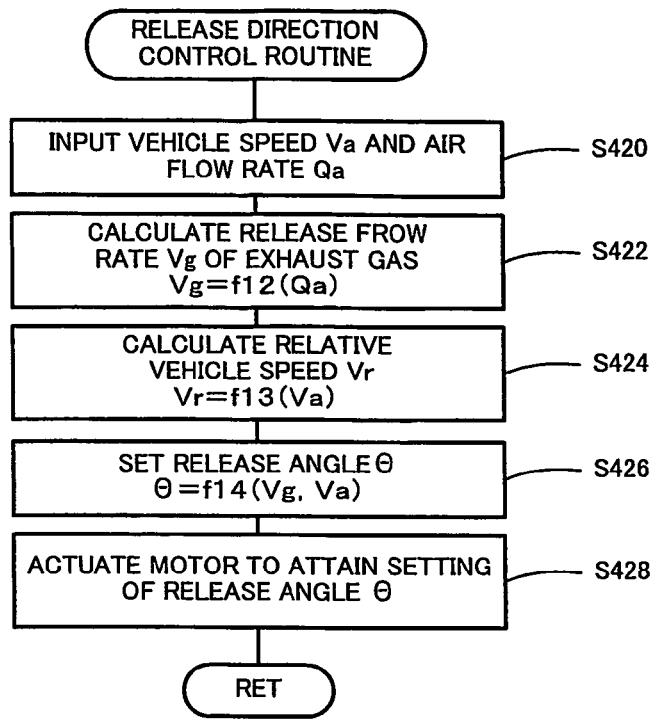
FIG. 26 is a flowchart showing a release direction control routine; executed by an electronic control unit 271 of the fuel cell vehicle 310.
Figure 27:
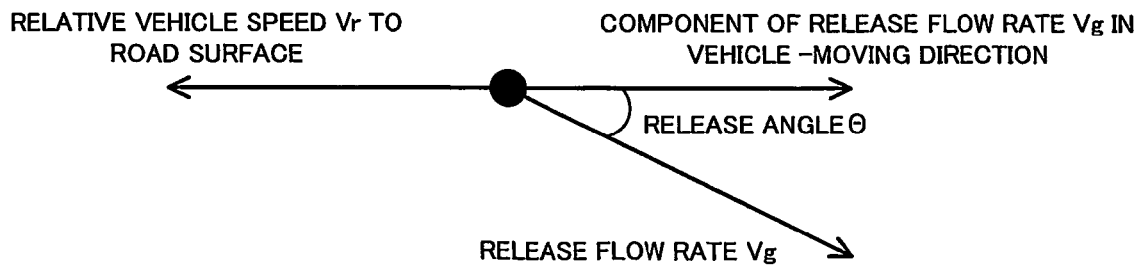
FIG. 27 shows release angle Θ in relation to relative vehicle speed Vr to road surface and release flow rate Vg.

In the fuel cell vehicle 310 of the third embodiment, the electronic control unit 271 executes a release direction control routine of FIG. 26, in place of the release direction control routine of FIG. 21. The release direction control routine of FIG. 26 first inputs the vehicle speed Va from the vehicle speed sensor 101 and the air flow rate Qa from the mass flow meter 43 (step S420) and calculates a release flow rate Vg of the exhaust gas from the variable-direction outlet 260 according to the input air flow rate Qa (step S422). As described previously, the air flow rate Qa is convertible to the flow rate of the exhaust gas discharged from the fuel cell stack 22. The release flow rate Vg of the exhaust gas from the variable-direction outlet 260 is thus calculated from the discharge cross section of the variable-direction outlet 260. The routine then calculates a relative vehicle speed Vr to the road surface from the input vehicle speed Va (step S424). The routine sets the release angle Θ, based on the calculated relative vehicle speed Vr and the calculated release flow rate Vg (step S426), and actuates the motor 268 to attain the setting of the release angle Θ (step S428), before being terminated. FIG. 27 shows the release angle Θ in relation to the relative vehicle speed Vr to the road surface and the release flow rate Vg. The release angle Θ represents an angle at which the relative vehicle speed Vr to the road surface is cancelled by the component of the release flow rate Vg in the vehicle-moving direction. Such control eliminates the speed component in the vehicle-moving direction from the relative speed of the exhaust gas and water released from the variable-direction outlet 260 to the road surface and leaves only the speed component in the vertical direction relative to the road surface. Namely water is released from the variable-direction outlet 260 in the vertical direction relative to the road surface. This arrangement eliminates the speed component of the released water in the horizontal direction relative to the road surface, thereby effectively preventing the released water from being scattered on the road surface and restraining the splash of water against the road surface from being swirled on the vehicle wind.

As described above, the fuel cell vehicle 310 of the third embodiment releases the exhaust gas and water to have only the speed component in the vertically downward direction relative to the road surface, based on the release flow rate Vg of the exhaust gas from the variable-direction outlet 260 and the relative vehicle speed Vr to the road surface. Such control effectively prevents the released water from being scattered on the road surface and restrains the splash of water against the road surface from being swirled on the vehicle wind.

Figure 28:
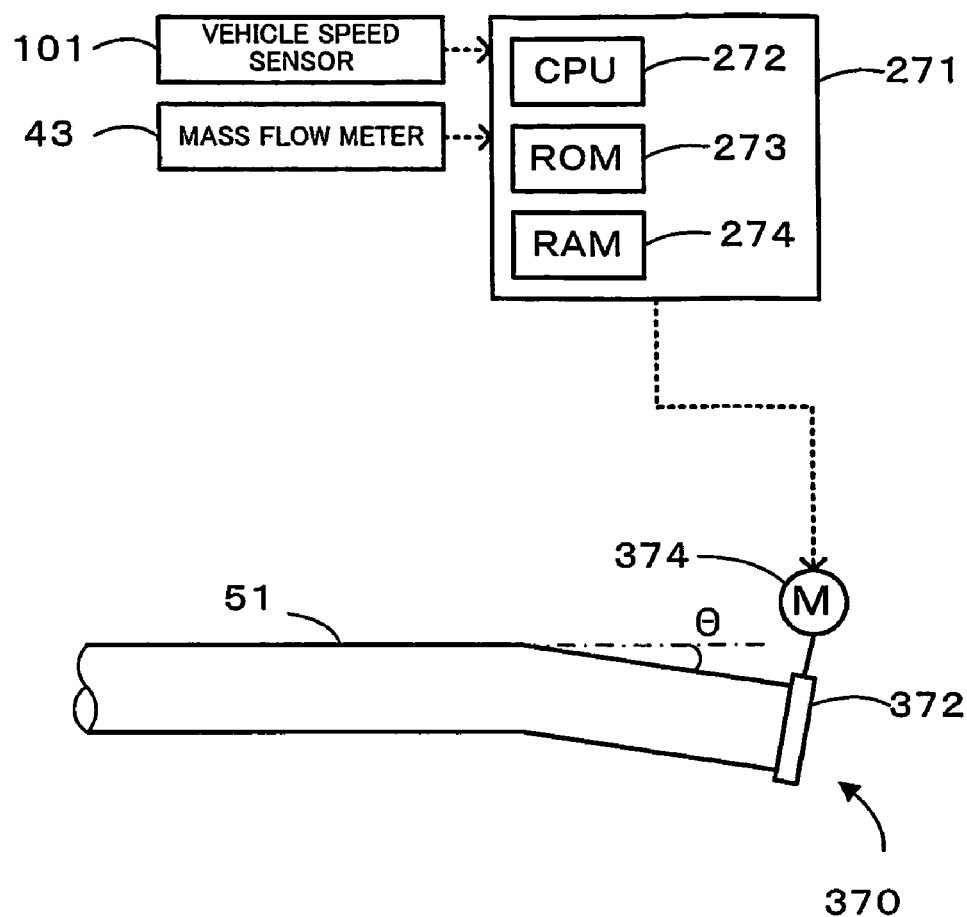
FIG. 28 is a sectional view of a variable-sectional area outlet 370 in one modified structure of the fuel cell vehicle 310.
Figure 29:
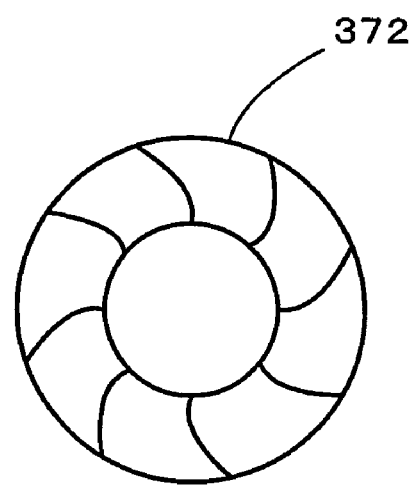
FIG. 29 shows an example of a sectional area variation mechanism 372.
Figure 30:
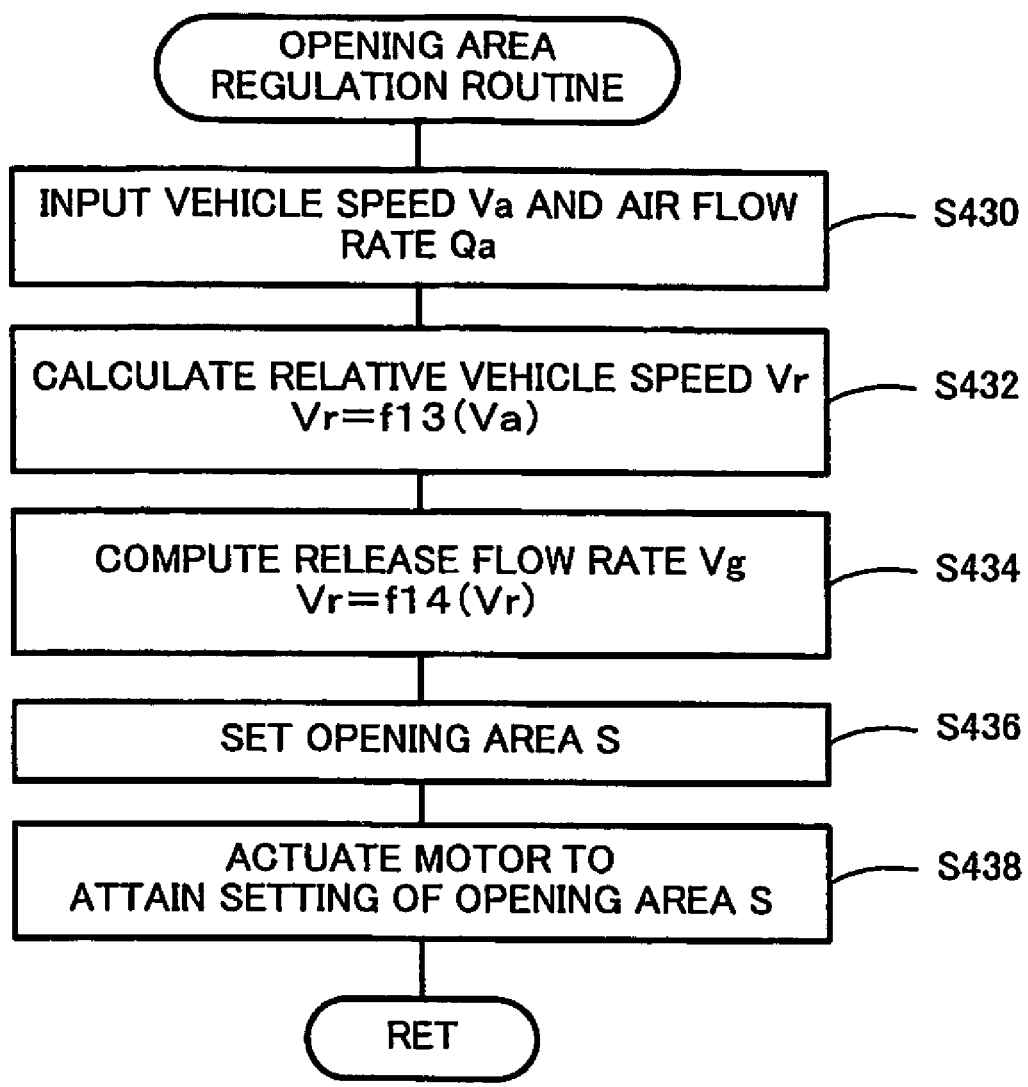
FIG. 30 is a flowchart showing an opening area regulation routine executed in one modified structure of the fuel cell vehicle 310 of the third embodiment.

The fuel cell vehicle 310 of the third embodiment varies the direction of the movable pipe 264 of the variable-direction outlet 260 to release the exhaust gas and water having only the speed component in the vertically downward direction relative to the road surface, from the variable-direction outlet 260. One possible modification may not change the release direction of the exhaust gas and water but may vary the release flow rate Vg of the exhaust gas to release the exhaust gas and water having only the speed component in the vertically downward direction. In one modified structure shown in FIGS. 28 and 29, the exhaust gas pipe 51 is bent downward in the vertical direction to have the release angle Θ. A variable-sectional area outlet 370 is attached to one end of the exhaust gas pipe 51. The variable-sectional area outlet 370 includes a sectional area variation mechanism 372 similar to a camera aperture and a motor 374 functioning as an actuator to vary the sectional area of the sectional area variation mechanism 372. In this modified structure, an opening area regulation routine shown in the flowchart of FIG. 30 is executed to compute the release flow rate Vg from the release angle Θ and the relative vehicle speed Vr to the road surface, which is calculated from the input vehicle speed Va, based on the relation among the relative vehicle speed Vr to the road surface, the release angle Θ, and the release flow rate Vg shown in FIG. 27 (steps S430 through S434). The routine then sets an opening area S of the sectional area variation mechanism 372 to release the exhaust gas from the variable-sectional area outlet 370 at the computed release flow rate Vg (step S436) and actuates the motor 374 to attain the setting of the opening area S (step S438). The modified structure releases the exhaust gas and water having only the speed component in the vertically downward direction relative to the road surface, from the variable-sectional area outlet 370. This arrangement exerts the similar effects to those of the fuel cell vehicle 310 of the third embodiment to effectively prevent the released water from being scattered on the road surface and restrain the splash of water against the road surface from being swirled on the vehicle wind. In this modified structure, the release flow rate Vg is regulated by varying the opening area of the variable-sectional area outlet 370. Another modified structure may attach a pump and a flow control valve to the exhaust gas pipe 51 and regulate the release flow rate Vg by pressurization of the exhaust gas by means of the pump and adjustment of the release flow of the pressurized exhaust gas by means of the flow control valve.

The fuel cell vehicle 310 of the third embodiment releases the exhaust gas separated by the gas-liquid separator 48 and water to have only the speed component in the vertically downward direction relative to the road surface, based on the release flow rate Vg of the exhaust gas from the variable-direction outlet 260 and the relative vehicle speed Vr to the road surface. One modified structure may not have the gas-liquid separator 48 but may release the exhaust gas without gas-liquid separation to have only the speed component in the vertically downward direction relative to the road surface, based on the release flow rate Vg of the exhaust gas and the relative vehicle speed Vr. Another modified structure may release water, which is separated by the gas-liquid separator 48 and is accumulated in the recovery tank 54, to have only the speed component in the vertically downward direction relative to the road surface, based on the relative vehicle speed Vr.

D. Fourth Embodiment

Figure 31:
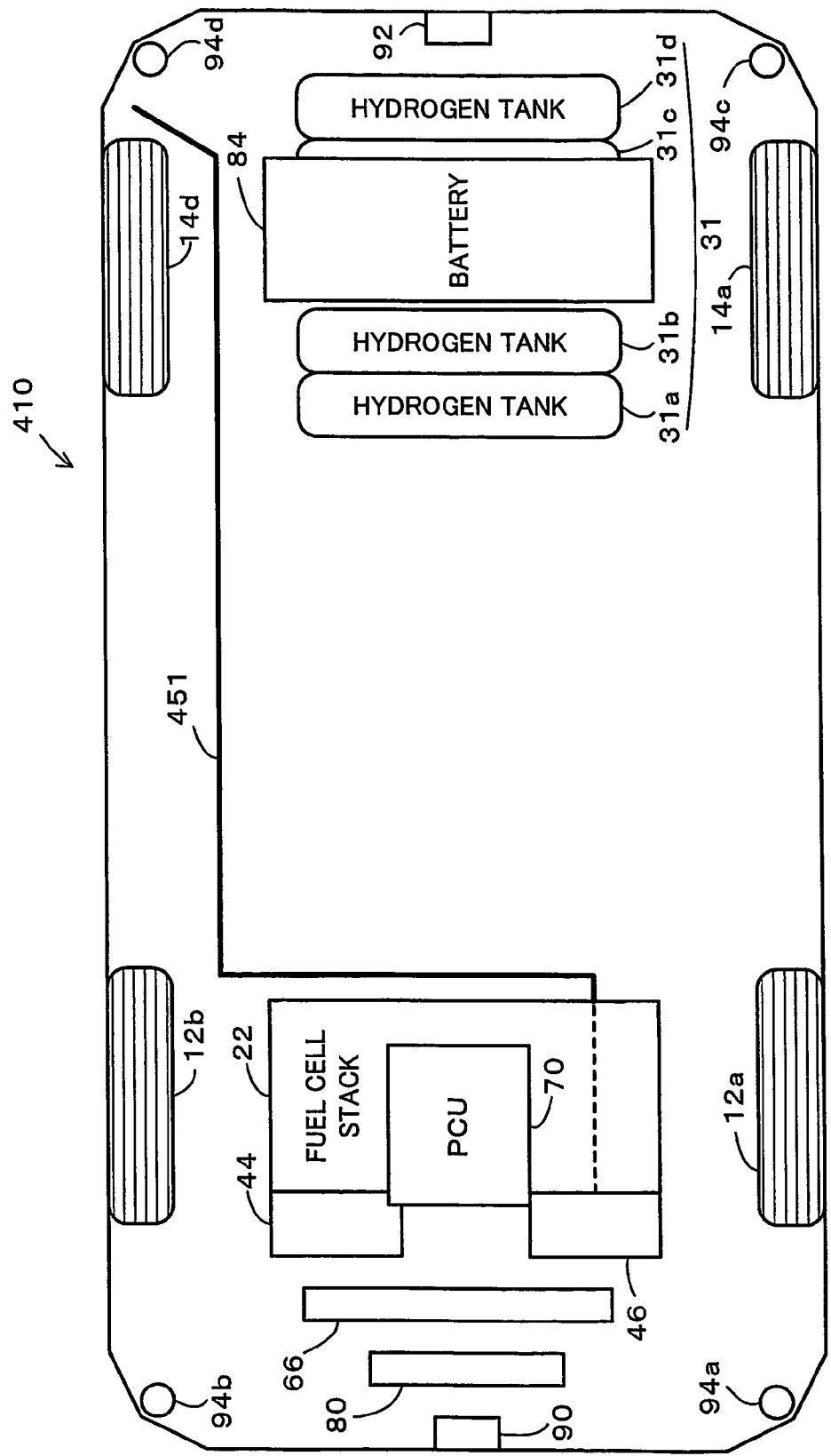
FIG. 31 is a plan view showing a plane layout of devices mounted on a fuel cell vehicle 410 of a fourth embodiment of the invention.
Figure 32:
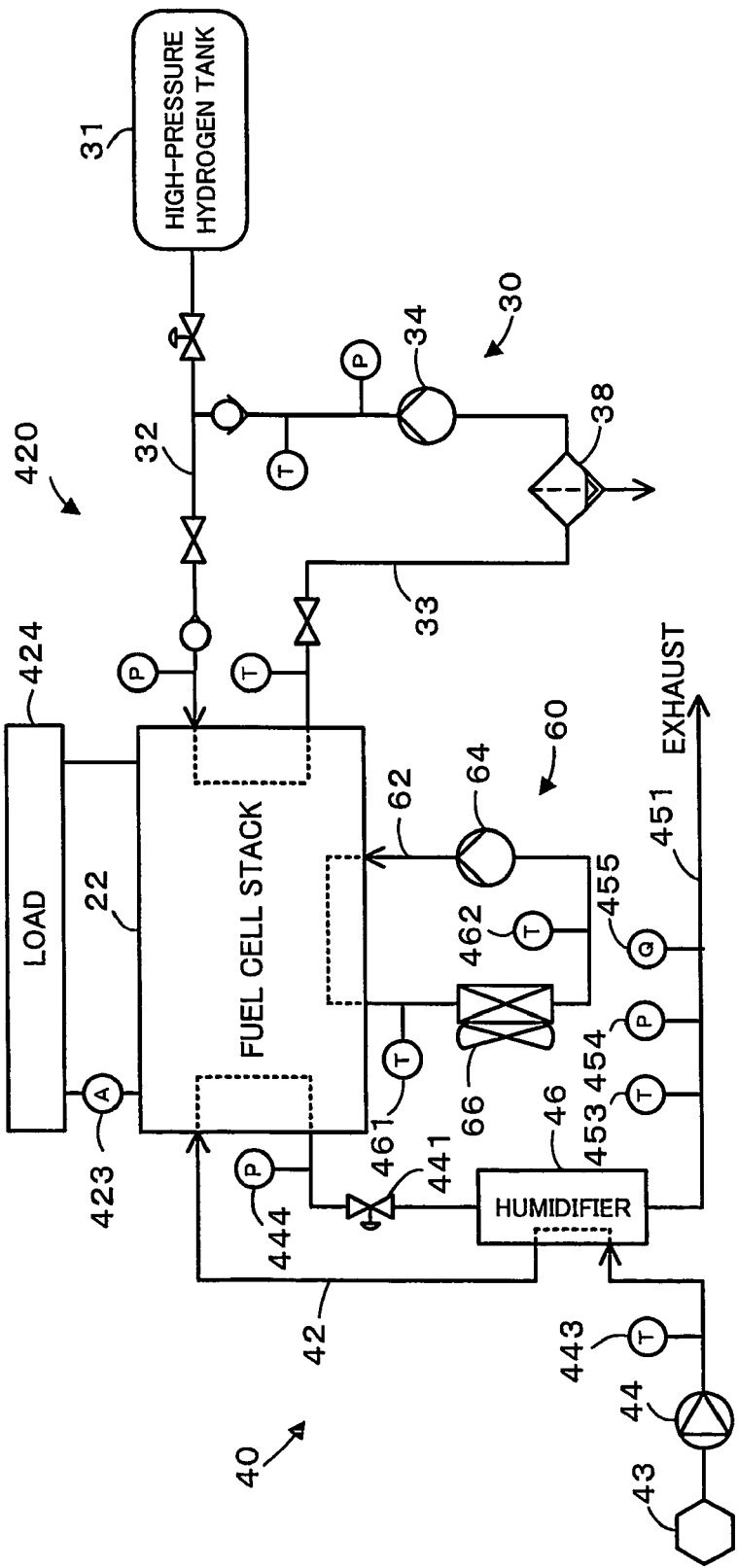
FIG. 32 is a system diagram schematically showing the configuration of a fuel cell system 420 mounted on the fuel cell vehicle 410.

The following describes another fuel cell vehicle 410 as a moving body in a fourth embodiment of the invention. FIG. 31 is a plan view showing a plane layout of devices mounted on the fuel cell vehicle 410 of the fourth embodiment. FIG. 32 is a system diagram schematically showing the configuration of a fuel cell system 420 mounted on the fuel cell vehicle 410 of the fourth embodiment. As shown in FIGS. 31 and 32, the fuel cell vehicle 410 of the fourth embodiment has the configuration similar to that of the fuel cell vehicle 10 of the first embodiment, except the structure of the release system 50. In order to avoid the duplicate explanation, the like constituents in the fuel cell vehicle 410 of the fourth embodiment to those in the fuel cell vehicle 10 of the first embodiment are expressed by the like numerals and are not specifically described here.

In the fuel cell vehicle 410 of the fourth embodiment, the exhaust gas from the fuel cell stack 22 in the air supply discharge system 40 is used to humidify the supply of the air in the humidifier 46 and is then released to the atmosphere via an exhaust gas pipe 451. The steam-containing exhaust gas and liquefied water are thus directly released from the exhaust gas pipe 451.

Figure 33:
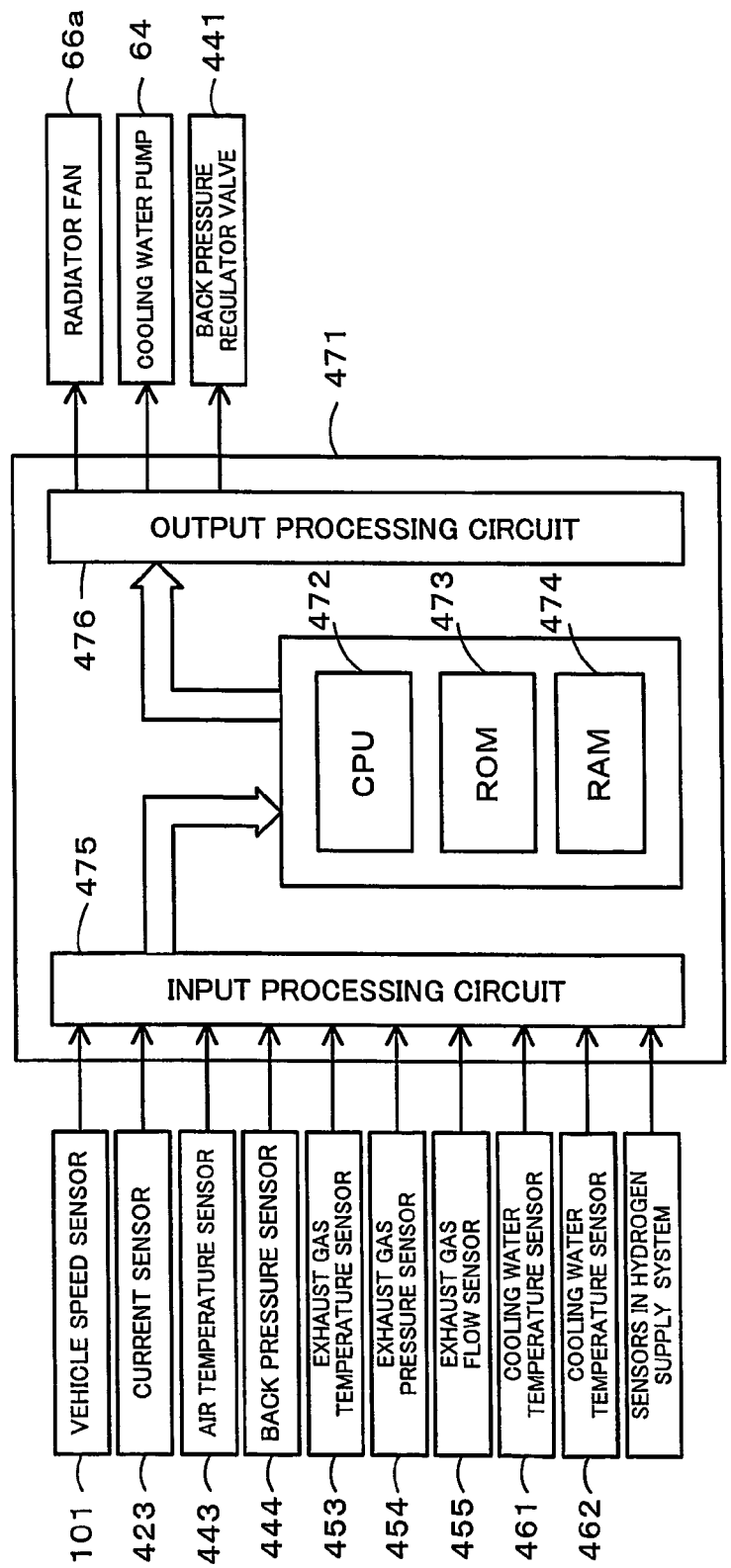
FIG. 33 is a block diagram showing control signals input to and output from an electronic control unit 471, which is built in the PCU 70, for release control of an exhaust gas.

FIG. 33 is a block diagram showing control signals input to and output from an electronic control unit 471, which is built in the PCU 70, for release control of the exhaust gas. The electronic control unit 471 is constructed as a microprocessor including a CPU 472, a ROM 473 that stores processing programs, a RAM 474 that temporarily stores data, an input processing circuit 475 that receives input signals, and an output processing circuit 476 that outputs signals. The electronic control unit 471 receives, via the input processing circuit 475, the vehicle speed Va from the vehicle speed sensor 101, an FC current Ifc from a current sensor 423 attached to the output terminal of the fuel cell stack 22, an air temperature Tin from an air temperature sensor 443 attached to the supply side of the air supply discharge system 40, a back pressure Pb from a back pressure sensor 444 located in the vicinity of the fuel cell stack 22 on the discharge side of the air supply discharge system 40, an exhaust gas temperature Tout, an exhaust gas pressure Pout, and an exhaust gas flow rate Qout from an exhaust gas temperature sensor 453, an exhaust gas pressure sensor 454, and an exhaust gas flow sensor 455 attached to the exhaust gas pipe 451, cooling water temperatures Tw1 and Tw2 from cooling water temperature sensors 461 and 462 located before and after the radiator 66 in the cooling system 60, and diversity of detection signals from various sensors including temperature sensors and pressure sensors located in the hydrogen supply system 30. The electronic control unit 471 outputs driving signals to a fan 66a of the radiator 66 in the cooling system 60, to the cooling water pump 64 in the cooling system 60, and to a back pressure regulator valve 441 provided in the air supply discharge system 40 via the output processing circuit 476.

Figure 34:
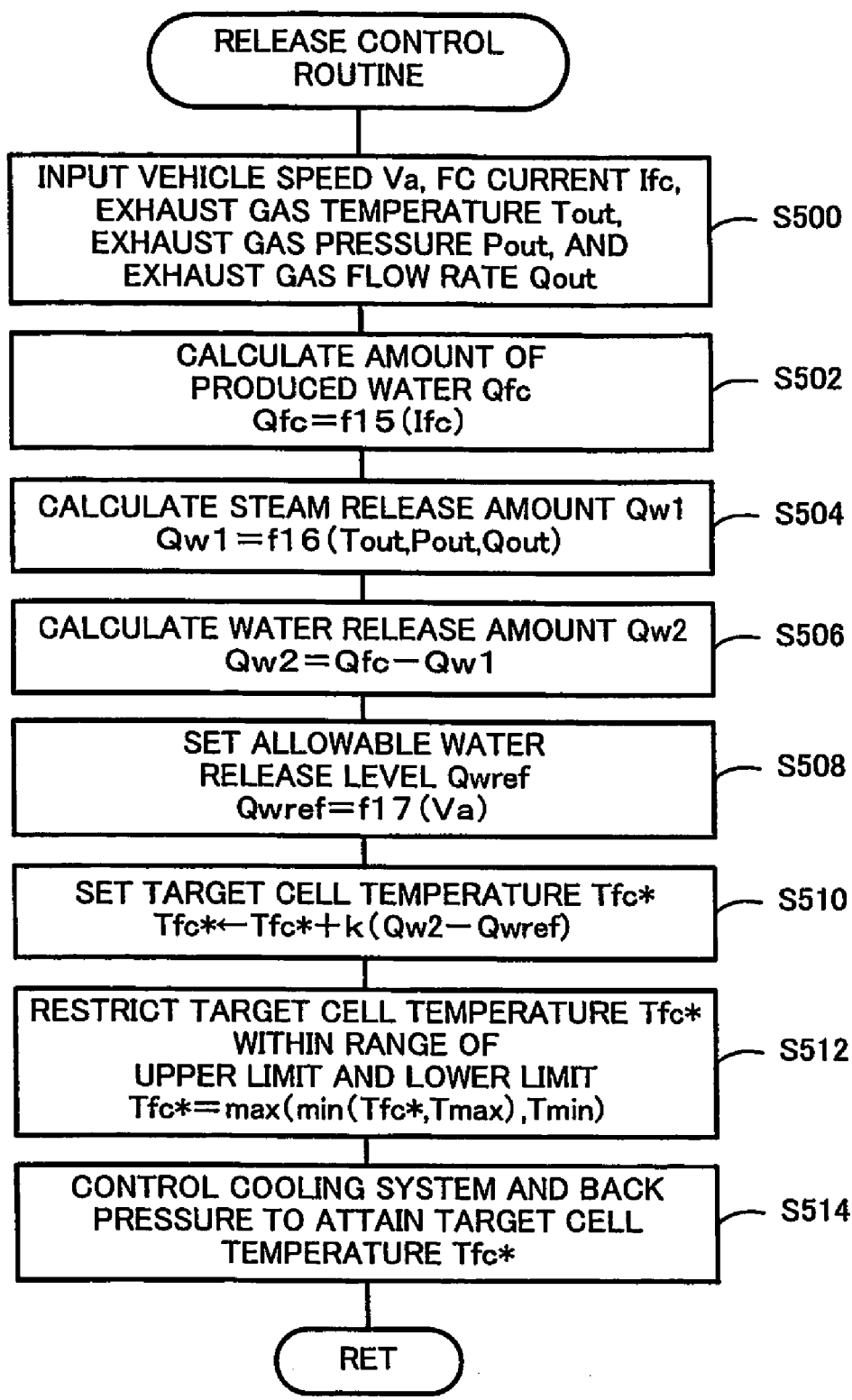
FIG. 34 is a flowchart showing a release control routine executed by the electronic control unit 471.

The following describes series of operations in the fuel cell vehicle 410 of the fourth embodiment constructed as discussed above, especially a series of operations for release control of the exhaust gas in the air supply discharge system 40. FIG. 34 is a flowchart showing a release control routine executed by the electronic control unit 471. This routine is repeatedly carried out at preset time intervals (for example, at every several seconds).

When the release control routine starts, the CPU 472 of the electronic control unit 471 first inputs data required for control, for example, the vehicle speed Va from the vehicle speed sensor 101, the FC current Ifc from the current sensor 423, the exhaust gas temperature Tout from the exhaust gas temperature sensor 453, the exhaust gas pressure Pout from the exhaust gas pressure sensor 454, and the exhaust gas flow rate Qout from the exhaust gas flow sensor 455 (step S500). The routine successively calculates an amount of water Qfc produced per unit time (amount of produced water) by the fuel cell stack 22 from the input FC current Ifc (step S502), a steam release amount Qw1, which represents a quantity released in the form of steam per unit time from the exhaust gas pipe 451, from the input exhaust gas temperature Tout, the input exhaust gas pressure Pout, and the input exhaust gas flow rate Qout (step S504), and a water release amount Qw2, which represents a quantity released in the form of liquid water per unit time, by subtracting the calculated steam release amount Qw1 from the calculated amount of produced water Qfc (step S506). The procedure of this embodiment utilizes the saturated water vapor pressure at the exhaust gas temperature Tout for calculation of the steam release amount Qw1. The amount of produced water Qfc is computable from the FC current Ifc as discussed previously.

Figure 35:
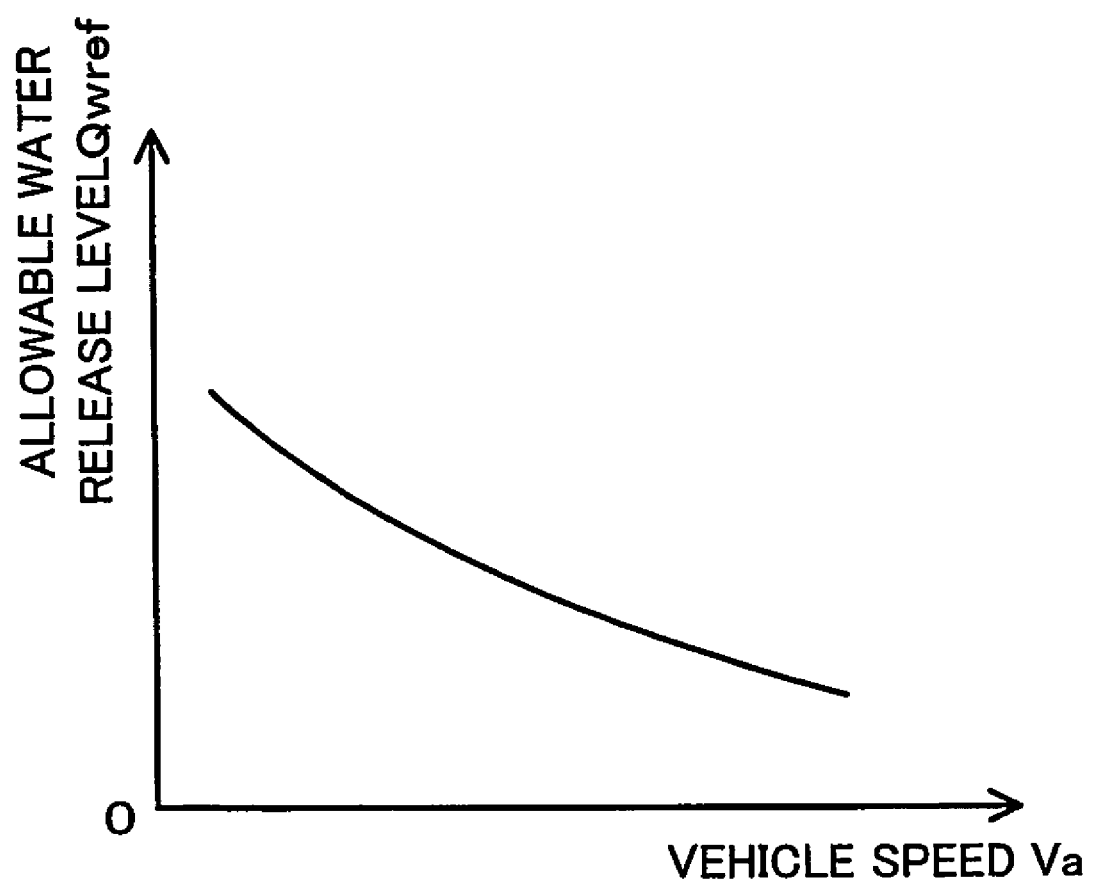
FIG. 35 shows an example of the allowable water release level setting map.

The routine subsequently sets an allowable amount of liquid water released to the atmosphere (allowable water release level) Qwref corresponding to the vehicle speed Va (step S508). In the structure of the fourth embodiment, the allowable water release level Qwref is set to decrease with an increase in vehicle speed Va. A variation in allowable water release level Qwref against the vehicle speed Va is set in advance and stored as an allowable water release level setting map in the ROM 473. The procedure of the fourth embodiment reads and sets the allowable water release level Qwref corresponding to the given vehicle speed Va from the allowable water release level setting map. FIG. 35 shows one example of the allowable water release level setting map.

The routine then sets a target cell temperature Tfc* to cancel out a difference between the calculated water release amount Qw2 and the allowable water release level Qwref (step S510), and restricts the setting of the target cell temperature Tfc* within a range of an upper temperature limit Tmax and a lower temperature limit Tmin (step S512). The routine controls the cooling system 60 and the back pressure of the fuel cell stack 22 to drive the fuel cell stack 22 at the target cell temperature Tfc* restricted within the range of the upper temperature limit Tmax and the lower temperature limit Tmin (step S514), before being terminated. The difference between the water release amount Qw2 and the allowable water release level Qwref is cancelled out by varying the operating temperature of the fuel cell stack 22. This is because the variation in operating temperature of the fuel cell stack 22 changes the temperature of the exhaust gas from the air supply discharge system 40 and thereby varies the steam release amount Qw1. When the water release amount Qw2 is greater than the allowable water release level Qwref, the target cell temperature Tfc* is heightened to raise the temperature of the exhaust gas. The temperature rise of the exhaust gas increases the steam release amount Qw1, while decreasing the water release amount Qw2. When the water release amount Qw2 is less than the allowable water release level Qwref, on the other hand, the target cell temperature Tfc* is lowered to reduce the temperature of the exhaust gas. The temperature drop of the exhaust gas decreases the steam release amount Qw1, while increasing the water release amount Qw2. The fuel cell stack 22 may be driven at the target cell temperature Tfc*, for example, by regulating the revolution speed of the fan 66a of the radiator 66 in response to the observed temperature by the cooling water temperature sensor 461 and by regulating the discharge rate of the cooling water pump 64 in response to the observed temperature by the cooling water temperature sensor 461. The operation of the fuel cell stack 22 at the target cell temperature Tfc* may also be attained by adjusting the back pressure regulator valve 441 to regulate the back pressure in the air supply discharge system 40 of the fuel cell stack 22. This is ascribed to the fact that an increase in back pressure of the fuel cell stack 22 leads to the higher discharge temperature of the air compressor 44. The rise of the discharge temperature of the air compressor 44 increases the humidification rate in the humidifier 46 to significantly vary the water release amount Qw2. Controlling the back pressure of the fuel cell stack 22 leads to regulation of the humidification rate in the humidifier 46 and accordingly cancels out the difference between the water release amount Qw2 and the allowable water release level Qwref.

As described above, the fuel cell vehicle 410 of the fourth embodiment regulates the operating temperature of the fuel cell stack 22 to cancel out the difference between the water release amount Qw2, which is obtained by subtracting the steam release amount Qw1 from the amount of produced water Qfc, and the allowable water release level Qwref, which is set corresponding to the vehicle speed Va. Such regulation of the operating temperature enables the amount of liquid water released from the exhaust gas pipe 451 to be equal to the allowable water release level Qwref. The allowable water release level Qwref is set corresponding to the vehicle speed Va to have substantially no effects or very little effects on subsequent and other nearby vehicles. The adequate amount of water release is thus determined according to the vehicle speed Va.

The fuel cell vehicle 410 of the fourth embodiment sets the target cell temperature Tfc* as the operating temperature of the fuel cell stack 22 to cancel out the difference between the water release amount Qw2 and the allowable water release level Qwref. This object is also attained by varying the steam release amount Qw1. One modified procedure may thus set a target temperature of the exhaust gas from the exhaust gas pipe 451 and drives the fuel cell stack 22 to attain the setting of the target temperature.

Figure 36:
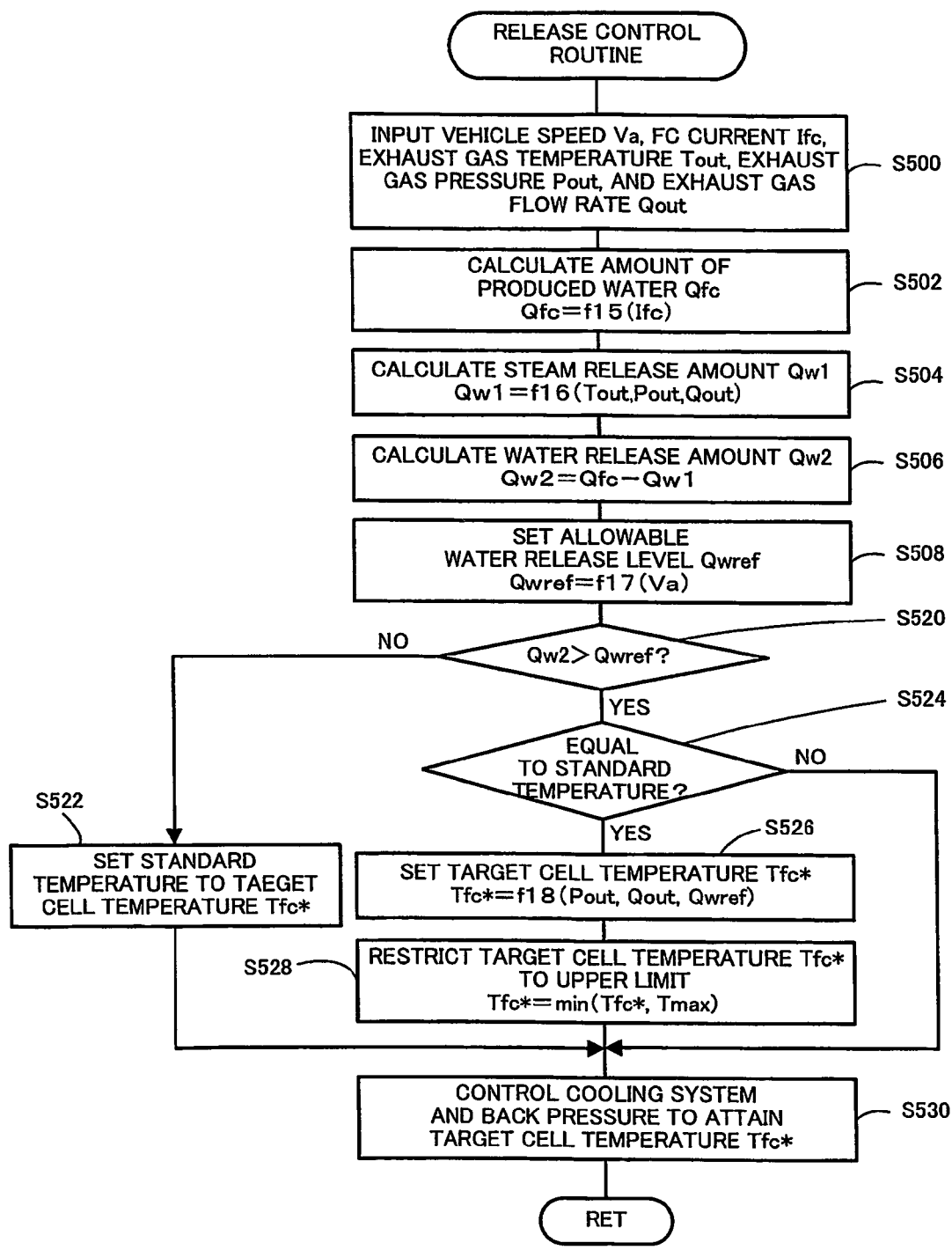
FIG. 36 is a flowchart showing a release control routine executed in one modified structure of the hybrid vehicle 420.

The fuel cell vehicle 410 of the fourth embodiment sets the target cell temperature Tfc* to cancel out the difference between the water release amount Qw2 and the allowable water release level Qwref. The target cell temperature Tfc* may be computed to make the water release amount Qw2 equal to the allowable water release level Qwref. When the water release amount Qw2 is greater than the allowable water release level Qwref under the operation of the fuel cell stack 22 at a standard temperature, the operating temperature of the fuel cell stack 22 is varied to make the water release amount Qw2 equal to the allowable water release level Qwref. When the water release amount Qw2 is not greater than the allowable water release level Qwref under the operation of the fuel cell stack 22 at the standard temperature, on the other hand, the operating temperature of the fuel cell stack 22 may not be varied. A release control routine of this arrangement is shown in the flowchart of FIG. 36. After setting the allowable water release level Qwref, this routine compares the calculated water release amount Qw2 with the allowable water release level Qwref (step S520). When the water release amount Qw2 is greater than the allowable water release level Qwref, the routine determines whether the target cell temperature Tfc* is equal to the standard temperature (step S524). When the target cell temperature Tfc* is equal to the standard temperature, the routine newly sets the target cell temperature Tfc* based on the exhaust gas pressure Pout, the exhaust gas flow rate Qout, and the allowable water release level Qwref to make the water release amount Qw2 equal to the allowable water release level Qwref (step S526). The setting of the target cell temperature Tfc* is restricted to an upper temperature limit Tmax (step S528). The routine then controls the cooling system 60 and the back pressure of the fuel cell stack 22 to drive the fuel cell stack 22 at the target cell temperature Tfc* restricted by the upper temperature limit Tmax (step S530). When the target cell temperature Tfc* is not equal to the standard temperature at step S524, the routine assumes that the target cell temperature Tfc* has already been set to make the water release amount Qw2 equal to the allowable water release level Qwref. The routine accordingly controls the cooling system 60 and the back pressure of the fuel cell stack 22 to drive the fuel cell stack 22 at the current setting of the target cell temperature Tfc* (step S530). When the water release amount Qw2 is not greater than the allowable water release level Qwref, the routine assumes that there is no necessity of reducing the water release amount Qw2 by raising the operating temperature of the fuel cell stack 22. The routine accordingly sets the standard temperature to the target cell temperature Tfc* (step S522) and controls the cooling system 60 and the back pressure of the fuel cell stack 22 to drive the fuel cell stack 22 at the target cell temperature Tfc* (step S530). This modified procedure drives the fuel cell stack 22 at the standard temperature, when the water release amount Qw2 is not greater than the allowable water release level Qwref. This arrangement ensures the high power generation efficiency of the fuel cell stack 22.

In the fuel cell vehicle 410 of the fourth embodiment, diverse techniques are applied to drive the fuel cell stack 22 at the target cell temperature Tfc*: that is, the technique of regulating the revolution speed of the fan 66a of the radiator 66 in response to the observed temperature by the cooling water temperature sensor 461; the technique of regulating the discharge rate of the cooling water pump 64 in response to the observed temperature by the cooling water temperature sensor 461; and the technique of adjusting the back pressure regulator valve 441 to regulate the back pressure in the air supply discharge system 40 of the fuel cell stack 22. Any one of these techniques or any two of these techniques may be applied to drive the fuel cell stack 22 at the target cell temperature Tfc*.

In the fuel cell vehicle 410 of the fourth embodiment, the exhaust gas from the fuel cell stack 22 passes through only the humidifier 46 and is directly released to the atmosphere without gas-liquid separation in a gas-liquid separator. Like the fuel cell vehicle 10 of the first embodiment, however, the exhaust gas from the fuel cell stack 22 may pass through the gas-liquid separator 48, before being released to the atmosphere. In this modified arrangement, the control makes the amount of liquid water separated by the gas-liquid separator 48 equal to the allowable water release level Qwref.

E. Fifth Embodiment

Figure 37:
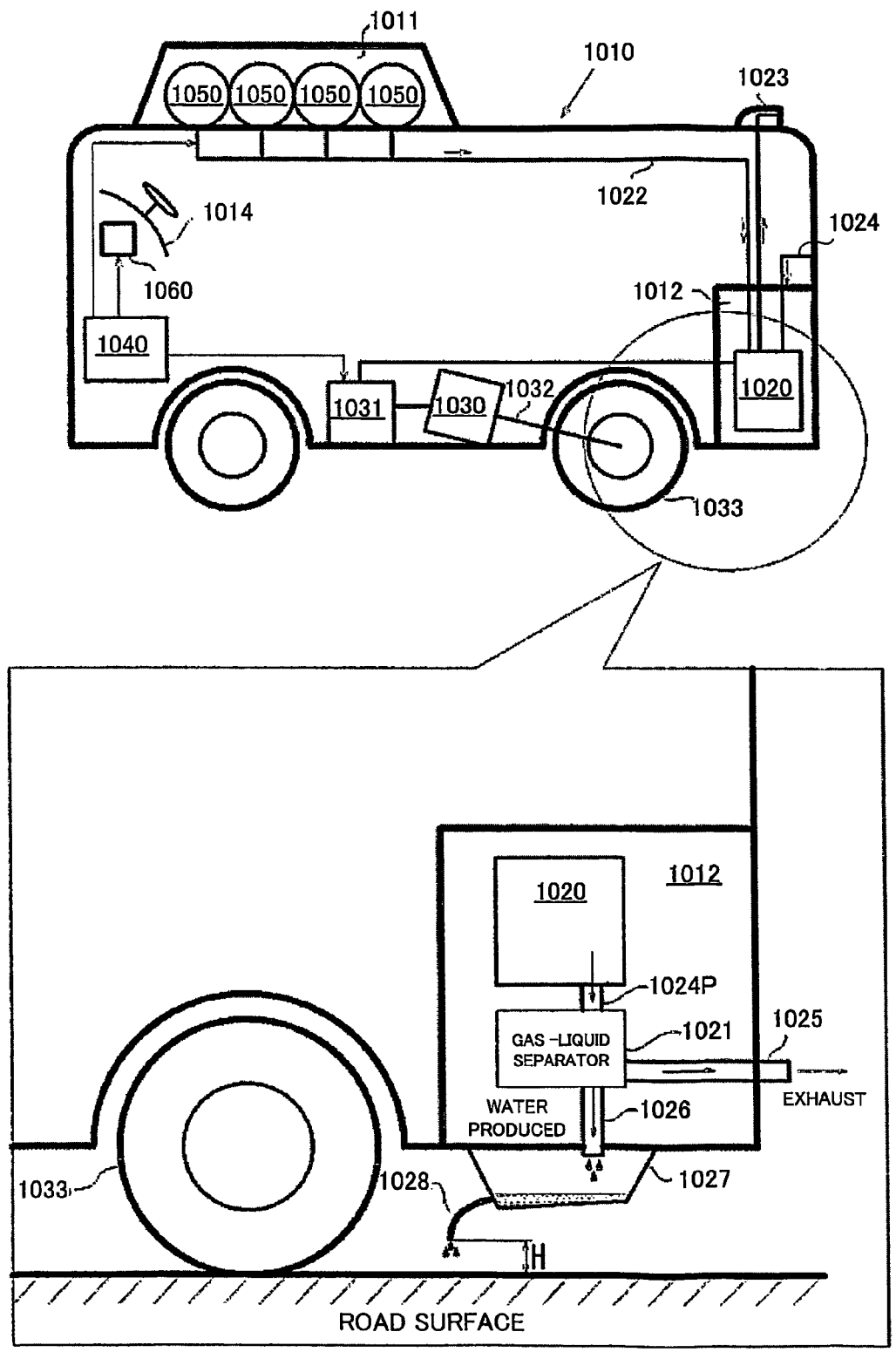
FIG. 37 schematically illustrates the configuration of a vehicle 1010 in a fifth embodiment.

FIG. 37 schematically illustrates the configuration of a vehicle 1010 in a fifth embodiment of the invention. The vehicle 1010 has a stack of fuel cells 1020 located in a rear fuel cell chamber 1012 as a power source and is driven by the power of a motor 1030. The motor 1030 may be any of diverse types of motors but is a synchronous motor in this embodiment. An inverter 1031 functions to convert direct current output from the stack of fuel cells 1020 into three-phase alternating current. The motor 1030 is driven by the three-phase alternating current. The power of the motor 1030 is transmitted to wheels 1033 via a rotating shaft 1032 to drive the vehicle 1010.

The stack of fuel cells 1020 generates electric power through electrochemical reactions of hydrogen with oxygen.

The stack of fuel cells 1020 may be any of various types of fuel cells but are polymer electrolyte fuel cells in this embodiment. A supply of the air is fed to oxygen electrodes or cathodes of the fuel cells 1020 via a supply conduit 1024. A supply of hydrogen is sequentially fed from multiple hydrogen tanks 1050 located in a roof hydrogen tank chamber 1011 via a supply conduit 1022 to hydrogen electrodes or anodes of the fuel cells 1020.

A control unit 1040 controls the operations of the inverter 1031 and other devices mounted on the vehicle 1010. The control unit 1040 is constructed as a microcomputer including a CPU, a ROM, and a RAM. The control unit 1040 controls the operations of the respective devices and the displays on an instrument panel 1060 located at a driver's seat 1014 according to control programs stored in the ROM.

An exhaust system of the cathodes in the fuel cell chamber 1012 is shown in a lower enlarged view. The cathode exhaust from the cathodes of the fuel cells 1020 includes water produced by the electrochemical reactions for power generation. The cathode exhaust is flown to a gas-liquid separator 1021 via piping 1024P for separation of liquid water and is discharged from an exhaust pipe 1025. The separated water passes through a drain 1026 and is accumulated in a buffer tank 1027 located below the vehicle 1010. The water accumulated in the buffer tank 1027 is released to the atmosphere via a discharge pipe 1028. The discharge pipe 1028 is arranged ahead of the buffer tank 1027. The bottom face of the buffer tank 1027 is inclined from the higher rear end to the lower front end for smooth release of water flow from the discharge pipe 1028. A height H of an opening end of the discharge pipe 1028 from the road surface (hereafter referred to as 'opening end height') is set sufficiently low to prevent the released water from being swirled on and scattered by the air current during a run of the vehicle 1010.

In the structure of this embodiment, the anode exhaust from the anodes does not pass through the above exhaust system but is circulated to the supply conduit 1022 for the effective use of remaining unconsumed hydrogen for power generation. The anode exhaust from the anodes may alternatively be discharged with the cathode exhaust from the exhaust system.

Figure 38:
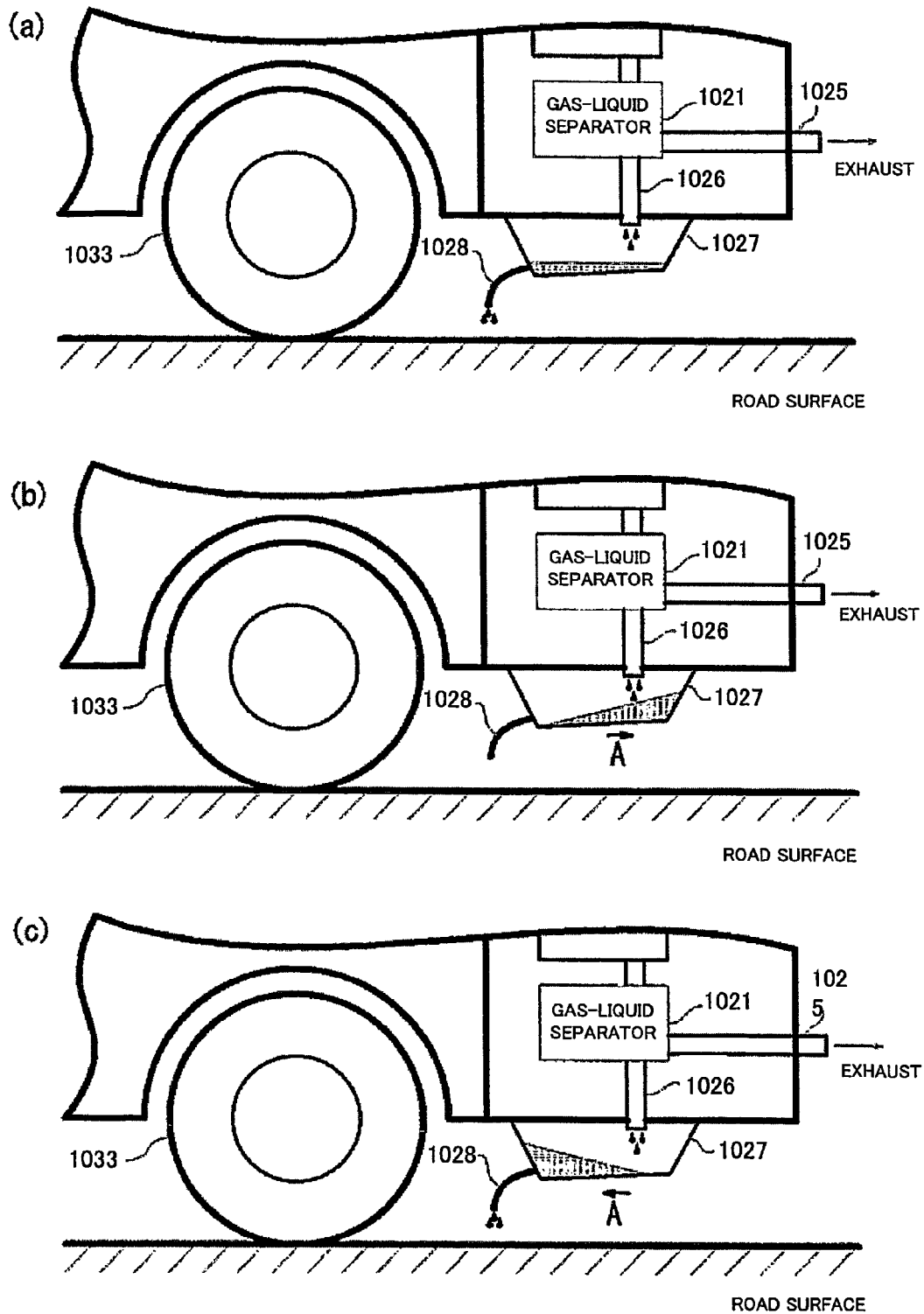
FIG. 38 shows the functions of a buffer tank 1027.

FIG. 38 shows the functions of the buffer tank 1027. The vehicle 1010 is at a stop in FIG. 38(*a*). In this state, the water accumulated in the buffer tank 1027 is released out of the vehicle from the discharge pipe 1028. While the vehicle 1010 is at a stop, no water is swirled on and scattered by the air current.

The vehicle 1010 is under acceleration in FIG. 38(*b*). In this state, the water accumulated in the buffer tank 1027 is pressed backward by the force of inertia 'A' caused by acceleration. This makes the water surface apart from the joint of the discharge pipe 1028 and thereby restrains the water discharge. The restraint of the water discharge lowers the potential for scatter of the discharged water by the air current produced below the vehicle.

The vehicle 1010 is under deceleration in FIG. 38(*c*). In this state, the water accumulated in the buffer tank 1027 is pressed forward by the force of inertia 'A' caused by deceleration. This facilitates discharge of the water from the discharge pipe 1028. The air current produced below the vehicle is weakened under deceleration to relatively reduce scatter of the discharged water. The opening end height of the discharge pipe 1028 is desirably set to a sufficiently low level that restrains scatter of the discharged water under deceleration.

As described above, in the vehicle 1010 of the fifth embodiment, the functions of the buffer tank 1027 and the discharge pipe 1028 provided in the exhaust system effectively restrain discharge of water under acceleration, while facilitating discharge of water under deceleration. During a general run, the vehicle often repeats acceleration and deceleration and does not continue running at a fixed cruising speed. The arrangement of facilitating the water discharge under deceleration and restraining the water discharge under acceleration thus reduces scatter of the discharged water during a run to the level that does not interfere with smooth driving of subsequent and nearby vehicles.

F. Sixth Embodiment

FIG. 39 shows the structure of an exhaust system in a sixth embodiment of the invention. The structure of the sixth embodiment has a discharge pipe 1028A with a lead valve 1028V below the buffer tank 1027. The lead valve 1028V functions to open and close in response to the ram pressure of the air current during a run of the vehicle, that is, in response to the pressure holding the air current back.

Lower graphs show the functions of the lead valve 1028V. Water discharged from the discharge pipe 1028A is more drastically scattered with an increase in vehicle speed to heighten the air current. When the vehicle speed exceeds a specific level Vr, restraint of the scatter of water droplets is demanded since there is a possibility of interference with smooth driving of subsequent and nearby vehicles. The procedure of this embodiment sets a little lower value than the specific level Vr to a design speed Vd for restraining scatter of water droplets.

The ram pressure increases in proportion to the square of the vehicle speed as shown by a curve P. This curve P gives a ram pressure Pd corresponding to the design speed Vd. In the structure of this embodiment, the operating pressure of the lead valve 1028V is regulated, such that the lead valve 1028V opens in response to the ram pressure of less than the level Pd while closing in response to the ram pressure of not less than the level Pd.

In the vehicle of the sixth embodiment, such regulation fully closes the lead valve 1028V to stop the water discharge when the vehicle speed exceeds the design speed Vd. This arrangement effectively restrains scatter of the discharged water at a level that may interfere with smooth driving of subsequent and nearby vehicles.

In the structure of the sixth embodiment, the discharge pipe 1028A is located below the buffer tank 1027. The discharge pipe 1028A may alternatively be located ahead of the buffer tank 1027, like the structure of the fifth embodiment. It is not essential to fully close the lead valve 1028V when the vehicle speed exceeds the design speed Vd. The mechanism may alternatively reduce the opening of the lead valve 1028V continuously or stepwise according to the vehicle speed.

The lead valve 1028V of the sixth embodiment may be replaced by an electromagnetic valve. This modified structure additionally includes a control unit for controlling the operations of the electromagnetic valve. The control unit reduces the opening of the electromagnetic valve or fully closes the electromagnetic valve when the vehicle speed exceeds the design speed Vd.

FIG. 40 shows the structure of another exhaust system in a modified example. In this modified example, the bottom face of a buffer tank 1027A is inclined from a higher front end to a lower rear end by a height L. Such inclination makes the water accumulated in the buffer tank 1027A apart from the discharge pipe 1028 even in the steady state as shown in FIG. 40(*a*) and thereby restrains the water discharge. This arrangement effectively restrains water discharge during a steady run of the vehicle and thus reduces scatter of the discharged water.

While the vehicle is under acceleration, the force of inertia 'A' functions to restrain the water discharge as shown in FIG. 40(b). While the vehicle is under deceleration, on the other hand, the force of inertia 'A' functions to press the accumulated water forward and thereby facilitate the water discharge as shown in FIG. 40(c). A run of the vehicle naturally includes a time period of deceleration. The restraint of the water discharge during a steady drive is thus not detrimental to the water accumulation in the buffer tank 1027A.

FIG. 41 shows the structure of still another exhaust system in another modified example. In this modified example, a rigid discharge pipe 1028B having a front opening is attached to the buffer tank 1027. In the illustrated example, a sectional area S0 at the front opening of the discharge pipe 1028B is greater than a sectional area S1 at the joint with the buffer tank 1027. The discharge pipe 1028B may otherwise be formed in a cylindrical shape having the identical sectional areas S0 and S1.

In the structure of this modified example, the ram pressure is applied onto the discharge pipe 1028B during a run of the vehicle. The water accumulated in the buffer tank 1027 is flown forward to be out of the discharge pipe 1028B. The ram pressure acts to restrain the flow-out. In the structure of this modified example, the action of the ram pressure effectively restrains the water discharge during a run at a high-speed.

Lower graphs show effects of a sectional area ratio S0/S1 on the restraint of the water discharge. It is assumed that the design speed Vd is set by taking into account the lower limit Vr of the vehicle speed that requires restraint of the water discharge, as discussed above with reference to the structure of the sixth embodiment. A curve P gives a ram pressure Pa corresponding to the design speed Vd. For restraint of the water discharge, the ram pressure Pa is to be higher than the hydraulic pressure of the water accumulated in the buffer tank 1027 for flow-out from the discharge pipe 1028B. The hydraulic pressure of the accumulated water varies with the level of the water accumulated in the buffer tank 1027, but may be set corresponding to the average level of the accumulated water under the typical driving conditions. The procedure of this embodiment sets a little higher value than this corresponding hydraulic pressure to a design value Pd of the ram pressure.

The pressure in a pipe generally varies with a variation in sectional area of the pipe. For example, setting the sectional area ratio S0/S1 of the discharge pipe 1028B to be not less than 1 raises the ram pressure at the joint of the discharge pipe 1028B to be higher than the ram pressure at the front opening. In this modified example, the shape of the discharge pipe 1028B is determined, based on a sectional area ratio Sd corresponding to a pressure ratio Rd (=Pd/Pa), where Pd denotes the design value of the ram pressure and Pa denotes the ram pressure corresponding to the design speed Vd. Regulation of the ram pressure thus effectively restrains the water discharge.

The embodiments discussed above regard automobiles with fuel cells mounted thereon as the power source. The automobiles may have any of other diverse power sources including secondary batteries and capacitors, in addition to the fuel cells. The techniques of the invention are not restricted to the automobiles with fuel cells mounted thereon, but are also applicable to diversity of ground moving bodies including trains, cars, and various vehicles in addition to automobiles, as well as to diversity of non-ground moving bodies.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

INDUSTRIAL APPLICABILITY

The techniques of the invention are effectively applicable to manufacturing industries of diverse moving bodies including automobiles.

The invention claimed is:

1. A moving body with fuel cells that are mounted thereon as a power source and generate electric power with production of water as a by-product, said moving body comprising:
   a water reservoir that accumulates therein water produced by the fuel cells;
   a release module that releases the water produced by the fuel cells and the water accumulated in said water reservoir via at least one water outlet from outer surfaces of said moving body to the atmosphere;
   a status detection module that detects a status of said moving body; and
   a release control module that controls said release module to regulate release of the water to the atmosphere in response to the detected status; and
   wherein said status detection module detects a moving state of said moving body, and said release control module controls said release module to restrict release of the water in the moving state of said moving body detected by said status detection module, compared with release of the water in a stop state of said moving body,
   wherein said release control module controls said release module to release the water within a first release quantity in response to detection of a stop state of said moving body by said status detection module, while controlling said release module to release the water within a second release quantity, which is less than the first release quantity, in response to detection of a moving state of said moving body by said status detection module.

2. A moving body with fuel cells that are mounted thereon as a power source and generate electric power with production of water as a by-product, said moving body comprising:
   a water reservoir that accumulates therein water produced by the fuel cells;
   a release module that releases the water produced by the fuel cells and the water accumulated in said water reservoir via at least one water outlet from outer surfaces of said moving body to the atmosphere;
   a status detection module that detects a status of said moving body; and
   a release control module that controls said release module to regulate release of the water to the atmosphere in response to the detected status; and
   wherein said status detection module detects a moving state of said moving body, and said release control module controls said release module to restrict release of the water in the moving state of said moving body detected by said status detection module, compared with release of the water in a stop state of said moving body,
   wherein said status detection module measures a moving speed of said moving body, and
   said release control module sets an allowable release limit, which tends to decrease with an increase in moving speed measured by said status detection module, and controls said release module to release the water within the setting of allowable release limit.

3. A moving body with fuel cells that are mounted thereon as a power source and generate electric power with production of water as a by-product, said moving body comprising:
- a water reservoir that accumulates therein water produced by the fuel cells;
- a release module that releases the water produced by the fuel cells and the water accumulated in said water reservoir via at least one water outlet from outer surfaces of said moving body to the atmosphere;
- a status detection module that detects a status of said moving body; and
- a release control module that controls said release module to regulate release of the water to the atmosphere in response to the detected status; and
- wherein said status detection module detects a moving state of said moving body, and said release control module controls said release module to restrict release of the water in the moving state of said moving body detected by said status detection module, compared with release of the water in a stop state of said moving body,
- wherein said status detection module measures a relative speed of an ambient air flow to said moving body, and
- said release control module controls said release module to decrease release of the water with an increase in relative speed of the ambient air flow measured by said status detection module.

4. A moving body in accordance with claim 3, wherein said release control module controls said release module to prohibit release of the water when the relative speed of the ambient air flow measured by said status detection module is not less than a preset level.

5. A moving body in accordance with claim 3, wherein said status detection module detects a braking state of said moving body, and
- said release control module controls said release module to restrict release of the water, in response to detection of the braking state of said moving body by said status detection module.

6. A moving body in accordance with claim 5, wherein said release control module controls said release module to prohibit release of the water when the braking state of said moving body detected by said status detection module corresponds to a predetermined braking state.

7. A moving body with fuel cells that are mounted thereon as a power source and generate electric power with production of water as a by-product, said moving body comprising:
- a water reservoir that accumulates therein water produced by the fuel cells;
- a release module that releases the water produced by the fuel cells and the water accumulated in said water reservoir via at least one water outlet from outer surfaces of said moving body to the atmosphere;
- a status detection module that detects a status of said moving body; and
- a release control module that controls said release module to regulate release of the water to the atmosphere in response to the detected status; and
- wherein said status detection module detects a moving state of said moving body, and said release control module controls said release module to restrict release of the water in the moving state of said moving body detected by said status detection module, compared with release of the water in a stop state of said moving body,
- wherein said status detection module detects a specific turning state of said moving body, and
- said release control module controls said release module to restrict release of the water in the case of detection of the specific turning state by said status detection module, compared with release of the water in the case of no detection of the specific turning state.

8. A moving body in accordance with claim 7, wherein said release module has at least two water outlets located respectively on left and right sides of said moving body to release the water, and
- said release control module controls said release module to restrict release of the water from at least one of the at least two water outlets in the case of detection of the specific turning state by said status detection module,
- wherein the at least one of the at least two water outlets is located on an outer circumferential side of said moving body.

9. A moving body in accordance with claim 7, wherein the specific turning state represents a turn of said moving body at or below a preset moving speed with a turning radius of not greater than a predetermined value.

10. A moving body in accordance with claim 7, wherein the restriction of the release of the water is prohibition of the release of the water.

11. A moving body with fuel cells that are mounted thereon as a power source and generate electric power with production of water as a by-product, said moving body comprising:
- a water reservoir that accumulates therein water produced by the fuel cells;
- a release module that releases the water produced by the fuel cells and the water accumulated in said water reservoir via at least one water outlet from outer surfaces of said moving body to the atmosphere;
- a status detection module that detects a status of said moving body; and
- a release control module that controls said release module to regulate release of the water to the atmosphere in response to the detected status; and
- wherein said status detection module detects a moving state of said moving body, and said release control module controls said release module to restrict release of the water in the moving state of said moving body detected by said status detection module, compared with release of the water in a stop state of said moving body,
- wherein said moving body is a vehicle equipped with a skid control module to control a skid of at least one wheel,
- wherein said status detection module detects a skid reduction control state in which said skid control module is activated to control the skid of the at least one wheel, and
- said release control module controls said release module to restrict release of the water, in response to detection of the skid reduction control state by said status detection module.

12. A moving body in accordance with claim 11, wherein said release module has multiple water outlets at multiple different locations to release the water therefrom, and
- said release control module controls said release module to restrict release of the water from at least a water outlet affecting the wheel under control of the skid, among the multiple water outlets of said release module, in response to detection of the skid reduction control state by said status detection module.

13. A moving body in accordance with claim 11, wherein the restriction of the release of the water is prohibition of the release of the water.

14. A moving body with fuel cells that are mounted thereon as a power source and generate electric power with production of water as a by-product, said moving body comprising:
- a water reservoir that accumulates therein water produced by the fuel cells;

a release module that releases the water produced by the fuel cells and the water accumulated in said water reservoir via at least one water outlet from outer surfaces of said moving body to the atmosphere;

a status detection module that detects a status of said moving body; and a release control module that controls said release module to regulate release of the water to the atmosphere in response to the detected status; and wherein said status detection module detects a moving state of said moving body, and said release control module controls said release module to restrict release of the water in the moving state of said moving body detected by said status detection module, compared with release of the water in a stop state of said moving body, wherein said release control module controls said status detection module to also detect a surrounding environment of said moving body, wherein said status detection module detects a rainy state, and said release control module controls said release module to permit release of the water without restriction, in response to detection of the rainy state by said status detection module.

15. A moving body in accordance with claim 14, wherein said release control module controls said release module to increase release of the water in the case of detection of a predetermined rainy state by said status detection module, compared with release of the water in the case of no detection of the rainy state.

16. A moving body, said moving body being a vehicle, with fuel cells that are mounted thereon as a power source and generate electric power with production of water as a by-product, said moving body comprising:

a water reservoir that accumulates therein water produced by the fuel cells;

a release module that releases the water produced by the fuel cells and the water accumulated in said water reservoir via at least one water outlet from outer surfaces of said moving body to the atmosphere;

a status detection module that detects a status of said moving body; and a release control module that controls said release module to regulate release of the water to the atmosphere in response to the detected status; and wherein said status detection module detects a moving state of said moving body, and said release control module controls said release module to restrict release of the water in the moving state of said moving body detected by said status detection module, compared with release of the water in a stop state of said moving body, wherein said release control module controls said status detection module to also detect a surrounding environment of said moving body, wherein said status detection module detects a snowy-icy surface moving state of said moving body, in which said moving body moves on either a snowy surface or an icy surface, and said release control module controls said release module to restrict release of the water, in response to detection of the snowy-icy surface moving state of said moving body by said status detection module.

17. A moving body in accordance with claim 16, wherein the restriction of the release of the water is prohibition of the release of the water.

18. A moving body in accordance with claim 16, wherein said status detection module measures an outside air temperature, and said release control module controls said release module to restrict release of the water with a decrease in outside air temperature measured by said status detection module.

19. A moving body with fuel cells that are mounted thereon as a power source and generate electric power with production of water as a by-product, said moving body comprising:

a water reservoir that accumulates therein water produced by the fuel cells;

a release module that releases the water produced by the fuel cells and the water accumulated in said water reservoir via at least one water outlet from outer surfaces of said moving body to the atmosphere;

a status detection module that detects a status of said moving body; and a release control module that controls said release module to regulate release of the water to the atmosphere in response to the detected status; and wherein said status detection module detects a moving state of said moving body, and said release control module controls said release module to restrict release of the water in the moving state of said moving body detected by said status detection module, compared with release of the water in a stop state of said moving body, wherein said status detection module detects an estimated loading-unloading state of a driver or a passenger loaded to or unloaded from said moving body, and said release control module controls said release module to restrict release of the water, in response to detection of the estimated loading-unloading state by said status detection module, wherein said status detection module also detects a state of a building, another moving body, or a person located in the vicinity of said moving body.

20. A moving body in accordance with claim 19, wherein said status detection module detects presence of a building, another moving body, or a person within a predetermined distance from said moving body, and said release control module controls said release module to restrict release of the water, in response to detection of the presence of a building, another moving body, or a person within the predetermined distance from said moving body by said status detection module.

21. A moving body in accordance with claim 20, wherein said release module has multiple water outlets at multiple different locations to release the water therefrom, said status detection module detects presence of a building, another moving body, or a person within the predetermined distance in multiple different directions, and said release control module controls said release module to restrict release of the water from a water outlet corresponding to a direction with a building, another moving body, or a person detected in the predetermined distance by said status detection module, among the multiple water outlets.

22. A moving body in accordance with claim 20, wherein the restriction of the release of the water is prohibition of the release of the water.

23. A moving body in accordance with claim 19, wherein said status detection module measures a distance between said moving body and another moving body located behind said moving body, and said release control module controls said release module to restrict release of the water, when the distance from the another moving body measured by said status detection module is less than a preset distance.

24. A moving body in accordance with claim 23, wherein said status detection module measures a moving speed of said moving body, and
said release control module sets a distance calculated from the measured moving speed of said moving body to the preset distance and controls said release module to restrict release of the water in response to the preset distance.

25. A moving body in accordance with claim 23, wherein the restriction of the release of the water is prohibition of the release of the water.

26. A moving body with fuel cells that are mounted thereon as a power source and generate electric power with production of water as a by-product, said moving body comprising:
a water reservoir that accumulates therein water produced by the fuel cells;
a release module that releases the water produced by the fuel cells and the water accumulated in said water reservoir via at least one water outlet from outer surfaces of said moving body to the atmosphere;
a status detection module that detects a status of said moving body; and
a release control module that controls said release module to regulate release of the water to the atmosphere in response to the detected status; and
wherein said status detection module detects a moving state of said moving body, and said release control module controls said release module to restrict release of the water in the moving state of said moving body detected by said status detection module, compared with release of the water in a stop state of said moving body,
wherein said status detection module detects an estimated loading-unloading state of a driver or a passenger loaded to or unloaded from said moving body, and
said release control module controls said release module to restrict release of the water, in response to detection of the estimated loading-unloading state by said status detection module,
wherein said release module has multiple water outlets at multiple different locations to release the water therefrom,
said status detection module detects the estimated loading-unloading state at multiple different positions on said moving body, and
said release control module controls said release module to restrict release of the water from a water outlet corresponding to a position where the estimated loading-unloading state is detected by said status detection module, among the multiple water outlets.

27. A moving body with fuel cells that are mounted thereon as a power source and generate electric power with production of water as a by-product, said moving body comprising:
a water reservoir that accumulates therein water produced by the fuel cells;
a release module that releases the water produced by the fuel cells and the water accumulated in said water reservoir via at least one water outlet from outer surfaces of said moving body to the atmosphere;
a status detection module that detects a status of said moving body; and
a release control module that controls said release module to regulate release of the water to the atmosphere in response to the detected status; and
wherein said status detection module detects a moving state of said moving body, and said release control module controls said release module to restrict release of the water in the moving state of said moving body detected by said status detection module, compared with release of the water in a stop state of said moving body,
wherein said status detection module detects an estimated loading-unloading state of a driver or a passenger loaded to or unloaded from said moving body, and
said release control module controls said release module to restrict release of the water, in response to detection of the estimated loading-unloading state by said status detection module,
wherein the restriction of the release of the water is prohibition of the release of the water.

* * * * *

UNITED STATES PATENT AND TRADEMARK OFFICE
CERTIFICATE OF CORRECTION

| | | |
|---|---|---|
| PATENT NO. | : 7,975,788 B2 | Page 1 of 1 |
| APPLICATION NO. | : 10/569447 | |
| DATED | : July 12, 2011 | |
| INVENTOR(S) | : Naohiro Yoshida et al. | |

It is certified that error appears in the above-identified patent and that said Letters Patent is hereby corrected as shown below:

| Column | Line | |
|---|---|---|
| 22 | 28 | Change "value '2'" to --value '1'--. |
| 27 | 6 | Change "acceleration a" to --acceleration α--. |

Signed and Sealed this

Seventeenth Day of January, 2012

David J. Kappos
*Director of the United States Patent and Trademark Office*